(12) United States Patent
Kawasaki et al.

(10) Patent No.: US 12,156,021 B2
(45) Date of Patent: Nov. 26, 2024

(54) UE AND COMMUNICATION CONTROL METHOD FOR CONTROLLING TRANSMISSION OF PDU SESSION REQUEST MESSAGE

(71) Applicant: SHARP KABUSHIKI KAISHA, Sakai (JP)

(72) Inventors: Yudai Kawasaki, Sakai (JP); Masafumi Aramoto, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 529 days.

(21) Appl. No.: 17/600,081

(22) PCT Filed: Apr. 1, 2020

(86) PCT No.: PCT/JP2020/015077
§ 371 (c)(1),
(2) Date: Sep. 29, 2021

(87) PCT Pub. No.: WO2020/204094
PCT Pub. Date: Oct. 8, 2020

(65) Prior Publication Data
US 2022/0191734 A1 Jun. 16, 2022

(30) Foreign Application Priority Data
Apr. 1, 2019 (JP) ................. 2019-070074

(51) Int. Cl.
*H04W 28/02* (2009.01)
*H04W 48/18* (2009.01)
*H04W 84/04* (2009.01)

(52) U.S. Cl.
CPC ....... *H04W 28/0289* (2013.01); *H04W 48/18* (2013.01); *H04W 84/042* (2013.01)

(58) Field of Classification Search
CPC ............. H04W 28/0289; H04W 48/18; H04W 84/042
See application file for complete search history.

(56) References Cited

U.S. PATENT DOCUMENTS

| 2020/0120738 A1 | 4/2020 | Kawasaki et al. |
| 2021/0029628 A1* | 1/2021 | Kim ....................... H04W 48/18 |

FOREIGN PATENT DOCUMENTS

JP      2019004410 A    1/2019

OTHER PUBLICATIONS

3GPP TSG CT WG1 Meeting #114 C1-190674 (Year: 2019).*
(Continued)

*Primary Examiner* — Ricky Q Ngo
*Assistant Examiner* — Stephen N Steiner
(74) *Attorney, Agent, or Firm* — ScienBiziP, P.C.

(57) ABSTRACT

According to one aspect of the present invention, a communication control method is provided that determines whether congestion control is to be continued in a destination PLMN in a case that a PLMN is changed during the application of congestion control and the PLMN before the change is a home PLMN. In a case that the PLMN is changed while a back-off timer received along with a cause value for the congestion control is running and the PLMN before the change is a home PLMN, it is determined whether to allow UE to transmit an SM request message in the destination, based on the presence or absence of an information element notified from the network.

3 Claims, 10 Drawing Sheets

(56) References Cited

OTHER PUBLICATIONS

3GPP TS 24.501 V15.3.0 (Mar. 2019) Brd Generation Partnership Project; Technical Specification Group Core Network and Terminals; Non-Access-Stratum (NAS) protocol for 5G System (5GS); Stage 3 (Release 15).
Intel et al., "Clarification on NAS level congestion control", S2-1902804 3GPP TSG-SA WG2 Meeting #131, Feb. 25-Mar. 1, 2019, Santa Cruz—Tenerife, Spain.
"3rd Generation Partnership Project; Technical Specification Group Services and System Aspects; System Architecture for the 5G System; Stage 2(Release 15)", 3GPP TS 23.501 V15.5.0 (Mar. 2019).
"3rd Generation Partnership Project; Technical Specification Group Services and System Aspects; Procedures for the 5G System; Stage 2 (Release 15)", 3GPP TS 23.502 V15.5.0 (Mar. 2019).
"3rd Generation Partnership Project; Technical Specification Group Core Network and Terminals; Non-Access-Stratum (NAS) protocol for 5G System (5GS); Stage 3 (Release 15)", 3GPP TS 24.501 V15.2.1 (Jan. 2019).
Sharp, C1, "Handling of S-NSSAI based congestion control with new indication upon PLMN change-Alt 4", C1-192245, 3GPP TSG-CT WG1 Meeting #116, Xi'an, P.R. of China, Apr. 8-12, 2019, pp. 1-28, Apr. 2, 2019.
Huawei et al., "SINE_5G: Back-off control and retry restriction mechanisms in 5GS", C1-190674, 3GPP TSG CT WG1 Meeting #114, Bratislava, Slovakia, Jan. 21-25, 2019.
Sharp, "Congestion control upon PLMN change", C1-183759, 3GPP TSG-CT WG 1 Meeting #111, Osaka (Japan), May 21-25, 2018.

\* cited by examiner

UE AND COMMUNICATION CONTROL METHOD FOR CONTROLLING TRANSMISSION OF PDU SESSION REQUEST MESSAGE

TECHNICAL FIELD

This application relates to a UE and a communication control method. This application claims the benefit of priority to Japanese Patent Application No. 2019-70074 filed on Apr. 1, 2019, which is incorporated herein by reference in its entirety.

BACKGROUND ART

The 3rd Generation Partnership Project (3GPP), which undertakes activities for standardizing recent mobile communication systems, has studied System Architecture Evolution (SAE) which is a system architecture of Long Term Evolution (LTE). The 3GPP is in the process of standardizing Evolved Packet System (EPS) as a communication system for realizing an all-Internet Protocol (IP) architecture. Note that a core network constituting the EPS is called an Evolved Packet Core (EPC).

Additionally, the 3GPP recently has been studying a next-generation communication technology and a system architecture for 5th Generation (5G) mobile communication system which is a next-generation mobile communication system. Especially, as a system for achieving the 5G mobile communication system, the 3GPP is in a process of standardizing 5G System (5GS) (see NPL 1 and NPL 2). The 5GS extracts technical issues associated with connection of various terminals to a cellular network and standardizes solutions.

Examples of the requirement include optimization and diversification of a communication procedure to support a continual mobile communication service depending on terminals supporting various access networks, and optimization of a system architecture suitable for the optimization and diversification of the communication procedure.

CITATION LIST

Non Patent Literature

NPL 1: 3GPP TS 23.501 v15.5.0; 3rd Generation Partnership Project; Technical Specification Group Services and System Aspects; System Architecture for the 5G System; Stage 2 (Release 15)

NPL 2: 3GPP TS 23.502 v15.5.0; 3rd Generation Partnership Project; Technical Specification Group Services and System Aspects; Procedures for the 5G System; Stage 2 (Release 15)

NPL 3: 3GPP TS 24.501 v15.2.1; 3rd Generation Partnership Project; Technical Specification Group Core Network and Terminals; Non-Access-Stratum (NAS) protocol for 5G System (5GS); Stage 3 (Release 15)

SUMMARY OF INVENTION

Technical Problem

The 5GS has studied a mechanism that provides a function equivalent to congestion control, and additionally, control signal management based on causes other than congestion control (see NPL 1, NPL 2, and NPL 3).

However, in a state where the congestion control is applied, in a case that UE changes a PLMN, and the PLMN before the change is a home PLMN, it is not clear whether the congestion control is continued in a destination PLMN to which the UE moves.

The present invention has been made in view of such circumstances, and an object of the present invention is to provide a mechanism and a communication control method for implementing a control signal management process based on causes for congestion control in a case of changing the system.

Solution to Problem

A UE according to the present invention is a User Equipment (UE) including a transmission and/or reception unit, and a controller, wherein the transmission and/or reception unit receives a Protocol Data Unit (PDU) session establishment reject message from a control apparatus in a Protocol Data Unit (PDU) session establishment procedure, the controller starts a back-off timer by using a back-off timer value in a case that first information and the back-off timer value are included in the PDU session establishment reject message and a certain piece of Single Network Slice Selection Assistance information (S-NSSAI) is provided during the PDU session establishment procedure, the first information is a cause value indicating that a resource for a specific slice is insufficient, in a case that the first information and second identification information are included in the PDU session establishment reject message, the second identification information indicating that the back-off timer is applied to every Public Land Mobile Network (PLMN), the transmission and/or reception unit does not transmit another PDU session establishment request message or another PDU session modification request message for the certain piece of S-NSSAI in every PLMN while the back-off timer is running, and in a case that the first information and the second identification information are included in the PDU session establishment reject message, the second identification information indicating that the back-off timer is applied to a registered PLMN, the transmission and/or reception unit does not transmit another PDU session establishment request message or another PDU session modification request message for the certain piece of S-NSSAI in the registered PLMN while the back-off timer is running.

The UE according to the present invention is a User Equipment (UE) including a transmission and/or reception unit, and a controller, wherein the transmission and/or reception unit receives a Protocol Data Unit (PDU) session establishment reject message from a control apparatus in a Protocol Data Unit (PDU) session establishment procedure, the controller starts a back-off timer by using a back-off timer value in a case that first information and the back-off timer value are included in the PDU session establishment reject message and a certain piece of Single Network Slice Selection Assistance information (S-NSSAI) is provided during the PDU session establishment procedure, the first information is a cause value indicating that a resource for a specific slice is insufficient, in a case that the first information and second identification information are included in the PDU session establishment reject message, the second identification information indicating that the back-off timer is applied to every Public Land Mobile Network (PLMN), the controller does not transmit another PDU session establishment request message or another PDU session modification request message for the certain piece of S-NSSAI in every PLMN while the back-off timer is running, and in a case that the first information and the second identification information are included in the PDU session establishment reject message, the second identification information indicating that the back-off timer is applied to a registered PLMN, the controller does not transmit another PDU session establishment request message or another PDU session modification request message for the certain piece of S-NSSAI in the registered PLMN while the back-off timer is running.

The UE according to the present invention is a User Equipment (UE) including a transmission and/or reception unit, and a controller, wherein the transmission and/or reception unit receives a Protocol Data Unit (PDU) session establishment reject message from a control apparatus in a Protocol Data Unit (PDU) session establishment procedure, the controller starts a back-off timer using a back-off timer value in a case that first information and the back-off timer value are included in the PDU session establishment reject message and a certain piece of Single Network Slice Selection Assistance information (S-NSSAI) is provided during the PDU session establishment procedure, the first information is a cause value indicating that a resource for a specific slice is insufficient, in a case that the first information and second identification information are included in the PDU session establishment reject message, the second identification information indicating that the back-off timer is applied to every Public Land Mobile Network (PLMN), the controller configures the transmission and/or reception unit to not transmit another PDU session establishment request message or another PDU session modification request message for the certain piece of S-NSSAI in every PLMN while the back-off timer is running, and in a case that the first information and the second identification information are included in the PDU session establishment reject message, the second identification information indicating that the back-off timer is applied to a registered PLMN, the transmission and/or reception unit configures the transmission and/or reception unit to not transmit another PDU session establishment request message or another PDU session modification request message for the certain piece of S-NSSAI in the registered PLMN while the back-off timer is running.

Advantageous Effects of Invention

According to one aspect of the present invention, a terminal apparatus constituting the 5GS and an apparatus in a core network perform a management process such as the congestion control for different systems for each terminal apparatus-initiated network slice and/or DNN.

DESCRIPTION OF EMBODIMENTS

A preferred embodiment for carrying out the present invention will be described below with reference to the drawings. Note that, as an example, an embodiment of a mobile communication system to which the present invention is applied will be described in the present embodiment.

1. SYSTEM OVERVIEW

Figure 1:
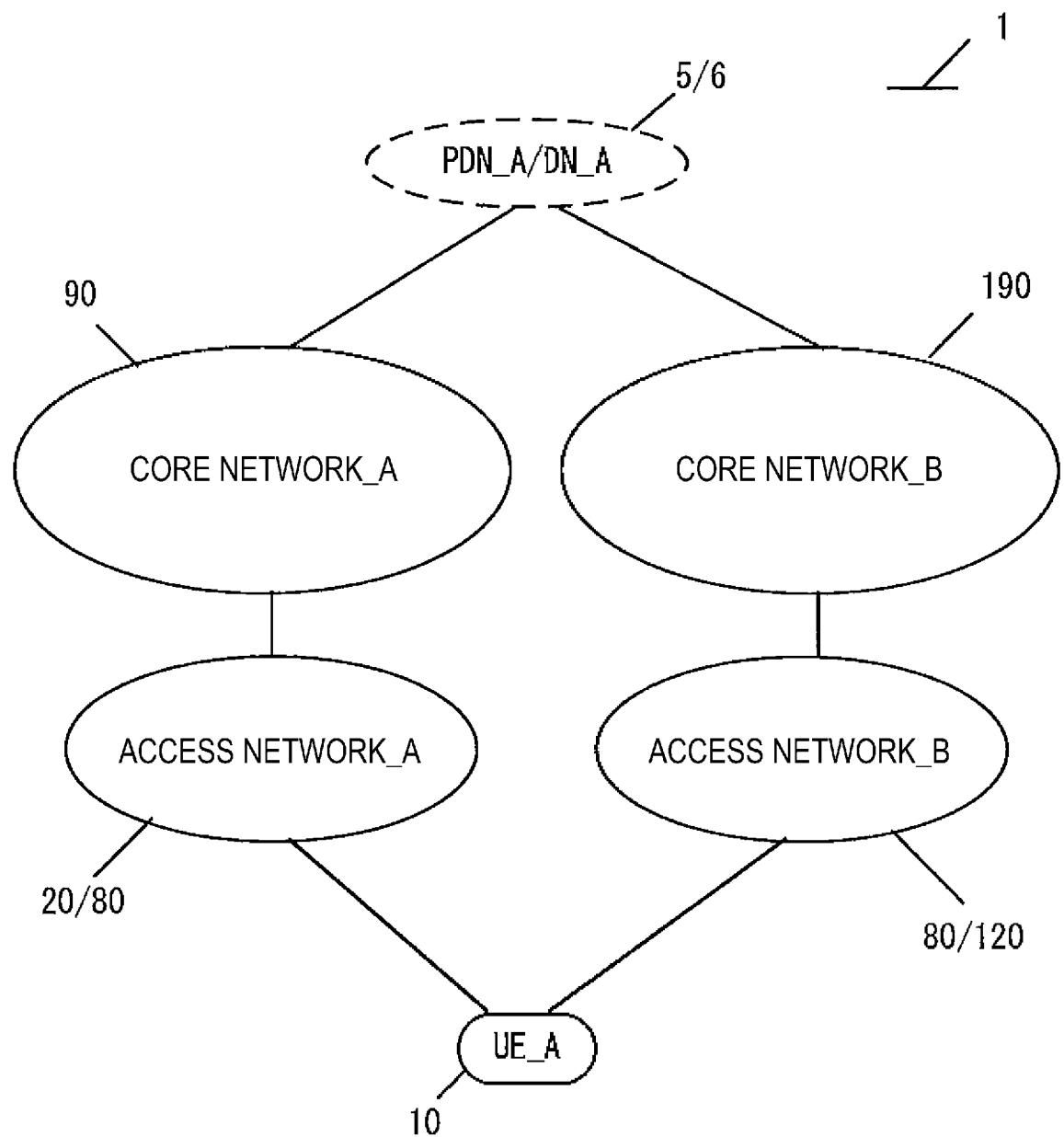
FIG. 1 is a diagram illustrating an overview of a mobile communication system.
Figure 2:
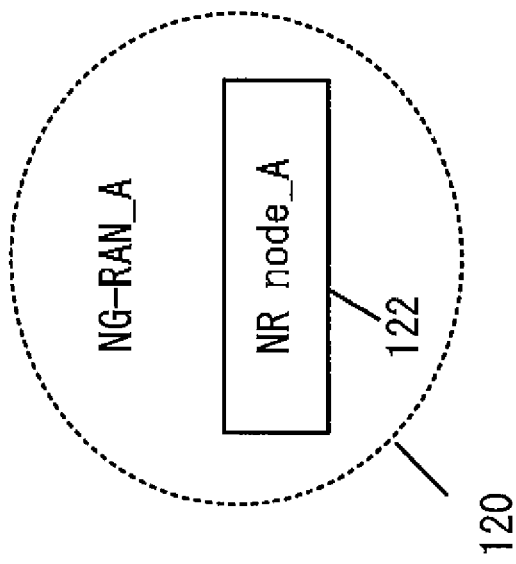
FIG. 2 is a diagram illustrating an example of a configuration and the like of access networks in the mobile communication system.
Figure 2:
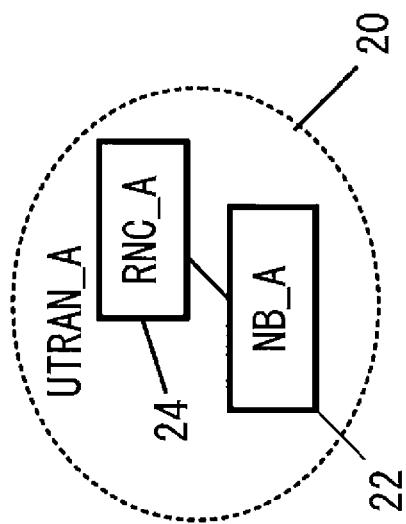
Figure 2:
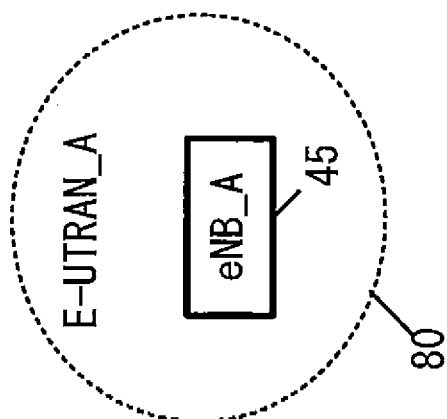
Figure 3:
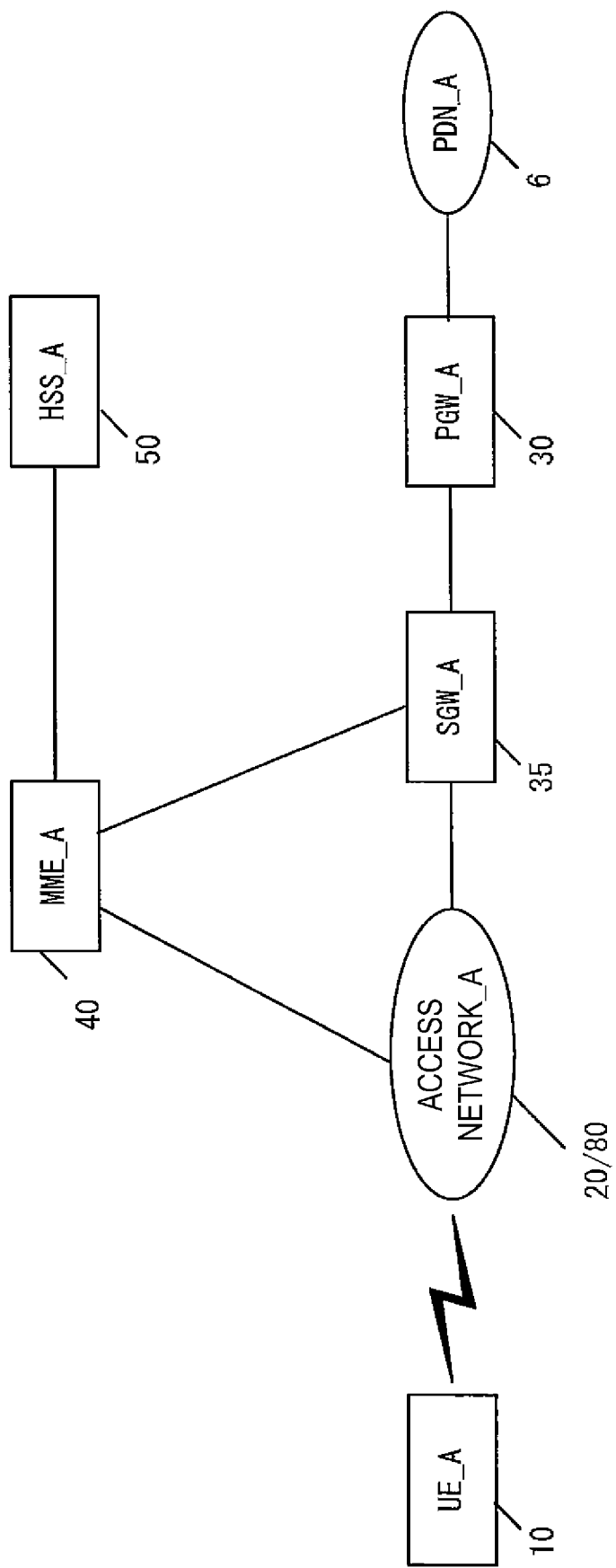
FIG. 3 is a diagram illustrating an example of a configuration or the like of a core network_A in the mobile communication system.
Figure 4:
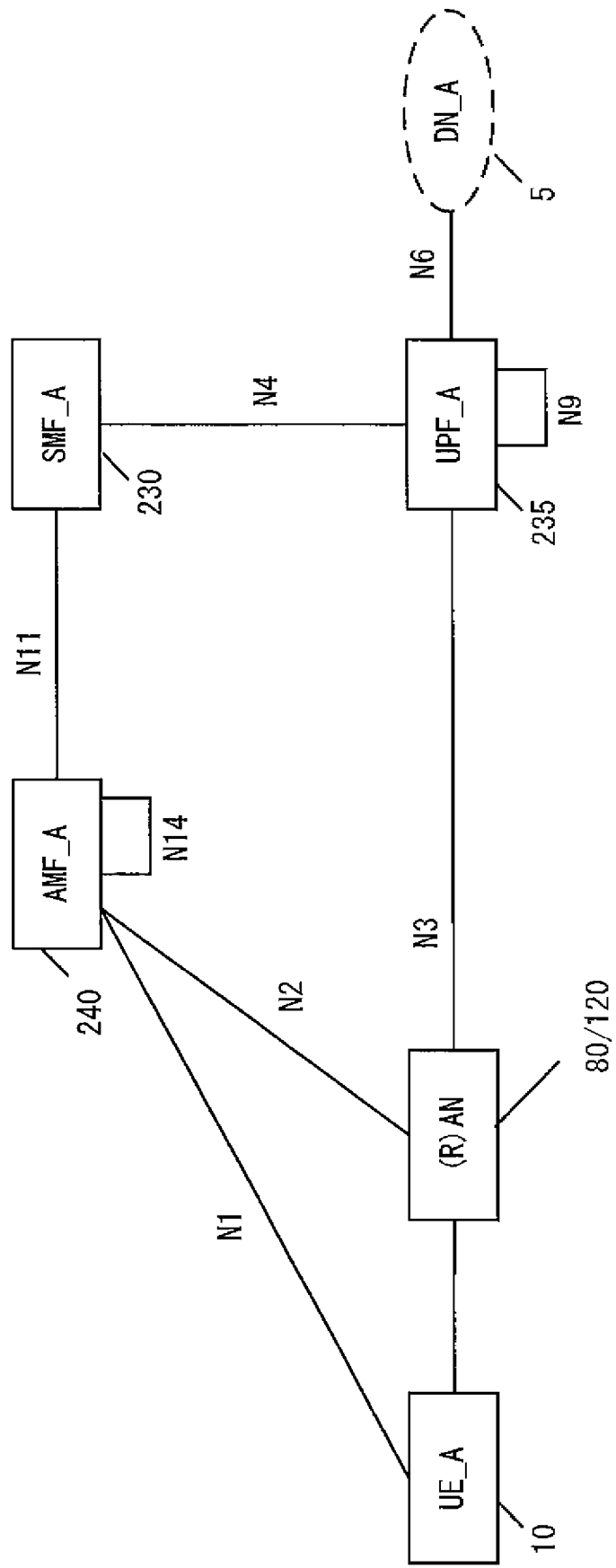
FIG. 4 is a diagram illustrating an example of a configuration or the like of a core network_B in the mobile communication system.

An overview of a mobile communication system according to the present embodiment will be described with reference to FIG. 1, FIG. 2, FIG. 3, and FIG. 4. FIG. 2 is a diagram for detailing access networks in the mobile communication system of FIG. 1. FIG. 3 is a diagram for mainly detailing a core network_A 90 in the mobile communication system of FIG. 1. FIG. 4 is a diagram for mainly detailing a core network_B 190 in the mobile communication system of FIG. 1. As illustrated in FIG. 1, a mobile communication system 1 according to the present embodiment includes a terminal apparatus (also referred to as a user apparatus or a mobile terminal apparatus), a UE (User Equipment)_A 10, an Access Network (AN)_A, an access network_B, a Core Network (CN)_A 90, a core network_B 190, and a Packet Data Network (PDN)_A 6, and a Data Network (DN)_A 5. Note that a combination of the access network_A and the core network_A 90 may be referred to as an Evolved Packet System (EPS) (4G mobile communication system), a combination of the access network_B, the core network_B 190, and the UE_A 10 may be referred to as the 5G System (5GS) (5G mobile communication system), or the configurations of the 5GS and the EPS need not necessarily be limited thereto. Note that, for the sake of simplicity, the core network_A 90, the core network_B 190, or a combination thereof may also be referred to as a core network, the access network_A, the access network_B, or a combination thereof may also be referred to as an access network or a radio access network, and the DN_A 5, the PDN_A 6, or a combination thereof may also be referred to as a DN.

Here, the UE_A 10 may be an apparatus that can connect to a network service via 3GPP access (also referred to as 3GPP access or a 3GPP access network) and/or non-3GPP access (also referred to as non-3GPP access or a non-3GPP access network). In addition, the UE_A 10 may also include a Universal Integrated Circuit Card (UICC) and an embedded UICC (eUICC). Furthermore, the UE_A 10 may be a wirelessly connectable terminal apparatus and may be Mobile Equipment (ME), a Mobile Station (MS), a cellular Internet of Things (CIoT) terminal (CIoT UE), or the like.

In addition, the UE_A 10 can be connected to an access network and/or core network. In addition, the UE_A 10 can be connected to the DN_A and/or the PDN_A via the access network and/or the core network. The UE_A 10 transmits and/or receives (communicates) user data to and/or from the DN_A and/or the PDN_A by using a Protocol Data Unit or Packet Data Unit (PDU) session and/or a Packet Data Network (PDN) connection (also referred to as a PDN connection). Furthermore, the communication of the user data is not limited to Internet Protocol (IP) communication (IPv4 or IPv6), and may be, for example, non-IP communication in the EPS, or Ethernet communication (trade name) or Unstructured communication in the 5GS.

Here, IP communication is data communication using IP, and is data communication achieved by transmitting and/or receiving an IP packet including an IP header. Note that a payload section constituting the IP packet may include the user data transmitted and/or received by the UE_A 10. Furthermore, non-IP communication is data communication without using IP, and is data communication achieved by transmitting and/or receiving data without IP header. For example, the non-IP communication may be the data communication achieved through transmitting and/or receiving application data not given the IP address, or may transmit and/or receive the user data transmitted and/or received by the UE_A 10, the user data being given another header such as a MAC header and an Ethernet (trade name) frame header.

Also, the PDU session is connectivity established between the UE_A 10 and the DN_A 5 to provide a PDU connection service. To be more specific, the PDU session may be connectivity established between the UE_A 10 and an external gateway. Here, the external gateway may be a UPF, a Packet Data Network Gateway (PGW), and the like. Furthermore, the PDU session may be a communication path established to transmit and/or receive the user data between the UE_A 10 and the core network and/or the DN, or a communication path established to transmit and/or receive the PDU. Furthermore, the PDU session may be a session established between the UE_A 10 and the core network and/or the DN, or may be a logical communication path including a transfer path such as one or more bearers between the apparatuses in the mobile communication system 1. To be more specific, the PDU session may be a connection established by the UE_A 10 between the core network_B 190 and/or the external gateway, or may be a connection established between the UE_A 10 and the UPF. Furthermore, the PDU session may be connectivity and/or a connection between the UE_A 10 and a UPF_A 235 via an NR node_A 122. Furthermore, the PDU session may be identified by a PDU session ID and/or an EPS bearer ID.

Note that the UE_A 10 can transmit and/or receive the user data to and/or from an apparatus, such as an application server, that is located in the DN_A 5 by using the PDU session. In other words, the PDU session can transfer the user data transmitted and/or received between the UE_A 10 and the apparatus, such as the application server, that is located in the DN_A 5. Furthermore, each apparatus (the UE_A 10, an apparatus in the access network, and/or an apparatus in the core network and/or an apparatus in the data network) may correlate one or more pieces of identification information to the PDU session for management. Note that these pieces of identification information may include at least one of an Access Point Name (APN), a Traffic Flow Template (TFT), a session type, application identification information, identification information of the DN_A 5, Network Slice Instance (NSI) identification information, Dedicated Core Network (DCN) identification information, and access network identification information, or may further include other information. Furthermore, in a case that multiple PDU sessions are established, respective pieces of identification information correlated to the PDU sessions may be the same contents or may be different contents. Furthermore, the NSI identification information is information for identifying an NSI, and hereinafter may be an NSI ID or a Slice Instance ID.

In addition, the access network_A and the access network_B may be any of a Universal Terrestrial Radio Access Network (UTRAN)_A 20, an Evolved Universal Terrestrial Radio Access Network (E-UTRAN)_A 80, and a NG-RAN (5G-RAN)_A 120 as illustrated in FIG. 2. Note that hereinafter, the UTRAN_A 20 and/or E-UTRAN_A 80 and/or the NG-RAN_A 120 may be referred to as a 3GPP access or a 3GPP access network, and the wireless LAN access network or the non-3GPP AN may be referred to as a non-3GPP access or a non-3GPP access network. Each radio access network includes an apparatus to which the UE_A 10 is actually connected (e.g., a base station apparatus or an access point), and the like.

For example, the E-UTRAN_A 80 is an access network for Long Term Evolution (LTE) and configured to include one or more eNBs_A 45. The eNB_A 45 is a radio base station to which the UE_A 10 connects through Evolved Universal Terrestrial Radio Access (E-UTRA). Furthermore, in a case that multiple eNBs are present in the E-UTRAN_A 80, the multiple eNBs may be connected to each other.

Furthermore, the NG-RAN_A 120 is a 5G access network, may be a (R)AN illustrated in FIG. 4, and includes one or more New Radio Access Technology nodes (NR nodes)_A 122 and/or ng-eNBs. Note that the NR node_A 122 is a radio base station to which the UE_A 10 connects with the 5G radio access, and is also referred to as a gNB. Note that the ng-eNB may be an eNB (E-UTRA) constituting a 5G access network, may be connected to the core network_B 190 via the NR node_A, or may be directly connected to the core network_B 190. Also, in a case that there are multiple NR nodes_A 122 and/or the ng-eNBs in the NG-RAN_A 120, each of the NR nodes_A 122 and/or the ng-eNBs may be connected to one another.

Note that the NG-RAN_A 120 may be an access network configured in the E-UTRA and/or the 5G Radio Access. In other words, the NG-RAN_A 120 may include the eNB_A 45, the NR node_A 122, or both the eNB_A 45 and the NR node_A 122. In this case, the eNB_A 45 and the NR node_A 122 may be similar apparatuses. Therefore, the NR node_A 122 can be substituted with the eNB_A 45.

The UTRAN_A 20 is an access network for the 3G mobile communication system, and includes a Radio Network Controller (RNC)_A 24 and a Node B (NB)_A 22. The NB_A 22 is a radio base station to which the UE_A 10 connects through Universal Terrestrial Radio Access (UTRA), and the UTRAN_A 20 may include one or multiple radio base stations. Furthermore, the RNC_A 24 is a controller for connecting the core network_A 90 and the NB_A 22, and the UTRAN_A 20 may be configured to include one or multiple RNCs. Moreover, the RNC_A 24 may be connected to one or multiple NBs_A 22.

Note that, in the present specification, the expression "the UE_A 10 is connected to each radio access network" is equivalent to "the UE_A 10 is connected to a base station apparatus, an access point, or the like included in each radio access network," and is equivalent to "transmitted and/or received data, signals, and the like are also transferred through the base station apparatus and the access point". Note that control messages transmitted and/or received between the UE_A 10 and the core network_B 190 may be the same control message, regardless of a type of the access network. Therefore, the expression "the UE_A 10 and the core network_B 190 transmit and/or receive a message to and/or from each other via the NR node_A 122" may be equivalent to "the UE_A 10 and the core network_B 190 transmit a message to each other via the eNB_A 45".

Furthermore, the access network is a radio network connecting with the UE_A 10 and/or the core network. The access network may be a 3GPP access network, or a non-3GPP access network. Note that the 3GPP access network may be the UTRAN_A 20, the E-UTRAN_A 80, and the NG-Radio Access Network (RAN)_A 120, and the non-3GPP access network may be the wireless LAN access point (WLAN AN). Note that the UE_A 10 may connect to the access network or to the core network via the access network in order to connect to the core network.

Moreover, the DN_A 5 and the PDN_A 6 are Data Networks that provide communication services to the UE_A 10, may be configured as packet data service networks, and may be configured for each service. Furthermore, the DN_A 5 may include a connected communication terminal. Therefore, connecting with the DN_A 5 may be connecting with the communication terminal or a server device located in the DN_A 5. Furthermore, the transmission and/or reception of the user data to and/or from the DN_A 5 may be transmission and/or reception of the user data to and/or from the communication terminal or server device located in the DN_A 5. In addition, although the DN_A 5 is outside the core networks in FIG. 1, the DN_A 5 may be within the core networks.

Furthermore, the core network_A 90 and/or the core network_B 190 may be configured as apparatuses in one or more core networks. Here, the apparatuses in the core networks may be apparatuses that perform part or all of processes or functions of apparatuses included in the core network_A 90 and/or the core network_B 190. Note that the apparatuses in the core network may be referred to as core network apparatuses.

Furthermore, the core network is an IP mobile communication network, operated by a Mobile Network Operator (MNO), that connects to the access network and/or the DN. The core network may be a core network for a mobile communication operator that operates and manages the mobile communication system 1, or may be a core network for a virtual mobile communication operator such as a Mobile Virtual Network Operator (MVNO) and a Mobile Virtual Network Enabler (MVNE), or a virtual mobile communication service provider. Note that the core network_A 90 may be an Evolved Packet Core (EPC) constituting an Evolved Packet System (EPS), and the core network_B 190 may be a 5G Core Network (5GC) constituting a 5GS. Furthermore, the core network_B 190 may be a core network for a system providing the 5G communication service. Conversely, the EPC may be the core network_A 90, and the 5GC may be the core network_B 190. Note that the core network_A 90 and/or the core network_B 190 is not limited to the above, and may be a network for providing a mobile communication service.

Next, the core network_A 90 will be described. The core network_A 90 may include at least one of a Home Subscriber Server (HSS)_A 50, an Authentication Authorization Accounting (AAA), a Policy and Charging Rules Function (PCRF), the PGW_A 30, an ePDG, the SGW_A 35, the Mobility Management Entity (MME)_A 40, a Serving GPRS Support Node (SGSN), and an SCEF. Furthermore, these may also be configured as Network Functions (NFs). The NF may be a processing function included in a network. In addition, the core network_A 90 is capable of connecting to multiple radio access networks (the UTRAN_A 20, the E-UTRAN_A 80).

Although only the HSS (HSS_A 50), the PGW (PGW_A 30), the SGW (SGW_A 35), and the MME (MME_A 40) among the network elements are described in FIG. 3 for simplicity, it does not mean that no other apparatuses and/or NFs are included therein. Note that the UE_A 10 will also be referred to as UE, the HSS_A 50 as an HSS, the PGW_A 30 as a PGW, the SGW_A 35 as an SGW, the MME_A 40 as an MME, and the DN_A 5 and/or the PDN_A 6 as a DN or a PDN for simplicity.

The following briefly describes each apparatus included in the core network_A 90.

The PGW_A 30 is a relay apparatus that is connected to the DN, the SGW_A 35, the ePDG, the WLAN ANa 70, the PCRF, and the AAA, and transfers the user data as a gateway between the DN (the DN_A 5 and/or the PDN_A 6) and the core network_A 90. Note that the PGW_A 30 may serve as a gateway for the IP communication and/or non-IP communication. Furthermore, the PGW_A 30 may have a function to transfer the IP communication, or may have a function to perform conversion between the non-IP communication and the IP communication. Note that multiple gateways like this may be deployed in the core network_A 90. Furthermore, the multiple gateways deployed may serve as gateways for connecting the core network_A 90 with a single DN.

Note that a User Plane (U-Plane or UP) may be a communication path for transmitting and/or receiving user data, and may include multiple bearers. Furthermore, a Control Plane (C-Plane or CP) may be a communication path for transmitting and/or receiving a control message, and may include multiple bearers.

Further, the PGW_A 30 may be connected to the SGW, the DN, and a User Plane Function (UPF) and/or a Session Management Function (SMF), or may be connected to the UE_A 10 via the U-Plane. Furthermore, the PGW_A 30 may be configured integrally with the UPF_A 235 and/or the SMF_A 230.

The SGW_A 35 is a relay apparatus that is connected to the PGW_A 30, the MME_A 40, the E-UTRAN_A 80, the SGSN, and the UTRAN_A 20, and transfers the user data as a gateway between the core network_A 90 and the 3GPP access networks (the UTRAN_A 20, a GERAN, and the E-UTRAN_A 80).

The MME_A 40 is a control apparatus that is connected to the SGW_A 35, the access network, the HSS_A 50, and the SCEF, and performs location information management including mobility management of the UE_A 10 via the access network, and access control. Furthermore, the MME_A 40 may include a function as a session management device to manage a session established by the UE_A 10. Multiple control apparatuses like this may be deployed in the core network_A 90, and, for example, a location management apparatus different from the MME_A 40 may be configured. Like the MME_A 40, the location management apparatus different from the MME_A 40 may be connected to the SGW_A 35, the access network, the SCEF, and the HSS_A 50. Furthermore, the MME_A 40 may be connected to an Access and Mobility Management Function (AMF).

Furthermore, in a case that multiple MMEs are included in the core network_A 90, the multiple MMEs may be connected to each other. With this configuration, a context of the UE_A 10 may be transmitted and/or received between the MMEs. In this way, the MME_A 40 is a management apparatus to transmit and/or receive the control information related to the mobility management and the session management to and/or from the UE_A 10. In other words, the MME_A 40 may be a control apparatus for a Control Plane (C-Plane; CP).

The example is described in which the MME_A 40 is configured to be included in the core network_A 90, but the MME_A 40 may be a management apparatus configured in one or multiple core networks, DCNs, or NSIs, or may be a management apparatus connected to one or multiple core networks, DCNs, or NSIs. Here, multiple DCNs or NSIs may be operated by a single network operator, or by different network operators respectively.

The MME_A 40 may be a relay apparatus for transferring the user data as a gateway between the core network_A 90 and the access network. Note that the user data transmitted and/or received by the MME_A 40 serving as a gateway may be small data.

Furthermore, the MME_A 40 may be an NF having a function of the mobility management of the UE_A 10 or the like, or an NF managing one or multiple NSIs. The MME_A 40 may be an NF having one or multiple of these functions. Note that the NF may be one or multiple apparatuses deployed in the core network_A 90, a CP function (hereinafter, also referred to as a Control Plane Function (CPF) or a Control Plane Network Function) for the control information and/or control message, or a common CP function shared between multiple network slices.

Here, the NF is a processing function included in a network. That is, the NF may be a function apparatus such as an MME, an SGW, a PGW, a CPF, an AMF, an SMF, or a UPF, or may be a function such as mobility management (MM) and session management (SM), or capability information. The NF may be a function device to realize a single function, or a function device to realize multiple functions. For example, an NF to realize the MM function and an NF to realize the SM function may be separately present, or an NF to realize both the MM function and the SM function may be present.

The HSS_A 50 is a managing node that is connected to the MME_A 40, the AAA, and the SCEF, and manages subscriber information. The subscriber information of the HSS_A 50 is referred to during the access control performed by the MME_A 40, for example. Furthermore, the HSS_A 50 may be connected to a location management device different from the MME_A 40. For example, the HSS_A 50 may be connected to the CPF_A 140.

Furthermore, the HSS_A 50, a Unified Data Management (UDM)_A 245 may be configured as different apparatuses and/or NFs or the same apparatus and/or NF.

The AAA is connected to the PGW 30, the HSS_A 50, the PCRF, and the WLAN ANa 70 and performs access control for the UE_A 10 connected via the WLAN ANa 70.

The PCRF is connected to the PGW_A 30, the WLAN ANa 75, the AAA, the DN_A 5 and/or the PDN_A 6 and performs QoS management on data delivery. For example, the PCRF manages QoS of a communication path between the UE_A 10, the DN_A 5, and/or the PDN_A 6. Furthermore, the PCRF may be an apparatus to create and/or manage a Policy and Charging Control (PCC) rule and/or a routing rule used by each apparatus for transmitting and/or receiving user data.

In addition, the PCRF may be a PCF to create and/or manage a policy. More specifically, the PCRF may be connected to the UPF_A 235.

The ePDG is connected to the PGW 30 and the WLAN ANb 75 and delivers user data as a gateway between the core network_A 90 and the WLAN ANb 75.

The SGSN is a control apparatus, connected to the UTRAN_A 20, the GERAN, and the SGW_A 35, for performing location management between the 3G/2G access networks (UTRAN/GERAN) and the LTE (4G) access network (E-UTRAN). In addition, the SGSN has functions of selecting the PGW and the SGW, managing a time zone of the UE_A 10, and selecting the MME_A 40 at the time of handover to the E-UTRAN.

The SCEF is a relay apparatus that is connected to the DN_A 5 and/or the PDN_A 6, the MME_A 40, and the HSS_A 50 and transfers the user data as a gateway for connecting the DN_A 5 and/or the PDN_A 6 with the core network_A 90. Note that the SCEF may serve as a gateway for non-IP communication. Furthermore, the SCEF may have a function to perform conversion between non-IP communication and IP communication. Multiple gateways like this may be deployed in the core network_A 90. Furthermore, multiple gateways connecting the core network_A 90 with a single DN_A 5 and/or PDN_A 6 and/or DN may be also deployed. Note that the SCEF may be outside or inside the core network.

Next, the core network_B 190 will be described. The core network_B 190 may include at least one of an Authentication Server Function (AUSF), an Access and Mobility Management Function (AMF)_A 240, an Unstructured Data Storage Network Function (UDSF), a Network Exposure Function (NEF), a Network Repository Function (NRF), a Policy Control Function (PCF), a Session Management Function (SMF)_A 230, a Unified Data Management (UDM), a User Plane Function (UPF)_A 235, an Application Function (AF), and a Non-3GPP InterWorking Function (N3IWF). Furthermore, these may also be configured as Network Functions (NFs). The NF may be a processing function included in a network.

Although only the AMF (AMF_A 240), the SMF (SMF_A 230), and the UPF (UPF_A 235) are illustrated in FIG. 4 among the above elements for simplicity, it does not mean that no other elements (apparatuses and/or Network Functions (NFs)) are included therein. Note that the UE_A 10 is also referred to as the UE, the AMF_A 240 as the AMF, the SMF_A 230 as the SMF, the UPF_A 235 as the UPF, and the DN_A 5 as the DN for simplicity.

In addition, FIG. 4 illustrates an N1 interface (hereinafter, also referred to as a reference point), an N2 interface, an N3 interface, an N4 interface, an N6 interface, an N9 interface, and an N11 interface. Here, the N1 interface is an interface between the UE and the AMF, the N2 interface is an interface between the (R) access network (AN) and the AMF, and the N3 interface is an interface between the (R) access network (AN) and the UPF, the N4 interface is an interface between the SMF and the UPF, the N6 interface is an interface between the UPF and the DN, the N9 interface is an interface between the UPF and the UPF, and the N11 interface is an interface between the AMF and the SMF. These interfaces can be used to perform communication between the apparatuses. Here, the (R)AN is hereinafter also referred to as a NG RAN.

The following briefly describes each apparatus included in the core network_B 190.

First, the AMF_A 240 is connected to another AMF, the SMF (SMF_A 230), the access network (i.e., the UTRAN_A 20, the E-UTRAN_A 80, the NG-RAN_A 120), the UDM, the AUSF, and the PCF. The AMF_A 240 may play roles of registration management, connection management, reachability management, mobility management of the UE_A 10 or the like, transfer of a Session Management (SM) message between the UE and the SMF, access authentication or access authorization, a Security Anchor Function (SEA), Security Context Management (SCM), support for the N2 interface for the N3IWF, support for transmission and/or reception of NAS signals to and/or from the UE via the N3IWF, authentication of the UE connected via the N3IWF, management of Registration Management (RM) states, management of Connection Management (CM) states, and the like. In addition, one or more AMFs_A 240 may be deployed within the core network_B 190. In addition, the AMF_A 240 may be an NF that manages one or more Network Slice Instances (NSI). In addition, the AMF_A 240 may also be a Common Control Plane Network Function (Common CPNF, or CCNF) shared among multiple NSIs.

Additionally, the RM state includes a deregistered state (RM-DEREGISTERED state) and a registered state (RM-REGISTERED state). In the RM-DEREGISTERED state, the UE is not registered in the network, and thus the AMF is not able to reach the UE because the UE context in the AMF does not have valid location information and routing information for the UE. In the RM-REGISTERED state, the UE is registered in the network, and thus the UE can receive services that requires registration with the network.

Additionally, the CM state includes a disconnected state (CM-IDLE state) and a connected state (CM-CONNECTED state). In the CM-IDLE state, the UE is in the RM-REGISTERED state but does not have a NAS signaling connection established between the AMF and the UE via the N1 interface. Also, in the CM-IDLE state, the UE does not have an N2 interface connection (N2 connection) and an N3 interface connection (N3 connection). On the other hand, in the CM-CONNECTED state, the UE has the NAS signaling connection established between the AMF and the UE via the N1 interface. Also, in the CM-CONNECTED state, the UE may have the N2 interface connection (N2 connection) and/or the N3 interface connection (N3 connection).

The SMF_A 230 may have a function for Session Management (SM) of a PDU session or the like, IP address allocation for the UE and a function for management thereof, a UPF selection and control function, a UPF configuration function for routing traffic to an appropriate destination, a function for reporting arrival of downlink data (Downlink Data Notification), a function for providing SM information specific to an AN (for each AN) transmitted to the AN via the AMF through the N2 interface, a function for determining a Session and Service Continuity mode (SSC mode) for a session, a roaming function, and the like. The SMF_A 230 may be connected to the AMF_A 240, the UPF_A 235, the UDM, and the PCF.

The UPF_A 235 is connected to the DN_A 5, the SMF_A 230, another UPF, and the access networks (i.e., the UTRAN_A 20, the E-UTRAN_A 80, and the NG-RAN_A 120). The UPF_A 235 may play roles of an anchor to intra-RAT mobility or inter-RAT mobility, packet routing & forwarding, an uplink classifier (UL CL) function to support routing of multiple traffic flows for one DN, a branching point function to support a multi-homed PDU session, QoS processing for a user plane, verification of uplink traffic, buffering of downlink packets, a function of triggering downlink data notification, and the like. Furthermore, the UPF_A 235 may be a relay apparatus that transfers the user data as a gateway between the DN_A 5 and the core network_B 190. Note that the UPF_A 235 may serve as a gateway for IP communication and/or non-IP communication. Furthermore, the UPF_A 235 may have a function of transferring IP communication or a function to perform conversion between non-IP communication and IP communication. The multiple gateways deployed may serve as gateways for connecting the core network_B 190 with a single DN. Note that the UPF_A 235 may have connectivity with another NF or may be connected to each apparatus via another NF.

Note that a UPF_C 239 (also referred to as a branching point or an uplink classifier) that is a UPF different from the UPF_A 235 may be present between the UPF_A 235 and the access network as an apparatus or an NF. In a case that the UPF_C 239 is present, the PDU session between the UE_A 10 and the DN_A 5 is established via the access network, the UPF_C 239, and the UPF_A 235.

Additionally, the AUSF is connected to the UDM and the AMF_A 240. The AUSF functions as an authentication server.

The UDSF provides a function for all NFs to store or retrieve information as unstructured data.

The NEF provides a means to securely provide services and capabilities provided by the 3GPP network. The NEF stores information received from another NF as structured data.

In a case that a NF discovery request is received from a NF instance, the NRF provides the NF with information of found NF instances or holds information of available NF instances or services supported by the instances.

The PCF is connected to the SMF (the SMF_A 230), the AF, and the AMF_A 240. The PCF provides a policy rule and the like.

The UDM is connected to the AMF_A 240, the SMF (SMF_A 230), the AUSF, and the PCF. The UDM includes a UDM FE (application front end) and a User Data Repository (UDR). The UDM FE performs processing of authentication information (credentials), location management, subscriber management (subscription management), and the like. The UDR stores data necessary for the UDM FE for provision and the policy profile necessary for the PCF.

The AF is connected to the PCF. The AF affects traffic routing or is involved in the policy control.

The N3IWF provides functions of establishing an IPsec tunnel with the UE, relaying NAS (N1) signaling between the UE and the AMF, processing N2 signaling transmitted from the SMF and relayed by the AMF, establishing IPsec Security Association (IPsec SA), relaying user plane packets between the UE and the UPF, selecting the AMF, and the like.

An S1 mode is a UE mode capable of transmitting and/or receiving messages using an S1 interface. Note that the S1 interface may include an S1-MME interface, an S1-U interface, and an X2 interface connecting between the radio base stations.

The UE in the S1 mode can access the EPC via the eNB providing an E-UTRA function and access the EPC via an en-gNB providing an NR function, for example.

Note that the access to the EPC via the eNB providing the E-UTRA function and the access to the EPC via the en-gNB providing the NR function are designated as the S1 modes, but may be configured as separate and different modes.

An N1 mode is a UE mode in which the UE can access the 5GC via the 5G access network. The N1 mode may be a UE mode capable of transmitting and/or receiving messages using the N1 interface. Note that the N1 interface may include an Xn interface that connects between the N1 interface and the radio base station.

The UE in the N1 mode can access the 5GC via the ng-eNB providing the E-UTRA function and access the 5GC via the gNB providing the NR function, for example.

Note that the access to the 5GC via the ng-eNB providing the E-UTRA function and the access to the 5GC via the gNB providing the NR function are designated as the N1 modes, but may be configured as separate and different modes.

1.2. Configuration of Each Apparatus

The configuration of each apparatus will be described below. Note that some or all of apparatuses to be described below and functions of units of the apparatuses may operate on physical hardware, or logical hardware which is virtually configured on general-purpose hardware.

1.2.1. Configuration of UE

Figure 5:
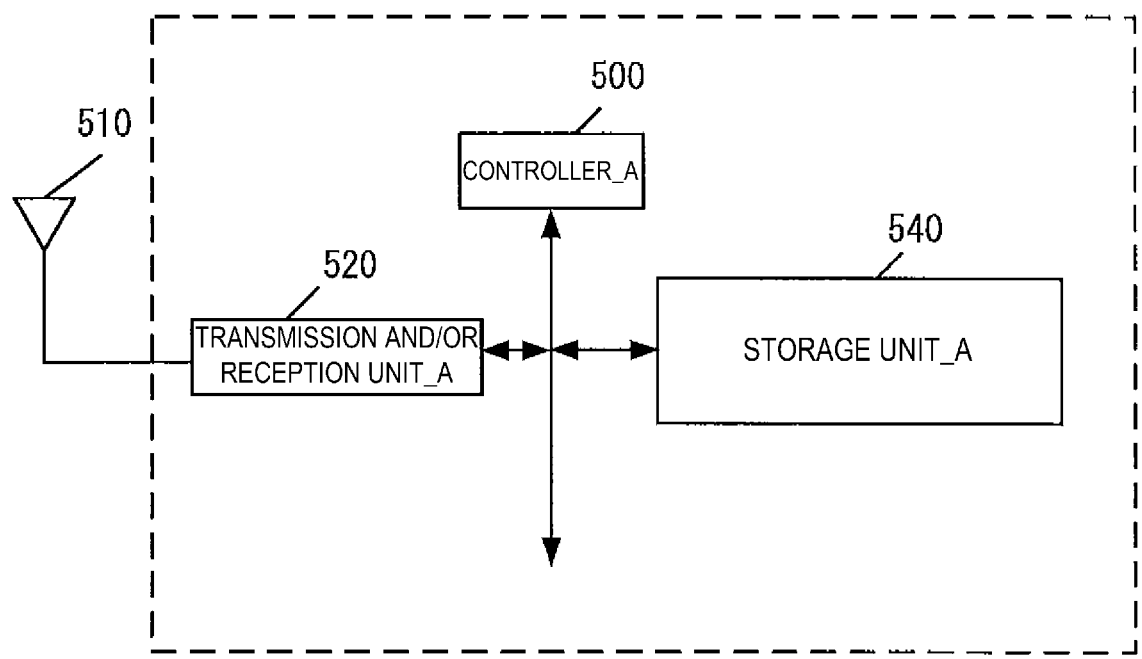
FIG. 5 is a diagram illustrating an apparatus configuration of a UE.

First, an example of an apparatus configuration of the UE_A 10 is illustrated in FIG. 5. As illustrated in FIG. 5, the UE_A 10 includes a controller_A 500, a transmission and/or reception unit_A 520, and a storage unit_A 540. The transmission and/or reception unit_A 520 and the storage unit_A 540 are connected to the controller_A 500 via a bus. Furthermore, an external antenna 410 is connected to the transmission and/or reception unit_A 520.

The controller_A 500 is a function unit for controlling the entire UE_A 10 and implements various processes of the entire UE_A 10 by reading out and performing various types of information and programs stored in the storage unit_A 540.

The transmission and/or reception unit_A 520 is a function unit through which the UE_A 10 connects to the base station (the UTRAN_A 20, the E-UTRAN_A 80, and the NG-RAN_A 120) and/or the wireless LAN access point (the WLAN AN) in the access network to connect to the access network. In other words, the UE_A 10 can connect to the base station and/or the access point in the access network via the external antenna 410 connected to the transmission and/or reception unit_A 520. To be specific, the UE_A 10 can transmit and/or receive user data and/or control information to and/or from the base station and/or the access point in the access network via the external antenna 410 connected to the transmission and/or reception unit_A 520.

The storage unit_A 540 is a function unit that stores programs, data, and the like necessary for each operation of the UE_A 10, and include, for example, a semiconductor memory, a Hard Disk Drive (HDD), a Solid State Drive (SSD), or the like. The storage unit_A 540 stores identification information, control information, a flag, a parameter, a rule, a policy, and the like included in a control message which is transmitted and/or received in the communication procedure described below.

1.2.2. eNB/NR Node

Figure 6:
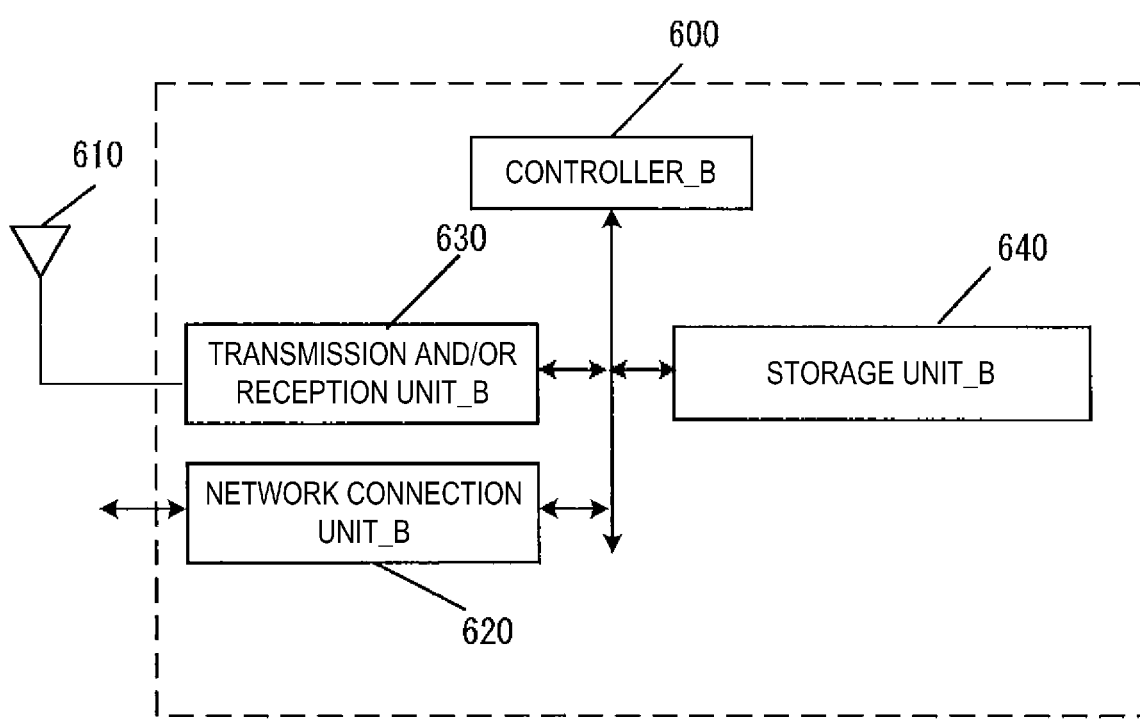
FIG. 6 is a diagram illustrating an apparatus configuration of an eNB/NR node.

Next, FIG. 6 illustrates an example of an apparatus configuration of the eNB_A 45 and the NR node_A 122. As illustrated in FIG. 6, the eNB_A 45 and the NR node_A 122 include a controller_B 600, a network connection unit_B 620, a transmission and/or reception unit_B 630, and a storage unit_B 640. The network connection unit_B 620, the transmission and/or reception unit_B 630, and the storage unit_B 640 are connected to the controller_B 600 via a bus. Furthermore, an external antenna 510 is connected to the transmission and/or reception unit_B 630.

The controller_B 600 is a function unit for controlling the entire eNB_A 45 and NR node_A 122, and implements various processes of the entire eNB_A 45 and NR node_A 122 by reading out and performing various types of information and programs stored in the storage unit_B 640.

The network connection unit_B 620 is a function unit through which the eNB_A 45 and the NR node_A 122 connect to the AMF_A 240 and the UPF_A 235 in the core network. In other words, the eNB_A 45 and the NR node_A 122 can be connected to the AMF_A 240 and the UPF_A 235 in the core network via the network connection unit_B 620. Specifically, the eNB_A 45 and the NR node_A 122 can transmit and/or receive user data and/or control information to and/or from the AMF_A 240 and/or the UPF_A 235 via the network connection unit_B 620.

The transmission and/or reception unit_B 630 is a function unit through which the eNB_A 45 and the NR node_A 122 connect to the UE_A 10. In other words, the eNB_A 45 and the NR node_A 122 can transmit and/or receive user data and/or control information to and/or from the UE_A 10 via the transmission and/or reception unit_B 630.

The storage unit_B 640 is a function unit for storing programs, data, and the like necessary for each operation of the eNB_A 45 and the NR node_A 122. The storage unit_B 640 includes, for example, a semiconductor memory, an HDD, an SSD, or the like. The storage unit_B 640 stores identification information, control information, a flag, a parameter, and the like included in a control message which is transmitted and/or received in the communication procedure described below. The storage unit_B 640 may store these pieces of information as the contexts for each UE_A 10.

1.2.3. Configuration of MME/AMF

Figure 7:
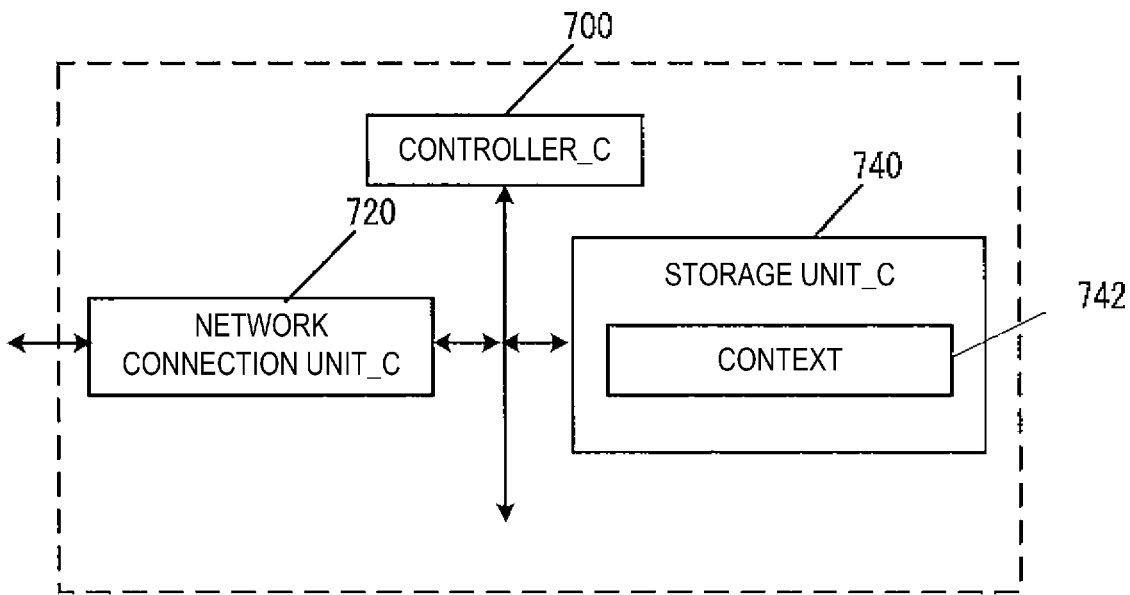
FIG. 7 is a diagram illustrating an apparatus configuration of an MME/AMF.

Next, FIG. 7 illustrates an example of an apparatus configuration of the MME_A 40 or the AMF_A 240. As illustrated in FIG. 7, the MME_A 40 or the AMF_A 240 include a controller_C 700, a network connection unit_C 720, and a storage unit_C 740. The network connection unit_C 720 and the storage unit_C 740 are connected to the controller_C 700 via a bus. Furthermore, the storage unit_C 740 stores a context 642.

The controller_C 700 is a function unit for controlling the entire MME_A 40 or AMF_A 240, and implements various processes of the entire AMF_A 240 by reading out and performing various types of information and programs stored in the storage unit_C 740.

The network connection unit_C 720 is a function unit through which the MME_A 40 or the AMF_A 240 connects to another MME_A 40 or AMF 240, the SMF_A 230, the base station (the UTRAN_A 20, the E-UTRAN_A 80, and the NG-RAN_A 120) and/or the wireless LAN access point (WLAN AN) in the access network, the UDM, the AUSF, and the PCF. In other words, the MME_A 40 or the AMF_A 240 can transmit and/or receive user data and/or control information to and/or from the base station and/or access point in the access network, the UDM, the AUSF, and the PCF via the network connection unit_C 720.

The storage unit_C 740 is a function unit for storing programs, data, and the like necessary for each operation of the MME_A 40 or the AMF_A 240. The storage unit_C 740 includes, for example, a semiconductor memory, an HDD, an SSD, or the like. The storage unit_C 740 stores identification information, control information, a flag, a parameter, and the like included in a control message which is transmitted and/or received in the communication procedure described below. Examples of the context 642 stored in the storage unit_C 740 may include a context stored for each UE, a context stored for each PDU session, and a context stored for each bearer. The context stored for each UE may include an IMSI, an MSISDN, MM State, a GUTI, a ME Identity, a UE radio access capability, a UE network capability, an MS network capability, an access restriction, an MME F-TEID, an SGW F-TEID, an eNB address, an MME UE S1AP ID, an eNB UE S1AP ID, an NR node address, an NR node ID, a WAG address, and a WAG ID. Furthermore, the context stored for each PDU session may include an APN in Use, an assigned session type, IP address(es), a PGW F-TEID, an SCEF ID, and a default bearer. Furthermore, the context stored for each bearer may include an EPS bearer ID, a TI, a TFT, an SGW F-TEID, a PGW F-TEID, an MME F-TEID, an eNB address, an NR node address, a WAG address, an eNB ID, an NR node ID, and a WAG ID.

1.2.4. Configuration of SMF

Figure 8:
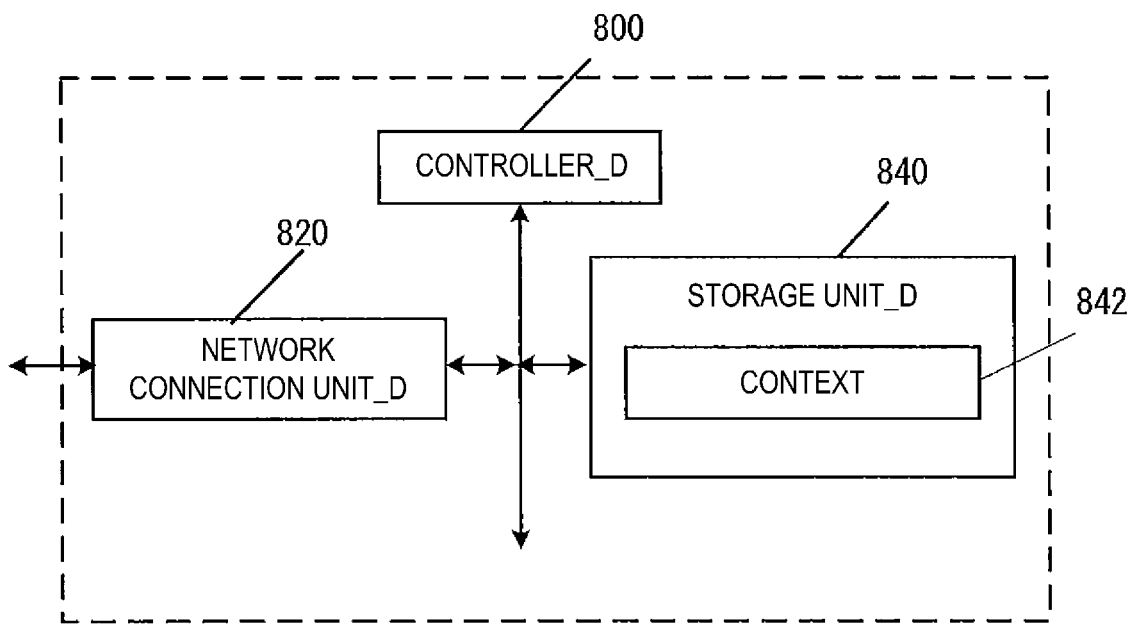
FIG. 8 is a diagram illustrating an apparatus configuration of an SMF/PGW/UPF.

Next, FIG. 8 illustrates an example of an apparatus configuration of the SMF_A 230. As illustrated in FIG. 8, the SMF_A 230 includes a controller_D 800, a network connection unit_D 820, and a storage unit_D 840. The network connection unit_D 820 and the storage unit_D 840 are connected to the controller_D 800 via a bus. In addition, the storage unit_D 840 stores a context 742.

The controller_D 800 of the SMF_A 230 is a function unit for controlling the entire SMF_A 230 and implements various processes of the entire SMF_A 230 by reading out and performing various types of information and programs stored in the storage unit_D 840.

The network connection unit_D 820 in the SMF_A 230 is a function unit for the SMF_A 230 to connect to the AMF_A 240, the UPF_A 235, the UDM, and the PCF. In other words, the SMF_A 230 can transmit and/or receive user data and/or control information to and/or from the AMF_A 240, the UPF_A 235, the UDM, and the PCF via the network connection unit_D 820.

Furthermore, the storage unit_D 840 in the SMF_A 230 is a function unit for storing programs, data, and the like necessary for each operation of the SMF_A 230. The storage unit_D 840 of the SMF_A 230 includes, for example, a semiconductor memory, an HDD, an SSD, or the like. The storage unit_D 840 of the SMF_A 230 stores identification information, control information, a flag, a parameter, and the like included in a control message which is transmitted and/or received in the communication procedure described below. In addition, examples of the context 742 stored in the storage unit_D 840 in the SMF_A 230 may include a context stored for each UE, a context stored for each APN, a context stored for each PDU session, and a context stored for each bearer. The context stored for each UE may include an IMSI, an ME Identity, an MSISDN, and a RAT type. The context stored for each APN may include an APN in use. Note that the context stored for each APN may be stored for each data network identifier. The context stored for each PDU session may include Assigned Session Type, IP Address(es), SGW F-TEID, PGW F-TEID, and Default Bearer. The context stored for each bearer may include an EPS bearer ID, a TFT, an SGW F-TEID, and a PGW F-TEID.

1.2.5. Configuration of PGW/UPF

Next, FIG. 8 illustrates an example of an apparatus configuration of the PGW_A 30 or the UPF_A 235. As illustrated in FIG. 8, each of the PGW_A 30 or the UPF_A 235 includes a controller_D 800, a network connection unit_D 820, and a storage unit_D 840. The network connection unit_D 820 and the storage unit_D 840 are connected to the controller_D 800 via a bus. In addition, the storage unit_D 840 stores a context 742.

The controller_D 800 in the PGW_A 30 or the UPF_A 235 is a function unit for controlling the entire PGW_A 30 or UPF_A 235, and implements various processes of the entire PGW_A 30 or UPF_A 235 by reading out and performing various types of information and programs stored in the storage unit_D 840.

The network connection unit_D 820 in the PGW_A 30 or the UPF_A 235 is a function unit for the PGW_A 30 or the UPF_A 235 to connect to the DN (that is, the DN_A 5), the SMF_A 230, another UPF_A 235, and the access network (that is, the UTRAN_A 20, the E-UTRAN_A 80, and the NG-RAN_A 120). In other words, the UPF_A 235 can transmit and/or receive user data and/or control information to and/or from the DN (that is, the DN_A 5), the SMF_A 230, another UPF_A 235, and the access network (that is, the UTRAN_A 20, the E-UTRAN_A 80, and the NG-RAN_A 120) via the network connection unit_D 820.

The storage unit_D 840 in the UPF_A 235 is a function unit for storing programs, data, and the like necessary for each operation of the UPF_A 235. The storage unit_D 840 in the UPF_A 235 includes, for example, a semiconductor memory, an HDD, an SSD, or the like. The storage unit_D 840 in the UPF_A 235 stores identification information, control information, a flag, a parameter, and the like included in the control message transmitted and/or received in a communication procedure described later. In addition, examples of the context 742 stored in the storage unit_D 840 in the UPF_A 235 may include a context stored for each UE, a context stored for each APN, a context stored for each PDU session, and a context stored for each bearer. The context stored for each UE may include an IMSI, an ME Identity, an MSISDN, and a RAT type. The context stored for each APN may include an APN in use. Note that the context stored for each APN may be stored for each data network identifier. The context stored for each PDU session may include Assigned Session Type, IP Address(es), SGW F-TEID, PGW F-TEID, and Default Bearer. The context stored for each bearer may include an EPS bearer ID, a TFT, an SGW F-TEID, and a PGW F-TEID.

1.2.6. Information Stored in Storage Unit of Each Apparatus

Next, each piece of information stored in the storage unit of each of the above-described apparatuses will be described.

An International Mobile Subscriber Identity (IMSI) is permanent identification information of a subscriber (user), and is identification information assigned to a user using the UE. The IMSI stored by the UE_A 10, the MME_A 40/CPF_A 140/AMF_A 2400, and the SGW_A 35 may be the same as the IMSI stored by an HSS_A 50.

The EMM State/MM State indicates a mobility management state of the UE_A 10 or the MME_A 40/CPF_A 140/AMF_A 240. For example, the EMM State/MM State may be an EMM-REGISTERED state (registered state) in which the UE_A 10 is registered in the network, and/or an EMM-DEREGISTERED state (deregistered state) in which the UE_A 10 is not registered in the network. The EMM State/MM State may be an ECM-CONNECTED state in which a connection is maintained between the UE_A 10 and the core network, and/or an ECM-IDLE state in which the connection is released. Note that the EMM State/MM State may be information for distinguishing a state in which the UE_A 10 is registered in the EPC from a state in which the UE_A 10 is registered in the NGC or 5GC.

The Globally Unique Temporary Identity (GUTI) is temporary identification information of the UE_A 10. The GUTI includes identification information (Globally Unique MME Identifier (GUMMEI)) of the MME_A 40/CPF_A 140/AMF_A 240 and identification information (M-Temporary Mobile Subscriber Identity (M-TMSI)) of the UE_A 10 in a particular MME_A 40/CPF_A 140/AMF_A 240. The ME Identity is an ID of the UE_A 10 or the ME, and may be International Mobile Equipment Identity (IMEI) or IMEI Software Version (IMEISV), for example. The MSISDN represents a basic phone number of the UE_A 10. The MSISDN stored by the MME_A 40/CPF_A 140/AMF_A 240 may be information indicated by the storage unit of the HSS_A 50. Note that the GUTI may include information for identifying the CPF_140.

The MME F-TEID is information for identifying the MME_A 40/CPF_A 140/AMF_A 240. The MME F-TEID may include an IP address of the MME_A 40/CPF_A 140/AMF_A 240, a Tunnel Endpoint Identifier (TEID) of the MME_A 40/CPF_A 140/AMF_A 240, or both of them. Furthermore, the IP address of the MME_A 40/CPF_A 140/AMF_A 240 and the TEID of the MME_A 40/CPF_A 140/AMF_A 240 may be stored independently of each other. The MME F-TEID may be identification information for user data, or identification information for control information.

The SGW F-TEID is information for identifying the SGW_A 35. The SGW F-TEID may include an IP address of the SGW_A 35, a TEID of the SGW_A 35, or both of them. The IP address of the SGW_A 35 and the TEID of the SGW_A 35 may be stored independently of each other. The SGW F-TEID may be identification information for user data, or identification information for control information.

The PGW F-TEID is information for identifying the PGW_A 30/UPGW_A 130/SMF_A 230/UPF_A 235. The PGW F-TEID may include an IP address of the PGW_A 30/UPGW_A 130/SMF_A 230/UPF_A 235, a TEID of the PGW_A 30/UPGW_A 130/SMF_A 230/UPF_A 235, or both of them. In addition, the IP address of the PGW_A 30/UPGW_A 130/SMF_A 230/UPF_A 235 and the TEID of the PGW_A 30/UPGW_A 130/SMF_A 230/UPF_A 235 may be stored independently of each other. The PGW F-TEID may be identification information for user data, or identification information for control information.

The eNB F-TEID is information for identifying the eNB_A 45. The eNB F-TEID may include an IP address of the eNB_A 45, a TEID of the eNB_A 45, or both of them. The IP address of the eNB_A 45 and the TEID of the SGW_A 35 may be stored independently of each other. The eNB F-TEID may be identification information for user data, or identification information for control information.

The APN may be identification information for identifying the core network and an external network such as the DN. Furthermore, the APN can also be used as information for selecting a gateway such as the PGW_A 30/UPGW_A 130/UPF_A 235 for connecting the core network A_90. Note that the APN may be a Data Network Name (DNN). Therefore, the APN may be represented by a DNN, or the DNN may be represented by the APN.

Note that the APN may be identification information for identifying such a gateway, or identification information for identifying an external network such as the DN. Note that, in a case that multiple gateways connecting the core network and the DN are deployed, there may be multiple gateways that can be selected according to the APN. Furthermore, one gateway may be selected among such multiple gateways by another method using identification information other than the APN.

The UE Radio Access Capability is identification information indicating a radio access capability of the UE_A 10. The UE Network Capability includes an algorithm of security supported by the UE_A 10 and a key derivation function. The MS Network Capability is information including, in the UE_A 10 having a function of a GERAN_A 25 and/or a UTRAN_A 20, one or more pieces of information necessary for an SGSN_A 42. The Access Restriction is registration information for access restriction. The eNB Address is an IP address of the eNB_A 45. The MME UE S1AP ID is information for identifying the UE_A 10 in the MME_A 40/CPF_A 140/AMF_A 240. The eNB UE S1AP ID is information for identifying the UE_A 10 in the eNB_A 45.

The APN in Use is an APN recently used. The APN in Use may be Data Network Identifier. This APN may include identification information of the network and identification information of a default operator. Furthermore, the APN in Use may be information for identifying a DN with which the PDU session is established.

The Assigned Session Type is information indicating a PDU session type. The Assigned Session Type may be Assigned PDN Type. The PDU session type may be IP, or non-IP. Furthermore, in a case that the PDU session type is IP, information indicating a PDN type assigned by the network may be further included. Note that the Assigned Session Type may be IPv4, IPv6, or IPv4v6.

Unless otherwise specifically described, the IP Address refers to the IP address assigned to the UE. The IP address may be an IPv4 address, an IPv6 address, an IPv6 prefix, or an interface ID. Note that in a case that the Assigned Session Type indicates non-IP, an element of the IP Address may not be included.

The DNN is identification information for identifying the core network_B 190 and an external network such as the DN. Furthermore, the DNN can also be used as information for selecting a gateway such as the UPGW_A 130 or the PF_A 235 connecting the core network_B 190.

Note that the DNN may be identification information for identifying such a gateway, or identification information for identifying an external network such as the DN. Note that, in a case that multiple gateways connecting the core network_B 190 and the DN are deployed, there may be multiple gateways that can be selected according to the DNN. Furthermore, one gateway may be selected among such multiple gateways by another method using identification information other than the DNN.

Furthermore, the DNN may be information equivalent to the APN, or different from the APN. Note that in a case that the DNN is the information different from the APN, each apparatus may manage information indicating correspondence between the DNN and the APN, perform a procedure to inquire the APN by using the DNN, or perform a procedure to inquire the DNN by using the APN.

SCEF ID is an IP address of an SCEF_A 46 used in the PDU session. The Default Bearer is information acquired and/or created in a case that a PDU session is established and is EPS bearer identification information for identifying a default bearer associated with the PDU session.

The EPS Bearer ID is identification information of the EPS bearer. The EPS Bearer ID may be identification information for identifying Signalling Radio Bearer (SRB) and/or Control-plane Radio bearer (CRB), or identification information for identifying Data Radio Bearer (DRB). The Transaction Identifier (TI) is identification information for identifying a bidirectional message flow (Transaction). Note that the EPS Bearer ID may be EPS bearer identification information for identifying a dedicated bearer. Therefore, the EPS bearer ID may be identification information for identifying the EPS bearer different from the default bearer. The TFT indicates all packet filters associated with the EPS bearer. The TFT is information for identifying some pieces of user data to be transmitted and/or received, and thus, the UE_A 10 uses the EPS bearer associated with the TFT to transmit and/or receive the user data identified by the TFT. In still other words, the UE_A 10 uses a Radio Bearer (RB) associated with the TFT to transmit and/or receive the user data identified by the TFT. The TFT may associate the user data such as application data to be transmitted and/or received with an appropriate transfer path, and may be identification information for identifying the application data. The UE_A 10 may use the default bearer to transmit and/or receive the user data which cannot be identified by the TFT. The UE_A 10 may store in advance the TFT associated with the default bearer.

The Default Bearer is EPS bearer identification information for identifying a default bearer associated with a PDU session. Note that the EPS bearer may be a logical communication path established between the UE_A 10 and the PGW_A 30/UPGW_A 130/UPF_A 235, or a communication path constituting the PDN connection/PDU session. Furthermore, the EPS bearer may be a default bearer, or a dedicated bearer. Furthermore, the EPS bearer may include an RB established between the UE_A 10 and the base station and/or the access point in the access network. Furthermore, the RB and the EPS bearer may be associated with each other on a one-to-one basis. Therefore, identification information of the RB may be associated with the identification information of the EPS bearer on a one-to-one basis, or may be the same identification information as the identification information of the EPS bearer. Note that the RB may be an SRB and/or a CRB, or a DRB. Furthermore, the Default Bearer may be information that the UE_A 10 and/or the SGW_A 35 and/or the PGW_A 30/UPGW_A 130/SMF_A 230/UPF_A 235 acquire from the core network in a case that the PDU session is established. Note that the default bearer is an EPS bearer first established during the PDN connection/PDU session, and is such an EPS bearer that only one bearer can be established during one PDN connection/PDU session. The default bearer may be an EPS bearer that can be used for communication of user data not associated with the TFT. The dedicated bearer is an EPS bearer established after the default bearer is established during the PDN connection/PDU session, and is such an EPS bearer that multiple bearers can be established during one PDN connection/PDU session. The dedicated bearer is an EPS bearer that can be used for communication of user data not associated with the TFT.

User Identity is information for identifying a subscriber. The User Identity may be an IMSI, or an MSISDN. Furthermore, the User Identity may also be identification information other than the IMSI or the MSISDN. Serving Node Information is information for identifying the MME_A 40/CPF_A 140/AMF_A 240 used in a PDU session, and may be an IP address of the MME_A 40/CPF_A 140/AMF_A 240.

The eNB Address is an IP address of the eNB_A 45. The eNB ID is information for identifying the UE in the eNB_A 45. MME Address is an IP address of the MME_A 40/CPF_A 140/AMF_A 240. MME ID is information for identifying the MME_A 40/CPF_A 140/AMF_A 240. The NR node Address is an IP address of the NR node_A 122. The NR node ID is information for identifying the NR node_A 122. The WAG Address is an IP address of the WAG. The WAG ID is information for identifying the WAG.

The anchor or anchor point is a UFP having a gateway function of the DN and the PDU session. The UPF to be the anchor point may be a PDU session anchor or an anchor.

The SSC mode indicates a mode of Session and Service Continuity supported by a system and/or each apparatus in the 5GC. To be more specific, the SSC mode may be a mode indicating a type of the session and service continuity supported by a PDU session established between the UE_A 10 and the anchor point). Here, the anchor point may be the UPGW or may be the UPF_A 235. Note that the SSC mode may be a mode indicating a type of the session and service continuity configured for each PDU session. The SSC mode may be configured to include three modes of SSC mode 1, SSC mode 2, and SSC mode 3. The SSC mode is associated with the anchor point and cannot be changed while the PDU session is being established.

Furthermore, the SSC mode 1 in the present embodiment is a mode of the session and service continuity in which the same UPF is continuously maintained as the anchor point regardless of the access technology such as the Radio Access Technology (RAT) and the cell the UE_A 10 uses to connect to a network. To be more specific, the SSC mode 1 may be a mode in which even in a case that the mobility of the UE_A 10 occurs, the session and service continuity is achieved without changing the anchor point used by the established PDU session.

Furthermore, the SSC mode 2 in the present embodiment is a mode of the session and service continuity in which in a case that an anchor point associated with one SSC mode 2 is included in a PDU session, the PDU session is previously released, and subsequently a PDU session is established. To be more specific, the SSC mode 2 is a mode in which in a case that a relocation of the anchor point occurs, the PDU session is deleted once, and then, a new PDU session is established.

Furthermore, the SSC mode 2 is a mode of the session and service continuity in which the same UPF is continuously maintained as the anchor point only in a serving area of the UPF. To be more specific, the SSC mode 2 may be a mode in which as long as the UE_A 10 is in the serving area of the UPF, the session and service continuity is achieved without changing the UPF used by the established PDU session. Furthermore, the SSC mode 2 may be a mode in which in a case that the mobility the UE_A 10 leaves the serving area of the UPF occurs, the session and service continuity is achieved by changing the UPF used by the established PDU session.

Here, the serving area of the TUPF may be an area in which one UPF can provide a session and service continuity function, or a subset of the access network such as the RAT or the cell used in a case that the UE_A 10 connects to a network. Furthermore, the subset of the access network may be a network including one or multiple RATs and/or cells, or may be the TA.

Furthermore, the SSC mode 3 in the present embodiment is a mode of the session and service continuity in which without releasing the PDU session between the UE and the anchor point, a PDU session can be established between a new anchor point and the UE for the same DN.

Furthermore, the SSC mode 3 is a mode of the session and service continuity that allows, before disconnecting the PDU session and/or the communication path established between the UE_A 10 and the UPF, a new PDU session and/or communication path to be established via a new UPF for the same DN. Furthermore, the SSC mode 3 may be a mode of the session and service continuity that allows the UE_A 10 to be multi-homed.

And/or, the SSC mode 3 may be a mode that allows the session and service continuity using multiple PDU sessions and/or the UPFs associated with the PDU sessions. In other words, in the case of the SSC mode 3, each apparatus may achieve the session and service continuity using the multiple PDU sessions, or may achieve the session and service continuity using the multiple TUPFs.

Here, in the case that each apparatus establishes a new PDU session and/or communication path, a new UPF may be selected by the network, or a new UPF may be an optimal UPF for a location at which the UE_A 10 connects to the network. Furthermore, in a case that the multiple PDU sessions and/or the UPFs used by the PDU sessions are effective, the UE_A 10 may correlate the application and/or flow communications to a new established PDU session, immediately or based on the completion of the communications.

1.3. Description of Initial Procedure

Next, before describing detailed processes of an initial procedure in the present embodiment, in order to avoid redundant descriptions, terminology specific to the present embodiment and primary identification information used in each procedure will be described beforehand.

The network in the present embodiment refers to at least some of the access network_A 20/80, the access network_B 80/120, the core network_A 90, the core network_B 190, the DN_A 5, and the PDN_A 6. One or more apparatuses included in at least some of the access network_A 20/80, the access network_B 80/120, the core network_A 90, the core network_B 190, the DN_A 5, and the PDN_A 6 may also be referred to as a network or a network apparatus. Specifically, the expression "the network performs transmission and/or reception of a message and/or performs a procedure" signifies that "an apparatus (network apparatus) in the network performs transmission and/or reception of a message and/or performs a procedure".

A Session Management (SM) message (also referred to as a Non-Access-Stratum (NAS) SM message or an SM message) in the present embodiment may be a NAS message used in a procedure for the SM (also referred to as a session management procedure or an SM procedure), or may be a control message transmitted and/or received between the UE_A 10 and the SMF_A 230 via the AMF_A 240. Furthermore, the SM message may include a PDU session establishment request message, a PDU session establishment accept message, a PDU session completion message, a PDU session reject message, a PDU session modification request message, a PDU session modification accept message, a PDU session modification reject message, and the like. The procedure for SM may include a PDU session establishment procedure, a PDU session modification procedure, and the like.

Note that, among the SM messages, a message transmitted by the UE_A 10 is represented as an SM request message. Specifically, the PDU session establishment request message and the PDU session modification request message are SM request messages.

Furthermore, a Tracking Area (TA) in the present embodiment is a range that can be represented by location information of the UE_A 10 managed by the core network, and may include one or more cells, for example. Furthermore, the TA may be a range in which a control message such as a paging message is broadcast, or a range in which the UE_A 10 can move without performing a handover procedure.

A TA list in the present embodiment is a list including one or more TAs allocated to the UE_A 10 by the network. Note that, while the UE_A 10 is moving within the one or more TAs included in the TA list, the UE_A 10 can move without performing the registration procedure. In other words, the TA list may be an information group indicating an area in which the UE_A 10 can move without performing the registration procedure.

A Network Slice in the present embodiment is a logical network that provides particular network capabilities and network performance. Hereinafter, the network slice is also referred to as a NW slice.

The Network Slice Instance (NSI) in the present embodiment is an entity of each of one or multiple Network Slices configured in the core network_B 190. The NSI in the present embodiment may include a virtual Network Function (NF) generated using a Network Slice Template (NST).

Here, the NST is associated with a resource request for providing a required communication service or capability, and is a logical expression of one or multiple Network Functions (NFs). Specifically, the NSI may be an aggregation including multiple NFs in the core network_B 190. The NSI may be a logical network configured to classify the user data delivered through a service or the like. The network slice may include at least one or more NFs. The NF included in the network slice may be an apparatus shared by another network slice or otherwise. The UE_A 10 and/or the apparatuses in the network can be assigned to one or multiple network slices, based on NSSAI and/or S-NSSAI and/or UE usage type and/or one or multiple network slice type IDs and/or registration information such as one or multiple NS IDs and/or the APN.

The S-NSSAI in the present embodiment is an abbreviation for Single Network Slice Selection Assistance information, and is information for identifying the network slice. The S-NSSAI may include a Slice/Service type (SST) and a Slice Differentiator (SD). The S-NSSAI may include only the SST, or may include both the SST and the SD. Here, the SST is information indicating an operation of the network slice expected in terms of the function and the service. Also, the SD may be information that complements the SST in a case of selecting one NSI from the multiple NSIs indicated by the SST. The S-NSSAI may be information unique to each Public Land Mobile Network (PLMN), may be standard information common to the PLMNs, or may be information specific to a network operator different for each PLMN.

To be more specific, the SST and/or the SD may be standard information (Standard Value) common to the PLMNs, or may be information (Non Standard Value) specific to a network operator different for each PLMN.

The network may store one or multiple pieces of S-NSSAI for the registration information of the UE_A 10 as the default S-NSSAI.

The single Network Slice Selection Assistance information (NSSAI) in the present embodiment is a group of pieces of S-NSSAI. Each piece of S-NSSAI included in the NSSAI is information that assists the access network or the core network to select the NSI. The UE_A 10 may store the NSSAI allowed by the network for each PLMN. Furthermore, the NSSAI may be information used to select the AMF_A 240.

An operator A's network in the present embodiment is a network operated by a network operator A (operator A). Here, for example, the operator A may deploy a NW slice common to an operator B described below.

An operator B's network in the present embodiment is a network operated by a network operator B (operator B). Here, for example, the operator B may deploy a NW slice common to the operator A.

A first NW slice in the present embodiment is a NW slice to which the established PDU session belongs in a case that the UE connects to a particular DN. Note that, for example, the first NW slice may be a NW slice managed in the operator A's network, or may be a NW slice commonly managed in the operator B's network.

A second NW slice in the present embodiment is a NW slice to which a PDU session belongs, the PDU session capable of connecting to the DN to which a PDU session belonging to the first NW slice connects. Note that the first NW slice and the second NW slice may be operated by the same operator, or may be operated by different operators.

An equivalent PLMN in the present embodiment is a PLMN treated to be the PLMN the same as any PLMN in the network.

The Dedicated Core Network (DCN) in the present embodiment is one or multiple particular subscriber type dedicated core networks configured in the core network_A 90. Specifically, a DCN for a UE registered as a user of Machine to Machine (M2M) communication function may be configured in the core network_A 90, for example. In addition, a default DCN for a UE with no proper DCN may be configured in the core network_A 90. Furthermore, in the DCN, at least one or more MMES_A 40 or SGSNs_A 42 may be located, and further, at least one or more SGWs_A 35, PGWs_A 30, or PCRFs_A 60 may be located. Note that the DCN may be identified by a DCN ID, and further, the UE may be assigned to one DCN, based on the information such as the UE usage type and/or the DCN ID.

A first timer in the present embodiment is a timer managing an initiation of a procedure for session management such as a PDU session establishment procedure and/or a transmission of a Session Management (SM) message such as a PDU session establishment request message, and may be information indicating a value of a back-off timer for managing a session management behavior. Hereinafter, the first timer and/or the back-off timer may be referred to as a timer. While the first timer is running, the initiation of the procedure for session management and/or the transmission and/or reception of the SM message by each apparatus may be prohibited. Note that the first timer may be configured to be associated with at least one of a congestion control unit applied by the NW and/or a congestion control unit identified by the UE. For example, the first timer may be configured in at least one unit of an APN/DNN unit and/or an identification information unit indicating one or multiple NW slices and/or a rejection cause value unit in the session management procedure and/or a session unit in which the rejection is indicated in the session management procedure and/or a PTI unit in the session management procedure.

Note that the SM message may be a NAS message used in the procedure for session management, or may be a control message transmitted and/or received between the UE_A 10 and the SMF_A 230 via the AMF_A 240. Furthermore, the SM message may include a PDU session establishment request message, a PDU session establishment accept message, a PDU session completion message, a PDU session reject message, a PDU session modification request message, a PDU session modification accept message, a PDU session modification reject message, and the like. Furthermore, the procedure for session management may include a PDU session establishment procedure, a PDU session modification procedure, and the like. In these procedures, a back-off timer value may be included for each message received by the UE_A 10. The UE may configure, as the first timer, the back-off timer received from the NW, a timer value in another manner, or a random value. In a case of receiving multiple back-off timers from the NW, the UE may manage multiple "first timers" corresponding to the multiple back-off timers, or may select one timer value from the multiple back-off timer values received from the NW, based on the policy that the UE holds to configure and manage the selected timer as the first timer. For example, in a case of receiving two back-off timer values, the UE configures and manages the back-off timer values received from the NW as the "first timer #1" and the "first timer #2". The UE may select one value from the multiple back-off timer values received from the NW, based on the policy that the UE holds to configure and manage the selected timer as the first timer.

The UE_A 10, in a case of receiving multiple back-off timer values from the NW, may manage multiple "first timers" corresponding to the multiple back-off timers. Here, in the following, the multiple "first timers" received by the UE_A 10 may be described, for example, as the "first timer #1" or the "first timer #2" in order to be distinguished from each other. Note that the multiple back-off timers may be acquired in a single session management procedure, or may be acquired in different session management procedures.

Here, as described above, the first timer may be a back-off timer that is configured for, based on the information for identifying one NW slice, the multiple associated NW slices to prohibit reconnection, or may be a back-off timer that is configured in units of a combination of the APN/DNN and one NW slice to prohibit reconnection, without limitation, and may be a back-off timer that is configured in units of a combination of the APN/DNN and the multiple associated NW slices, based on the information for identifying one NW slice to prohibit reconnection.

Re-attempt information included in eleventh identification information in the present embodiment is information indicated to the UE_A 10 by the network (NW) regarding whether to allow reconnection using the same DNN information and/or S-NSSAI information for the rejected PDU session establishment request (S1100).

At this time, in the PDU session establishment request (1100), in a case that the UE has made a PDU session establishment request not including a DNN (S1100), not including the DNN is referred to as identical information. In the PDU session establishment request (1100), in a case that the UE has made a PDU session establishment request not including S-NSSAI (S1100), the S-NSSAI being not included is referred to as identical information.

Note that the re-attempt information may be configured in units of UTRAN access and/or E-UTRAN access and/or NR access and/or slice information and/or equivalent PLMN and/or S1 mode and/or NW mode.

Further, the re-attempt information specified in units of access (UTRAN access, E-UTRAN access, NR access) may be information indicating a reconnection using the identical information to the network on the assumption of the access change. The re-attempt information specified in units of slice may be specified with slice information different from the rejected slice, and a reconnection using the specified slice information may be allowed.

Furthermore, the re-attempt information specified in units of equivalent PLMN may be information indicating that in a case that the PLMN is changed, in a case that the PLMN after the change is an equivalent PLMN, a reconnection using the identical information is allowed. In a case that the PLMN after the change is not an equivalent PLMN, the re-attempt information may be information indicating that the reconnection using this procedure is not allowed.

Furthermore, the re-attempt information specified in units of mode (S1 mode, N1 mode) may be information indicating that, in a case that the mode is changed, in a case that the mode after the change is an S1 mode, a reconnection using the identical information allowed. In a case that the mode after the change is an S1 mode, the re-attempt information may be information indicating that a reconnection using the identical information is not allowed.

A network slice association rule in the present embodiment is a rule for associating information identifying multiple network slices. Note that the network slice association rule may be received in the PDU session reject message, or may be preconfigured for the UE_A 10. Furthermore, the newest network slice association rule may be applied to the UE_A 10. Conversely, the UE_A 10 may perform a behavior based on the newest network slice association rule. For example, in a case that the UE_A 10 receives a new network slice association rule in the PDU session reject message while the network slice association rule is configured for the UE_A 10 in advance, the UE_A 10 may update the network slice association rule held in the UE_A 10.

A back-off timer priority management rule in the present embodiment is a rule configured for the UE_A 10 to collectively manage multiple back-off timers occurring in multiple PDU sessions on a single back-off timer. For example, in a case that in a case that conflicting or overlapping congestion controls are applied and in a case that the UE holds multiple back-off timers, the UE_A 10 may collectively manage multiple back-off timers, based on the back-off timer priority management rule. Note that a pattern in which the conflicting or overlapping congestion controls occur is a case that a congestion control based on only the DNN and a congestion control based on both the DNN and the slice information are applied at the same time, and in this case, the congestion control based on only the DNN is prioritized. Note that the back-off timer priority management rule may not be limited to this. Note that the back-off timer may be a first timer included in the PDU session reject message.

A first state in the present embodiment is a state in which each apparatus has completed the registration procedure and the PDU session establishment procedure, and one or more of the first to fourth congestion controls are applied to the UE_A 10 and/or each apparatus. Here, the UE_A 10 and/or each apparatus may be, as a result of the completion of the registration procedure, in a state that the UE_A 10 is registered with the network (RM-REGISTERED state), and the completion of the PDU session establishment procedure may be a state in which the UE_A 10 receives the PDU session establishment reject message from the network.

The congestion control in the present embodiment includes one or multiple congestion controls of a first congestion control to a fourth congestion control. Note that the control of the UE by the NW is achieved by the congestion control recognized by the first timer and the UE, and the UE may store associations of these pieces of information.

The first congestion control in the present embodiment indicates a congestion control for control signal associated with parameters of the DNN. For example, in a case that a congestion to a DNN #A is detected in the NW, and in a case that the NW recognizes that a UE-initiated session management request associated with parameters only of the DNN #A is made, the NW may apply the first congestion control. Note that even in a case that the UE-initiated session management request does not include the DNN information, the NW may select a default DNN as a congestion control target on the initiative of the NW. Alternatively, the NW may apply the first congestion control even in a case that the NW recognizes that the UE-initiated session management request including the DNN #A and S-NSSAI #A is made. In a case that the first congestion control is applied, the UE may prohibit the UE-initiated session management request associated with only the DNN #A.

In other words, the first congestion control in the present embodiment may be a congestion control for control signal associated with the DNN, and a congestion control due to connectivity to the DNN being in a congested state. For example, the first congestion control may be a congestion control to regulate connection to the DNN #A in all connectivities. Here, the connection to the DNN #A in the all connectivities may be a connection of the DNN #A in a connectivity using any S-NSSAI available to the UE, or may be a connection of the DNN #A through a network slice to which the UE is connectable. Furthermore, a connectivity to the DNN #A not through a network slice may be included.

A second congestion control in the present embodiment indicates a congestion control for control signal associated with parameters of the S-NSSAI. For example, in a case that a control signal congestion to the S-NSSAI #A is detected in the NW, and in a case that the NW recognizes that a UE-initiated session management request associated with parameters only of the S-NSSAI #A is made, the NW may apply the second congestion control. In a case that the second congestion control is applied, the UE may prohibit the UE-initiated session management request associated with only the S-NSSAI #A.

In other words, the second congestion control in the present embodiment may be a congestion control for control signal associated with the S-NSSAI, and a congestion control due to the network slice selected by the S-NSSAI being in a congested state. For example, the second congestion control may be a congestion control to regulate all connections, based on the S-NSSAI #A. Specifically, the second congestion control may be a congestion control to regulate connections to the all DNNs through a network slice selected by the S-NSSAI #A.

A third congestion control in the present embodiment indicates a congestion control for control signal associated with parameters of the DNN and the S-NSSAI. For example, in a case that a control signal congestion to the DNN #A and a control signal congestion to the S-NSSAI #A are simultaneously detected in the NW, and in a case that the NW recognizes that a UE-initiated session management request associated with parameters of the DNN #A and the S-NSSAI #A is made, the NW may apply the third congestion control. Note that even in a case that the UE-initiated session management request does not include information indicating the DNN, the NW may select a default DNN collectively as a congestion control target on the initiative of the NW. In a case that the third congestion control is applied, the UE may prohibit the UE-initiated session management request associated with the parameters of the DNN #A and the S-NSSAI #A.

In other words, the third congestion control in the present embodiment may be a congestion control for control signal associated with the parameters of the DNN and the S-NSSAI, and a congestion control due to connectivity to the DNN through the network slice selected based on the S-NSSAI being in a congested state. For example, the third congestion control may be congestion control to regulate connection to the DNN #A in the connectivities based on the S-NSSAI #A.

A fourth congestion control in the present embodiment indicates a congestion control for control signal associated with parameters of at least one of the DNN and/or the S-NSSAI. For example, in a case that a control signal congestion to the DNN #A and a control signal congestion to the S-NSSAI #A are simultaneously detected in the NW, and in a case that the NW recognizes that a UE-initiated session management request associated with parameters of at least one of the DNN #A and/or the S-NSSAI #A is made, the NW may apply the fourth congestion control. Note that even in a case that the UE-initiated session management request does not include information indicating the DNN, the NW may select a default DNN collectively as a congestion control target on the initiative of the NW. In a case that the fourth congestion control is applied, the UE may prohibit the UE-initiated session management request associated with the parameters of at least one of the DNN #A and/or the S-NSSAI #A.

In other words, the fourth congestion control in the present embodiment may be a congestion control for control signal associated with the parameters of the DNN and the S-NSSAI, and a congestion control due to the network slice selected based on the S-NSSAI and connectivity to the DNN being in a congested state. For example, the fourth congestion control may be a congestion control to regulate all connections based on the S-NSSAI #A and a congestion control to regulate connection to the DNN #A in all connectivities. Specifically, the fourth congestion control may be a congestion control to regulate connections to the all DNNs through a network slice selected by the S-NSSAI #A and a congestion control to regulate connection to the DNN #A in all connectivities. Here, the connection to the DNN #A in the all connectivities may be a connection of the DNN #A in a connectivity using any S-NSSAI available to the UE, or may be a connection of the DNN #A through a network slice to which the UE is connectable. Furthermore, a connectivity to the DNN #A not through a network slice may be included.

Thus, the fourth congestion control using the DNN #A and S-NSSAI #A as the parameters may be a congestion control simultaneously performing the first congestion control using the DNN #A as the parameters and the second congestion control using the S-NSSAI #A as the parameters.

A first behavior in the present embodiment is a behavior in which the UE stores slice information transmitted in a first PDU session establishment request message in association with transmitted PDU session identification information. In the first behavior, the UE may store the slice information transmitted in the first PDU session establishment request message, or may store the slice information received in a case that the first PDU session establishment request is rejected.

A second behavior in the present embodiment is a behavior in which the UE transmits a PDU session establishment request to connect to the APN/DNN the same as the first PDU session establishment request by using another piece of slice information different from the slice information specified in the first PDU session establishment. Specifically, the second behavior may be a behavior in which in a case that a back-off timer value received from the network is zero or invalid, the UE transmits a PDU session establishment request to connect to the APN/DNN the same as the first PDU session establishment request by using another piece of slice information different from the slice information specified in the first PDU session establishment. Additionally, the second behavior may be a behavior in which in a case that the first PDU session is rejected because radio access of the particular PLMN to which the specified APN/DNN connects is not supported, or in a case that the first PDU session is rejected for temporary causes, the UE transmits a PDU session establishment request to connect to the APN/DNN the same as the APN/DNN included in the first PDU session establishment request, by using another piece of slice information different from the slice information specified in the first PDU session establishment.

A third behavior in the present embodiment is a behavior in which in a case that the PDU session establishment request is rejected, the UE does not transmit a new PDU session establishment request by use of the same identification information until the first timer expires. Specifically, the third behavior may be a behavior in which in a case that a back-off timer value received from the network is neither zero nor invalid, the UE does not transmit a new PDU session establishment request by use of the same identification information until the first timer expires. Here, the same identification information may mean whether first identification information and/or second identification information to be carried on the new PDU session establishment request is the same as the first identification information and/or the second identification information transmitted in the rejected PDU session establishment request.

The third behavior may be a behavior in which in a case that another PLMN is selected, or in a case that another NW slice is selected and a rejection cause for a configuration failure for network operation is received, in a case that a back-off timer received in a case that the first PDU session establishment request is rejected is running, the UE does not transmit a new PDU session establishment request by use of the same identification information until the first timer expires.

To be specific, the PDU session for which a new PDU session establishment request in the third behavior is not transmitted may be a PDU session in which the congestion control associated with the first timer is applied. More specifically, the third behavior may be the connectivity in accordance with the type of the congestion control associated with the first timer, and may be a behavior in which a new PDU session establishment request is not transmitted to the PDU session with the DNN and/or S-NSSAI associated with the congestion control. Note that the process from which the UE is prohibited by the present behavior may be an initiation of the procedure for session management including a PDU session establishment request and/or transmission and/or reception of an SM message.

A fourth behavior in the present embodiment is a behavior in which in a case that the PDU session establishment request is rejected, the UE does not transmit a new PDU session establishment request not carrying the slice information and the DNN/APN information until the first timer expires. Specifically, the fourth behavior may be a behavior in which in a case that a back-off timer received by the UE from the network is neither zero nor invalid, the UE does not transmit a new PDU session establishment request not carrying the slice information and the DNN/APN information until the first timer expires.

A fifth behavior in the present embodiment is a behavior in which in a case that the PDU session establishment request is rejected, the UE does not transmit a new PDU session establishment request by use of the same identification information. Specifically, the fifth behavior may be a behavior in which in a case that PDP types supported in the UE and the network are different and in a case that the UE is in the equivalent PLMN, the UE does not transmit a new PDU session establishment request by use of the same identification information.

A sixth behavior in the present embodiment is a behavior in which in a case that the PDU session establishment request is rejected, the UE transmits a new PDU session establishment request as an initial procedure by use of the same identification information. Specifically, the sixth behavior may be a behavior in which in a case that the first PDU session establishment request is rejected because there is no PDN session context of interest in a handover from the non-3GPP access, the UE transmits a new PDU session establishment request as the initial procedure by use of the same identification information.

A seventh behavior in the present embodiment is a behavior in which in a case that the UE selects another NW slice in the procedure for selecting a PLMN, the UE continues a back-off timer received in a case that the previous PDU session establishment request is rejected. Specifically, the seventh behavior may be a behavior in which in a case that the UE selects a PLMN in a case that the first PDU session establishment request is rejected, and in a case that a NW slice common to the NW slice specified in the first PDU session establishment request can be specified in the selected PLMN, the UE continues a back-off timer received in a case that the first PDU session establishment request is rejected.

An eighth behavior in the present embodiment is a behavior in which the UE configures a value notified from the network or a value preconfigured for the UE as a first timer value. Specifically, the eighth behavior may be a behavior in which the UE configures the back-off timer value received in a reject notification for the first PDU session establishment request as the first timer value, or may be a behavior in which the UE configures a value preconfigured for or held in the UE as the first timer value. Note that the eighth behavior in the case that a timer preconfigured for or held in the UE is configured as the first timer value may be limited to a case where the UE is in a HPLMN or the equivalent PLMN.

A ninth behavior in the present embodiment is a behavior in which in a case that the PDU session establishment request message is rejected, the UE does not transmit a new PDU session establishment request until a terminal power is turned on/off, or a Universal Subscriber Identity Module (USIM) is inserted or removed. Specifically, the ninth behavior may be a behavior in which in a case that the back-off timer received from the network is invalid, or in a case that the first PDU session rejection causes of the UE and the network are different in the PDP type from each other, the UE does not transmit a new PDU session establishment request until a terminal power is turned on/off, or a USIM is inserted or removed. The ninth behavior may be a behavior in which in a case that the first PDU session is rejected because the specified APN/DNN is not supported wirelessly in the connected PLMN, and in a case that there is no information element of the back-off timer from the network and there is no Re-attempt information, or in a case that a PDU session reconnection to the equivalent PLMN is allowed, the UE does not transmit a new PDU session establishment request until a terminal power is turned on/off, or a USIM is inserted or removed in the connected PLMN. The ninth behavior may be a behavior in which in a case that the first PDU session is rejected because the specified APN/DNN is not supported wirelessly in the connected PLMN, and in a case that there is no information element of the back-off timer from the network and there is no Re-attempt information, or in a case that a PDU session reconnection to the equivalent PLMN is not allowed, the UE does not transmit a new PDU session establishment request until a terminal power is turned on/off, or a USIM is inserted or removed in the connected PLMN. The ninth behavior may be a behavior in which in a case that the first PDU session is rejected because the specified APN/DNN is not supported wirelessly in the connected PLMN, and in a case that the back-off timer from the network is neither zero nor invalid, the UE does not transmit a new PDU session establishment request until a terminal power is turned on/off, or a USIM is inserted or removed. The ninth behavior may be a behavior in which in a case that the first PDU session is rejected because the specified APN/DNN is not supported wirelessly in the connected PLMN, and in a case that the back-off timer from the network is invalid, the UE does not transmit a new PDU session establishment request until a terminal power is turned on/off, or a USIM is inserted or removed.

A tenth behavior in the present embodiment is a behavior in which in a case that the PDU session establishment request is rejected, the UE transmits a new PDU session establishment request. Specifically, the tenth behavior may be a behavior in which in a case that the back-off timer received from the network is zero, or in a case that the first PDU session establishment request is rejected for temporary causes, and further in a case that there is no back-off timer information element itself notified from the network, the UE transmits a new PDU session establishment request. The tenth behavior may be a behavior in which in a case that another PLMN is selected or another NW slice is selected, in a case that the first PDU session establishment request is rejected for temporary causes, and in a case that the back-off timer is not running for the APN/DNN of interest in the selected PLMN or the back-off timer received from the network is invalid, the UE transmits a new PDU session establishment request. The tenth behavior may be a behavior in which in a case that the first PDU session establishment request is rejected because the PDP types of the UE and the network are different from each other, and in a case that the Re-attempt information is not received in a case that a different PLMN is selected, or a PLMN not in an equivalent PLMN list is selected, or in a case that the PDP type is changed, or in a case that a terminal power is turned on/off, or a USIM is inserted or removed, the UE transmits a new PDU session establishment request. The tenth behavior may be a behavior in which in a case that the first PDU session is rejected because the specified APN/DNN is not supported wirelessly in the connected PLMN, and in a case that the back-off timer notified from the network is zero, the UE transmits a new PDU session establishment request.

An eleventh behavior in present embodiment is a behavior in which the UE ignores the first timer and the Re-attempt information. Specifically, the eleventh behavior may be a behavior in which in a case that the first PDU session establishment request is rejected because there is no PDN session context of interest in a handover from the non-3GPP access, or in a case that the first PDU session establishment is rejected because the number of bearers provided in the PDN connection reaches the maximum allowed number, the UE ignores the first timer and the Re-attempt information.

A twelfth behavior in the present embodiment is a behavior in which the UE determines, based on information for identifying one NW slice received in the rejection notification for the first PDU session establishment request, information for identifying the multiple associated NW slices to prohibit reconnection to the multiple associated NW slices, based on the information for identifying the one NW slice. Specifically, the twelfth behavior may be a behavior in which the UE derives information for identifying another NW slice associated with information for identifying a NW slice notified in the first PDU session establishment request rejection, based on the network slice association rule. Note that the network slice association rule may be preconfigured for the UE, or may be notified from the network in the rejection notification for the PDU session establishment.

A thirteenth 13 behavior in the present embodiment may be a behavior in which in a case that multiple different congestion controls are activated for one or multiple PDU session establishments by the same UE, and multiple timers are provided from the network, the UE manages the timers, based on the back-off timer priority management rule. For example, the first PDU session establishment request of a combination of a DNN_1 and a slice_1 by the UE is a congestion control target based on both the DNN and the slice information, and the UE receives the first timer #1. Furthermore, the UE makes a second PDU session establishment request for the combination of the DNN_1 and a slice_2, which is a congestion control target based on only the DNN, and receives the first timer #2. At this time, in the UE, a behavior of PDU session reestablishment by the UE may be managed by the prioritized first timer #2, based on the back-off timer priority management rule. Specifically, the value of the timer held by the UE may be overwritten with the timer value generated by the prioritized congestion control.

A fourteenth behavior in the present embodiment may be a behavior in which in a case that multiple different congestion controls are applied to one or multiple PDU session establishments by the same UE, and multiple timers are provided from the network, the UE manages the timer for each session management instance (PDU session unit). For example, the first PDU session establishment of a combination of a DNN #1 and a slice #1 by the UE is a congestion target, based on both the DNN and the slice information, and the UE manages a back-off timer value of interest as the first timer #1. After that, in a case that in a case that the UE further attempts PDU session establishment as the second PDU session for the combination of the DNN #1 and a slice #2, a congestion target based on only the DNN is determined, the UE manages the back-off timer value of interest as the first timer #2. At this time, the UE simultaneously manages the multiple timers (here, the first timer #1 and the first timer #2). Specifically, the UE manages the timers in units of session management instance/PDU session. In a case that the UE simultaneously receives multiple timers in one session management procedure, the UE simultaneously manages the back-off timers of interest in the congestion control unit identified by the UE.

A fifteenth behavior in the present embodiment may be a behavior in which the UE_A 10 performs a first identification process and a second identification process, the first identification process being to identify which type of congestion control is applied among the first to fourth congestion controls, the second identification process being to identify the DNN and/or the S-NSSAI associated with the congestion control to apply. Note that the first identification process may perform identification, based on at least one or more pieces of identification information of the first identification information to fourth identification information, and/or at least one or more pieces of identification information of the eleventh identification information to eighteenth identification information. Similarly, the second identification process may perform identification, based on at least one or more pieces of identification information of the first identification information to fourth identification information, and/or at least one or more pieces of identification information of the eleventh identification information to eighteenth identification information.

An example of the first identification process will be described below. In the first identification process, the type of congestion control to apply in a case that any one or a combination of more than two of the following cases are met may be identified as the first congestion control.

A case that at least the fifteenth identification information is a value corresponding to the first congestion control.
A case that at least the sixteenth identification information is a value corresponding to the first congestion control.
A case that at least the fourteenth identification information includes information indicating the first congestion control.
A case that at least the seventeenth identification information includes only the DNN and does not include the S-NSSAI.
A case that at least the sixteenth identification information is not received in a case that the sixteenth identification information is information for identifying the identification information for any of the first congestion control and the second congestion control, and is information that only a value corresponding to the second congestion control can be configured for the sixteenth identification information.
A case that at least the sixteenth identification information is not received in a case that the sixteenth identification information is information for identifying the identification information for any of the first congestion control and the fourth congestion control, and is information that only a value corresponding to the fourth congestion control can be configured for the sixteenth identification information.
A case that at least the sixteenth identification information is not received in a case that the sixteenth identification information is information for identifying the identification information for any of the first congestion control, the second congestion control, and the fourth congestion control, and is information that only values corresponding to the second congestion control and the fourth congestion control can be configured for the sixteenth identification information.

However, the example described above is not a limitation, and the UE_A 10 may perform identification, based on at least one or more pieces of identification information of the first identification information to fourth identification information, and/or at least one or more pieces of identification information of the eleventh identification information to eighteenth identification information, or a combination of two or more pieces of the identification information.

In the first identification process, the type of congestion control to apply in a case that any one or a combination of more than two of the following cases are met may be identified as the second congestion control.

A case that at least the fifteenth identification information is a value corresponding to the second congestion control.
A case that at least the sixteenth identification information is a value corresponding to the second congestion control.
A case that at least the fourteenth identification information includes information indicating the second congestion control.
A case that at least the seventeenth identification information includes only the S-NSSAI and does not include the DNN.
A case that at least the sixteenth identification information is not received in a case that the sixteenth identification information is information for identifying the identification information for any of the first congestion control and the second congestion control, and is information that only a value corresponding to the first congestion control can be configured for the sixteenth identification information.
A case that at least the sixteenth identification information is not received in a case that the sixteenth identification information is information for identifying the identification information for any of the second congestion control and the third congestion control, and is information that only a value corresponding to the third congestion control can be configured for the sixteenth identification information.

A case that at least the sixteenth identification information is not received in a case that the sixteenth identification information is information for identifying the identification information for any of the second congestion control, the third congestion control, and the fourth congestion control, and is information that only values corresponding to the third congestion control and the fourth congestion control can be configured for the sixteenth identification information.

However, the example described above is not a limitation, and the UE_A 10 may perform identification, based on at least one or more pieces of identification information of the first identification information to fourth identification information, and/or at least one or more pieces of identification information of the eleventh identification information to eighteenth identification information, or a combination of two or more pieces of the identification information.

In the first identification process, the type of congestion control to apply in a case that any one or more than two combinations of the following cases are met may be identified as the third congestion control.

A case that at least the fifteenth identification information is a value corresponding to the third congestion control.

A case that at least the sixteenth identification information is a value corresponding to the third congestion control.

A case that at least the fourteenth identification information includes information indicating the third congestion control.

A case that at least the fifteenth identification information is a value corresponding to the multiple congestion controls including the third congestion control and not including the fourth congestion control, and the seventeenth identification information includes the S-NSSAI and the DNN.

A case that at least the sixteenth identification information is not received in a case that the sixteenth identification information is information for identifying the identification information for any of the third congestion control and the fourth congestion control, and is information that only a value corresponding to the fourth congestion control can be configured for the sixteenth identification information.

A case that at least the sixteenth identification information is not received in a case that the sixteenth identification information is information for identifying the identification information for any of the second congestion control and the third congestion control, and is information that only a value corresponding to the second congestion control can be configured for the sixteenth identification information.

A case that at least the sixteenth identification information is not received in a case that the sixteenth identification information is information for identifying the identification information for any of the second congestion control, the third congestion control, and the fourth congestion control, and is information that only values corresponding to the second congestion control and the fourth congestion control can be configured for the sixteenth identification information.

However, the example described above is not a limitation, and the UE_A 10 may perform identification, based on at least one or more pieces of identification information of the first identification information to fourth identification information, and/or at least one or more pieces of identification information of the eleventh identification information to eighteenth identification information, or a combination of two or more pieces of the identification information.

In the first identification process, the type of congestion control to apply in a case that any one or more than two combinations of the following cases are met may be identified as the fourth congestion control.

A case that at least the fifteenth identification information is a value corresponding to the fourth congestion control.

A case that at least the sixteenth identification information is a value corresponding to the fourth congestion control.

A case that at least the fourteenth identification information includes information indicating the fourth congestion control.

A case that at least the fifteenth identification information is a value corresponding to the multiple congestion controls including the fourth congestion control and not including the third congestion control, and the seventeenth identification information includes the S-NSSAI and the DNN.

A case that at least the sixteenth identification information is not received in a case that the sixteenth identification information is information for identifying the identification information for any of the third congestion control and the fourth congestion control, and is information that only a value corresponding to the third congestion control can be configured for the sixteenth identification information.

A case that at least the sixteenth identification information is not received in a case that the sixteenth identification information is information for identifying the identification information for any of the second congestion control and the fourth congestion control, and is information that only a value corresponding to the second congestion control can be configured for the sixteenth identification information.

A case that at least the sixteenth identification information is not received in a case that the sixteenth identification information is information for identifying the identification information for any of the first congestion control and the fourth congestion control, and is information that only a value corresponding to the first congestion control can be configured for the sixteenth identification information.

A case that at least the sixteenth identification information is not received in a case that the sixteenth identification information is information for identifying the identification information for any of the second congestion control, the third congestion control, and the fourth congestion control, and is information that only values corresponding to the second congestion control and the third congestion control can be configured for the sixteenth identification information.

A case that at least the sixteenth identification information is not received in a case that the sixteenth identification information is information for identifying the identification information for any of the first congestion control, the second congestion control, and the fourth congestion control, and is information that only values corresponding to the first congestion control and the second congestion control can be configured for the sixteenth identification information.

However, the example described above is not a limitation, and the UE_A 10 may perform identification, based on at least one or more pieces of identification information of the first identification information to fourth identification information, and/or at least one or more pieces of identification information of the eleventh identification information to eighteenth identification information, or a combination of two or more pieces of the identification information, and may perform identification using other means.

As described above, the type of congestion control may be identified by the first identification process.

Next, an example of the second identification process will be described below. Note that the second identification process may be a process to identify the DNN and/or the S-NSSAI corresponding to the type of congestion control identified by the first identification process.

More specifically, the DNN corresponding to the first congestion control, the third congestion control, or the fourth congestion control may be determined based on the twelfth identification information. And/or the DNN corresponding to the first congestion control, the third congestion control, or the fourth congestion control may be determined based on the seventeenth identification information. And/or the DNN corresponding to the first congestion control, the third congestion control, or the fourth congestion control may be determined based on the second identification information.

Accordingly, the DNN corresponding to the first congestion control, the third congestion control, or the fourth congestion control may be the DNN indicating the twelfth identification information. And/or the DNN corresponding to the first congestion control, the third congestion control, or the fourth congestion control may be the DNN included in the seventeenth identification information. And/or the DNN corresponding to the first congestion control, the third congestion control, or the fourth congestion control may be the DNN indicating the second identification information.

Also, the S-NSSAI corresponding to the second congestion control, the third congestion control, or the fourth congestion control may be determined based on the seventeenth identification information. And/or the DNN corresponding to the first congestion control, the third congestion control, or the fourth congestion control may be determined based on the first identification information.

Thus, the DNN corresponding to the first congestion control, the third congestion control, or the fourth congestion control may be the S-NSSAI indicating the seventeenth identification information. And/or the DNN corresponding to the first congestion control, the third congestion control, or the fourth congestion control may be the S-NSSAI included in the first identification information.

However, the example described above is not a limitation, and the UE_A 10 may perform identification, based on at least one or more pieces of identification information of the first identification information to fourth identification information, and/or at least one or more pieces of identification information of the eleventh identification information to eighteenth identification information, or a combination of two or more pieces of the identification information, and may perform identification using other means.

Based on the fifteenth behavior described above, the UE_A 10 may identify the congestion control which the core network_B 190 applies to the UE_A 10. In other words, the UE_A 10 may identify, as the congestion control to apply, the corresponding type of congestion control and the corresponding S-NSSAI and/or DNN, based on the fifteenth behavior. Note that the UE_A 10 may store and manage one or multiple pieces of identification information of the first identification information to fourth identification information and the eleventh identification information to eighteenth identification information in association with the congestion control to apply. Here, the third identification information and/or the fourth identification information and/or the thirteenth identification information may be stored and managed as information identifying the congestion control to apply.

A sixteenth behavior in the present embodiment is a behavior in which in a case that a NW-initiated session management procedure is performed in a state where the UE runs the first timer, the UE stops the first timer.

Here, for example, the sixteenth behavior may be a behavior in which in a case that the multiple first timers are running, the UE determines and stops the first timer to stop among the multiple running first timers, based on 21st identification information. And/or the sixteenth behavior may be a behavior in which the UE stops the first timer associated with a congestion control identified by a seventeenth behavior. Note that in a case of multiple congestion controls identified by the seventeenth behavior, the timers associated with the respective congestion controls may be stopped.

The seventeenth behavior in the present embodiment may be a behavior of the UE identifying a congestion control of which application is to stop among one or multiple congestion controls that the UE applies, based on the reception of the control message transmitted by the core network. For example, the UE may identify the congestion control of which application is to stop or change based on the 21st identification information.

Specifically, as described above, the UE stores the third identification information and/or the fourth identification information and/or the thirteenth identification information or the like in the fourth process as information identifying the congestion control, and may identify, as the congestion control of which application is to stop, the congestion control in which these identification information identifying the congestion control and the thirteenth identification information included in the 21st identification information match.

And/or, the UE may identify the congestion control of which application is to stop, based on one of or a combination of multiple pieces of the eleventh identification information to eighteenth identification information included in the 21st identification information. Here, the details of the identification method may be similar to the identification process in the fifteenth behavior described in the fourth process in the example of the PDU session establishment procedure described below. That is, the UE may identify the congestion control to stop, by the method similar to a method for identifying the congestion control to apply.

Note that the UE may identify multiple congestion controls of which application is to stop. Hereinafter, the congestion control identified by the method described above is referred to as a first congestion control, and a method for identifying a second congestion control different from the first congestion control will be described.

For example, the UE may identify as a second congestion control a congestion control associated with a DNN that is the same as the DNN associated with the first congestion control. And/or the UE may identify as the second congestion control a congestion control associated with a S-NSSAI that is the same as the S-NSSAI associated with the first congestion control. Note that identifying the multiple congestion controls of which application is to stop may be configured to be performed only in a case that the first congestion control and/or the second congestion control are particular types of congestion control.

Specifically, in a case that the first congestion control is any of the first to fourth congestion controls, the UE may identify the second congestion control. And/or, in identifying the second congestion control, the UE may identify the second congestion control in a case that a congestion control to search for is any of the first to fourth congestion controls. Note that the type of congestion control in which the first congestion control and/or the second identification information can identify multiple congestion controls may be preconfigured for the core network and/or the UE. Note that the number of particular types of congestion controls for which identification is allowed need not be limited to one, and multiple types may be configured.

The first identification information in the present embodiment is information identifying belonging to the first NW slice. In other words, the first identification information may be information indicating that the UE desires to establish a PDU session belonging to the first NW slice. Specifically, the first identification information may be information for identifying the first NW slice. Note that the slice information may be identification information indicating a specific S-NSSAI. Note that the first identification information may be information identifying a particular NW slice within the operator A's network, or may be information identifying the same NW slice commonly also in the operator B (other operators than the operator A). Furthermore, the first identification information may be information for identifying the first NW slice configured from the HPLMN, may be information for identifying the first NW slice acquired from the AMF in the registration procedure, or may be information for identifying the first NW slice allowed from the network. Furthermore, the first identification information may be information for identifying the first NW slice stored for each PLMN.

The second identification information in the present embodiment may be a Data Network Name (DNN) and information used for identifying a Data Network (DN).

The third identification information in the present embodiment may be a PDU Session ID or information used for identifying a PDU Session.

The fourth identification information in the present embodiment may be a Procedure transaction identity (PTI), or information which may identify transmission and/or reception of a series of messages of a particular session management procedure as a single group, and further, may be used to identify and/or distinguish the transmission and/or reception of a series of messages from transmission and/or reception of another series of session management related messages.

The eleventh identification information in the present embodiment may be information indicating that a request for PDU session establishment or a request for PDU session modification is rejected. Note that a request for PDU session establishment or a request for PDU session modification is a request made by the UE, and includes the DNN and/or the S-NSSAI. Specifically, the eleventh identification information may be information indicating that the NW rejects a request for establishment or modification of a PDU session corresponding to these DNN and/or S-NSSAI.

The eleventh identification information may be information indicating re-attempt (Re-attempt) information.

The NW may indicate to the UE the congestion control by transmitting at least one identification information of the twelfth identification information to eighteenth identification information along with the eleventh identification information to the UE. In other words, the NW may notify the UE of the congestion control corresponding to one of or a combination of multiple pieces of identification information of the twelfth identification information to eighteenth identification information. On the other hand, the UE may identify the congestion control corresponding to one of or a combination of multiple pieces of identification information of the twelfth identification information to eighteenth identification information, and perform a process based on the identified congestion control. Specifically, the UE may start to count the first timer associated with the identified congestion control. Note that the timer value of the first timer may be determined by use of the fourteenth identification information, configured with a timer value that is configured in another manner such as one using a value prestored by the UE, or configured with a random value.

The twelfth identification information in the present embodiment may be a DNN, which may be a DNN not allowed by the network, or information indicating that a DNN identified by the second identification information is not allowed. Furthermore, the twelfth identification information may be a DNN the same as that of the second identification information.

The thirteenth identification information in the present embodiment may be a PDU session ID and/or a PTI, which may be a PDU session ID and/or a PTI not allowed by the network, or information indicating that a PDU session ID and/or a PTI identified by the third identification information is not allowed. The PDU session ID of the thirteenth identification information may be a PDU session ID the same as the third identification information. The PTI of the thirteenth identification information may be a PTI the same as the fourth identification information.

Here, the thirteenth identification information may be used as information for identifying a congestion control of which the UE is notified by the NW based on the rejection of the PDU session establishment. In other words, the UE may store and manage the thirteenth identification information in association with the congestion control performed based on the fifteenth behavior to use the thirteenth identification information as information for identifying the performed congestion control. Note that the information identifying the congestion control may include a combination of one or more of the fourteenth identification information to eighteenth identification information with the thirteenth identification information.

The fourteenth identification information in the present embodiment may be information indicating a value of the back-off timer. In other words, the back-off timer may be a value indicating an effective period of the congestion control of which the UE is notified by the NW based on the rejection of the PDU session establishment. In other words, the UE may use the fourteenth identification information as the timer value in the fifteenth behavior that is performed in response to the reception of the fourteenth identification information. Furthermore, the fourteenth identification information may include information identifying the type of congestion control in addition to the timer value. Specifically, information identifying which of the first to fourth congestion controls is the relevant congestion control may be included. For example, the information identifying the type of congestion control may be a timer name identifying each congestion control, or may be a flag identifying each congestion control. This is not a limitation, and the type of congestion control may be identified in other manners such as being identified by the location stored in the control message, and the like.

The fifteenth identification information in the present embodiment is information indicating one or more Cause Values indicating the causes of the rejection of the present procedure. In other words, the cause value may be information indicating the congestion control applied to the present procedure by the NW, or may be information indicating a cause value for rejecting the present procedure applied by the NW other than congestion control.

Note that the cause value may be information for identifying which congestion control of the first to fourth congestion controls is indicated by the congestion control of which the NW notifies the UE, based on the rejection of the PDU session establishment. In this case, depending on each congestion control of the first to fourth congestion controls, the NW may transmit a different value as a cause value to the UE. The UE may know the meaning of each value transmitted as the cause value in advance to identify which of the first to fourth congestion controls is the relevant congestion control, in the fifteenth behavior, based on at least the fifteenth identification information.

Alternatively, the cause value may be information for identifying whether the congestion control of which the NW notifies the UE, based on the rejection of the PDU session establishment is the first congestion control or any congestion control of the second congestion control, the third congestion control, and the fourth congestion control. In this case, the NW may transmit different values as the cause values to the UE depending on the case of the first congestion control and the case of any congestion control of the second congestion control, the third congestion control, and the fourth congestion control. The UE may know the meaning of each value transmitted as the cause value in advance to identify whether the first congestion control or any congestion control of the second congestion control, the third congestion control, and the fourth congestion control, in the fifteenth behavior, based on at least the fifteenth identification information.

Alternatively, the cause value may be information for identifying whether the congestion control of which the NW notifies the UE, based on the rejection of the PDU session establishment is the first congestion control, the second congestion control, or any congestion control of the third congestion control and the fourth congestion control. In this case, the NW may transmit different values as the cause values to the UE depending on the case of the first congestion control, the case of the second congestion control, and the case of any congestion control of the third congestion control and the fourth congestion control. The UE may know the meaning of each value transmitted as the cause value in advance to identify whether the first congestion control, the second congestion control, or any congestion control of the third congestion control and the fourth congestion control, in the fifteenth behavior, based on at least the fifteenth identification information.

Alternatively, the cause value may be information for identifying whether the congestion control of which the NW notifies the UE, based on the rejection of the PDU session establishment is the first congestion control or the second congestion control, or the third congestion control or the fourth congestion control. In this case, the NW may transmit different values as the cause values to the UE depending on the case of the first congestion control or the second congestion control, and the case of the third congestion control or the fourth congestion control. The UE may know the meaning of each value transmitted as the cause value in advance to identify whether the first congestion control or the second congestion control, or the third congestion control or the fourth congestion control, in the fifteenth behavior, based on at least the fifteenth identification information.

Alternatively, the cause value may be information for identifying whether the congestion control of which the NW notifies the UE, based on the rejection of the PDU session establishment is the second congestion control or the third congestion control, or the first congestion control or the fourth congestion control. In this case, the NW may transmit different values as the cause values to the UE depending on the case of the second congestion control or the third congestion control, and the case of the first congestion control or the fourth congestion control. The UE may know the meaning of each value transmitted as the cause value in advance to identify whether the second congestion control or the third congestion control, or the first congestion control or the fourth congestion control, in the fifteenth behavior, based on at least the fifteenth identification information.

Alternatively, the cause value may be information for identifying whether the congestion control of which the NW notifies the UE, based on the rejection of the PDU session establishment is the second congestion control or the fourth congestion control, or the first congestion control or the third congestion control. In this case, the NW may transmit different values as the cause values to the UE depending on the case of the second congestion control or the fourth congestion control, and the case of the first congestion control or the third congestion control. The UE may know the meaning of each value transmitted as the cause value in advance to identify whether the second congestion control or the fourth congestion control, or the first congestion control or the third congestion control, in the fifteenth behavior, based on at least the fifteenth identification information.

Alternatively, the cause value may be information indicating that the NW performs the congestion control for the UE, based on the rejection of the PDU session establishment. In other words, the cause value may be information for causing any of the first to fourth congestion controls to be performed for the UE. In this case, the cause value may not be information that can identify a particular congestion control.

Furthermore, a more detailed example of the above-described cause value for rejecting the present procedure applied by the NW other than congestion control may be a cause value of which the NW notifies the UE, indicating that an external DN rejected the present procedure because the DNN information is not included in the present procedure or because of the unknown DNN (Missing or unknown DNN). The more detailed example may be a cause value of which the NW notifies the UE, indicating that the external DN rejected the present procedure because the PDU session type of the present procedure cannot be recognized or is not allowed (Unknown PDU session type). The more detailed example may be a cause value of which the NW notifies the UE, indicating that the external DN rejected the present procedure because of a failure of user authentication and authorization in the present procedure, or a revoke of authentication and authorization by the external DN, or a revoke of authentication and authorization by the NW (User authentication or authorization failed). The more detailed example may be a cause value of which the NW notifies the UE, indicating that the requested service or operation or the request for resource reservation was rejected due to unspecified reasons (Request rejected, unspecified). The more detailed example may be a cause value of which the NW notifies the UE, indicating that the NW cannot temporarily receive the service request from the UE (Service option temporarily out of order). The more detailed example may be a cause value of which the NW notifies the UE, indicating that the PTI inserted by the UE is already in use (PTI already in use). The more detailed example may be a cause value of which the NW notifies the UE, indicating that the UE is out of the LADN service area (Out of LADN service area). The more detailed example may be a cause value of which the NW notifies the UE, indicating that only PDU session type IPv4 is allowed (PDU session type IPv4 only allowed). The more detailed example may be a cause value of which the NW notifies the UE, indicating that only PDU session type IPv6 is allowed (PDU session type IPv6 only allowed). The more detailed example may be a cause value of which the NW notifies the UE, indicating that the NW does not have the PDU session of interest in a case that the UE transfers the PDU session from the non-3GPP access to the 3GPP access or from the EPS to the 5GS (PDU session does not exist). The more detailed example may be a cause value of which the NW notifies the UE, indicating that the NW does not support the SSC mode requested by the UE (Not supported SSC mode). The more detailed example may be a cause value of which the NW notifies the UE, indicating that the external DN rejected the present procedure because the DNN information is not included in the present procedure via a particular slice or because of the unknown DNN (Missing or unknown DNN in a slice). The more detailed example may be a cause value of which the NW notifies the UE, indicating that the UE does not satisfy the requirement of the maximum data transfer rate for user-plane integrity protection that is required in the service requested by the UE to the NW (Maximum data rate per UE for user-plane integrity protection is too low).

Note that in the present embodiment, in a case that the third congestion control is not performed, the meaning described above corresponding to the third congestion control in the cause value for the fifteenth identification information is unnecessary, and the cause value for the fifteenth identification information may be that in which the process, description, and meaning of the third congestion control are omitted from the description above. Note that in the present embodiment, in a case that the fourth congestion control is not performed, the meaning described above corresponding to the fourth congestion control in the cause value for the fifteenth identification information is unnecessary, and the cause value for the fifteenth identification information may be that in which the process, description, and meaning of the fourth congestion control are omitted from the description above.

As a more detailed example, the fifteenth identification information identifying the first congestion control may be a cause value indicating that the resources are insufficient (Insufficient resources). The fifteenth identification information identifying the second congestion control may be a cause value indicating that the resources for specific slice are insufficient (Insufficient resources for specific slice). The fifteenth identification information identifying the third congestion control may be a cause value indicating that the resources for specific slice and DNN are insufficient (Insufficient resources for specific slice and DNN).

In this way, the fifteenth identification information may be information capable of identifying the type of congestion control, and further, may be information indicating which type of congestion control the back-off timer and/or the back-off timer value indicated by the fourteenth identification information corresponds to.

Accordingly, the UE_A 10 may identify the type of congestion control, based on the fifteenth identification information. Furthermore, which type of congestion control the back-off timer and/or the back-off timer value indicated by the fourteenth identification information corresponds to may be determined based on the fifteenth identification information.

The sixteenth identification information in the present embodiment is one or more pieces of identifier (Indication) information indicating that the present procedure is rejected. In other words, the Indication information may be information indicating the congestion control applied to the present procedure by the NW. The NW may indicate the congestion control applied by the NW, based on the sixteenth identification information.

For example, the Indication information may be information indicating whether or not which congestion control of two or more congestion controls among the first to fourth congestion controls is regulated with respect to the UE by the NW. Accordingly, the NW may transmit a value associated with regulation management applied to the UE, as Indication information. The UE may know the meaning of each value transmitted as the Indication information in advance to identify which of the first to fourth congestion controls is the relevant congestion control, in the fifteenth behavior, based on at least the sixteenth identification information. Here, the two or more congestion controls among the first to fourth congestion controls are congestion controls that can be identified using the Indication information, and the congestion controls to be identified may be all four congestion controls, the first and second congestion controls, the third and fourth congestion controls, the second to fourth congestion controls, or any other combinations thereof.

Note that the Indication information does not necessarily require values corresponding to the all respective congestion controls to be identified. For example, in a case that the congestion controls except for a congestion control A are assigned and associated with the values of the Indication information, the congestion control A may not be necessarily configured with the value of the Indication information. In this case, the NW and the UE can identify that the congestion control A is the first congestion control because the Indication information not being transmitted and/or received. Note that the congestion control A may be any congestion control of the first to fourth congestion controls.

In addition, in a case of notifying the UE of the congestion control, based on the transmission of the PDU session establishment reject message, there may be a case that Identification is included and a case that Identification is not included, depending on the type of congestion control of the first to fourth congestion controls. In other words, depending on the type of congestion control, the NW may use the Identification information as information indicating the congestion control, or may use another piece of identification information as information indicating the congestion control, without using the Identification information, in accordance with the type of congestion control.

Note that in the present embodiment, in a case that the third congestion control is not performed, the meaning described above corresponding to the third congestion control in the Indication information for the sixteenth identification information is unnecessary, and the Indication information for the sixteenth identification information may be that in which the process, description, and meaning of the third congestion control are omitted from the description above. In the present embodiment, in a case that the fourth congestion control is not performed, the meaning described above corresponding to the fourth congestion control in the Indication information for the sixteenth identification information is unnecessary, and the Indication information for the sixteenth identification information may be that in which the process, description, and meaning of the fourth congestion control are omitted from the description above.

The seventeenth identification information in the present embodiment is one or more pieces of Value information indicating that the present procedure is rejected. In other words, the Value information may be information indicating the congestion control applied to the present procedure by the NW. Note that the seventeenth identification information may be information including at least one of identification information for identifying one or multiple NW slices included in the eighteenth identification information, and/or the twelfth identification information.

The NW may indicate the congestion control applied by the NW, based on the seventeenth identification information. In other words, the NW may indicate which congestion control of the first to fourth congestion controls is applied, based on the seventeenth identification information. Furthermore, the NW may indicate the DNN and/or the S-NSSAI that is a target of the congestion control applied to the UE based on the transmission of the PDU session reject message, based on the seventeenth identification information. For example, in a case that the seventeenth identification information is the DNN #1 only, the NW may indicate that the first congestion control associated with the DNN #1 is applied. In a case that the seventeenth identification information is the S-NSSAI #1 only, the NW may indicate that the second congestion control associated with the S-NSSAI #1 is applied. In a case that the seventeenth information includes the DNN #1 and the S-NSSAI #1, the NW may indicate that the third congestion control or the fourth congestion control associated with at least one of the DNN #1 and/or the S-NSSAI #1 is applied.

Note that the seventeenth identification information is not necessarily the information that can identify which congestion control of the first to fourth congestion controls is applied, and the seventeenth identification information may be information indicating the DNN and/or the S-NSSAI that is a target of the congestion control identified by other means, such as being identified based on another piece of identification information.

The eighteenth identification information in the present embodiment may be information indicating that a request for establishment of a PDU session belonging to the first NW slice is rejected, or information indicating that a request for establishment or modification of a PDU session belonging to the first NW slice is not allowed. Here, the first NW slice may be a NW slice determined by the first identification information, or a different NW slice. The eighteenth identification information may be information indicating that establishment of a PDU session belonging to the first NW slice is not allowed in the DN identified by the twelfth identification information, or information indicating that establishment of a PDU session belonging to the first NW slice is not allowed in the PDU session identified by the thirteenth identification information. Furthermore, the eleventh identification information may be information indicating that establishment of a PDU session belonging to the first slice is not allowed in a registration area and/or tracking area to which the UE_A 10 currently belongs, or information indicating that establishment of a PDU session belonging to the first NW slice is not allowed in an access network to which the UE_A 10 is connected. Furthermore, the eleventh identification information may be identification information for identifying one or multiple NW slices determining a NW slice to which a rejected PDU session request belongs. Furthermore, the eighteenth identification information may be identification information indicating the auxiliary information for the radio access system to select the appropriate MME in a case that the UE switches the connection destination to the EPS. Note that the auxiliary information may be information indicating the DCN ID. Furthermore, the eighteenth identification information may be the network slice association rule that is a rule for associating multiple pieces of network slice information.

The 21st identification information in the present embodiment may be information to stop one or multiple first timers run by the UE, or may be information indicating a first timer to stop among the first timers run by the UE. Specifically, the 21st identification information may be information indicating the thirteenth identification information stored in the UE in association with the first timer. Furthermore, the 21st identification information may be information indicating at least one of the twelfth identification information to eighteenth identification information stored in the UE in association with the first timer.

Furthermore, the 21st identification information may be information to change the association between the first timer stored in the UE and information indicating at least one of the thirteenth identification information to seventeenth identification information. For example, in a case that the first timer that prohibits a UE-initiated session management for a combination of DNN #A and S-NSSAI #A is running, in a case of receiving a NW-initiated session management request including the 21st identification information that allows connection to the DNN #A, the UE may change the association with the running timer to only with the S-NSSAI #A, and may recognize that the UE-initiated session management request to the DNN #A is allowed. In other words, the 21st identification information may be information indicating that the congestion control applied at the time of receiving the 21st identification information is changed to another congestion control among the first to fourth congestion controls.

Figure 9:
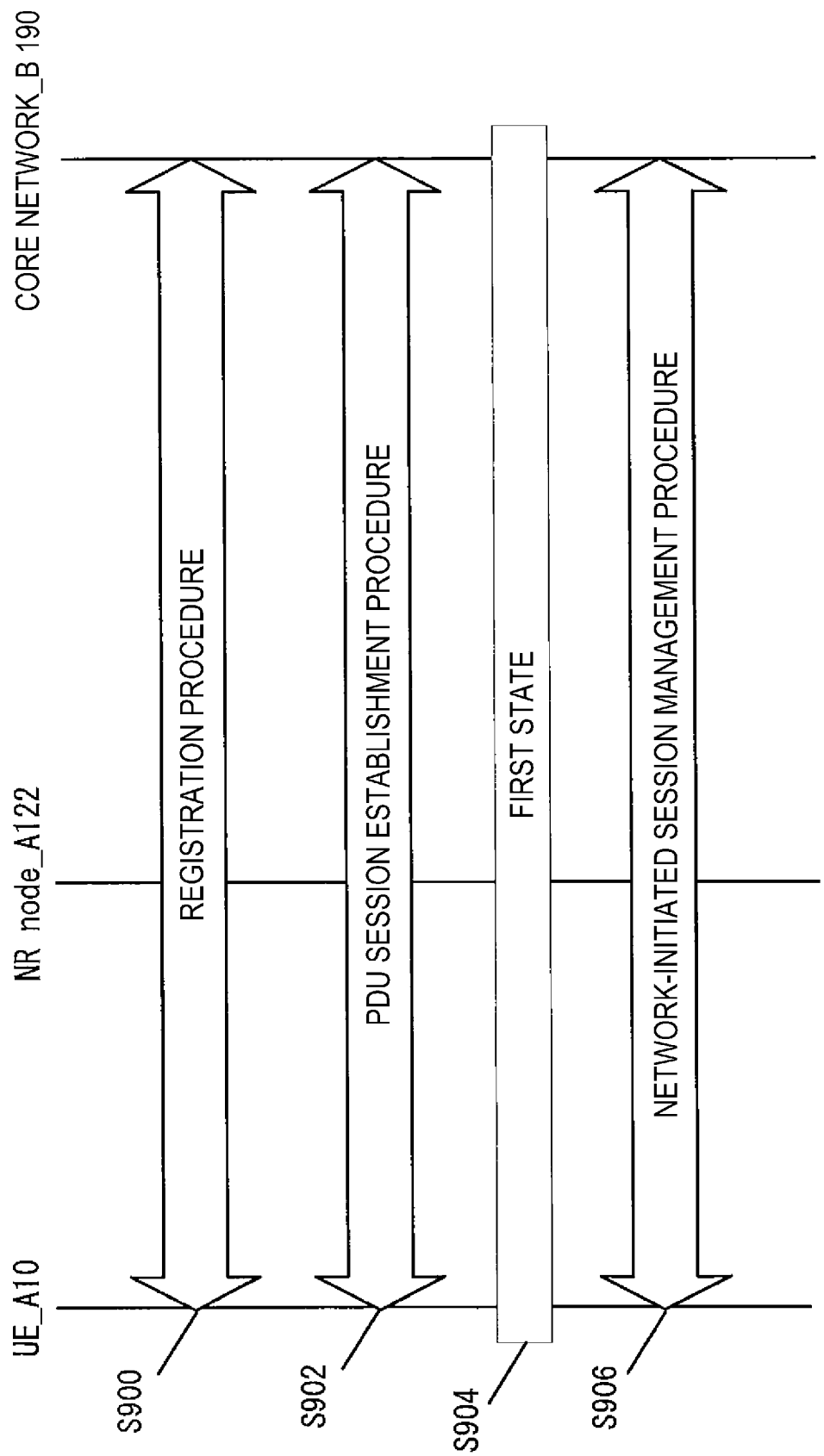
FIG. 9 is a diagram illustrating an initial procedure.

Next, the initial procedure according to the present embodiment will be described using FIG. 9. Hereinafter, the initial procedure is also referred to as the present procedure, and the present procedure includes the Registration procedure, the UE-initiated PDU session establishment procedure, and the network-initiated session management procedure. Details of the registration procedure, the PDU session establishment procedure, and the network-initiated session management procedure will be described later.

Specifically, each apparatus performs the registration procedure (S900), and thereby, the UE_A 10 transitions to a state of being registered in the network (RM-REGISTERED state). Next, by performing the PDU session establishment procedure by each apparatus (S902), the UE_A 10 establishes the PDU session with the DN_A 5 that provides the PDU connection service, via the core network_B 190 and transitions to the first state (S904). Note that the PDU session is assumed to be established via the access network and the UPF_A 235, but is not limited thereto. That is, a UPF (UPF_C 239) different from the UPF_A 235 may be present between the UPF_A 235 and the access network. At this time, the PDU session is established via the access network, the UPF_C 239, and the UPF_A 235. Next, each apparatus in the first state may perform the network-initiated session management procedure at any timing (S906).

Note that each apparatus may exchange various pieces of capability information and/or various pieces of request information of each apparatus in the registration procedure and/or the PDU session establishment procedure and/or the network-initiated session management procedure. Note that in a case that each apparatus performs the exchange of various pieces of information and/or negotiation of various requests in the registration procedure, each apparatus may or need not perform the exchange of various pieces of information and/or the negotiation of various requests in the PDU session establishment procedure and/or the network-initiated session management procedure. In a case that each apparatus does not perform the exchange of various pieces of information and/or the negotiation of various requests in the registration procedure, each apparatus may perform the exchange of various pieces of information and/or the negotiation of various requests in the PDU session establishment procedure and/or the network-initiated session management procedure. Even in a case that each apparatus performs the exchange of various pieces of information and/or the negotiation of various requests in the registration procedure, each apparatus may perform the exchange of various pieces of information and/or the negotiation of various requests in the PDU session establishment procedure and/or the network-initiated session management procedure.

In addition, each apparatus may perform the PDU session establishment procedure in the registration procedure or after the registration procedure is completed. Furthermore, in a case that the PDU session establishment procedure is performed in the registration procedure, the PDU session establishment request message included in the registration request message may be transmitted and/or received, and the PDU session establishment accept message included in the registration accept message may be transmitted and/or received, a PDU session establishment complete message included in a registration complete message may be transmitted and/or received, and a PDU session establishment reject message included in a registration reject message may be transmitted and/or received. In a case that the PDU session establishment procedure is performed in the registration procedure, each apparatus may establish a PDU session, based on the completion of the registration procedure, or may transition to the state where the PDU session is established between the apparatuses.

Furthermore, each apparatus involved in the present procedure may transmit and/or receive each control message described in the present procedure to transmit and/or receive one or more pieces of identification information included in each control message and store each piece of identification information transmitted and/or received as a context.

1.3.1. Overview of Registration Procedure

First, the following describes the overview of the registration procedure. The registration procedure is a procedure initiated by the UE_A 10 to register to the network (the access network, and/or the core network_B 190, and/or the DN_A 5). In a state in which the UE_A 10 is not registered in the network, the UE_A 10 can perform the present procedure at any timing such as the timing of turning on power. In other words, the UE_A 10 may initiate the present procedure at any timing in a non-registered state (RM-DEREGISTERED state). In addition, each apparatus may transition to a registered state (RM-REGISTERED state), based on the completion of the registration procedure.

Furthermore, the present procedure may be a procedure for updating location registration information of the UE_A 10 in the network, for regularly notifying a state of the UE_A 10 from the UE_A 10 to the network, and/or for updating particular parameters related to the UE_A 10 in the network.

The UE_A 10 may initiate the present procedure in a case that the UE_A 10 applies mobility across TAs. In other words, the UE_A 10 may initiate the present procedure in a case that the UE_A 10 moves to a TA different from a TA indicated in a TA list that the UE_A 10 holds. Furthermore, the UE_A 10 may initiate the present procedure in a case that a running timer expires. The UE_A 10 may initiate the present procedure in a case that a context of each apparatus needs to be updated due to disconnection or invalidation (also referred to as deactivation) of a PDU session. Furthermore, the UE_A 10 may initiate the present procedure in a case that a change occurs in capability information and/or preference concerning PDU session establishment of the UE_A 10. Furthermore, the UE_A 10 may initiate the present procedure regularly. Note that, besides the above, the UE_A 10 can perform the present procedure at any timing as long as a PDU session is established.

1.3.1.1. Example of Registration Procedure

Figure 10:
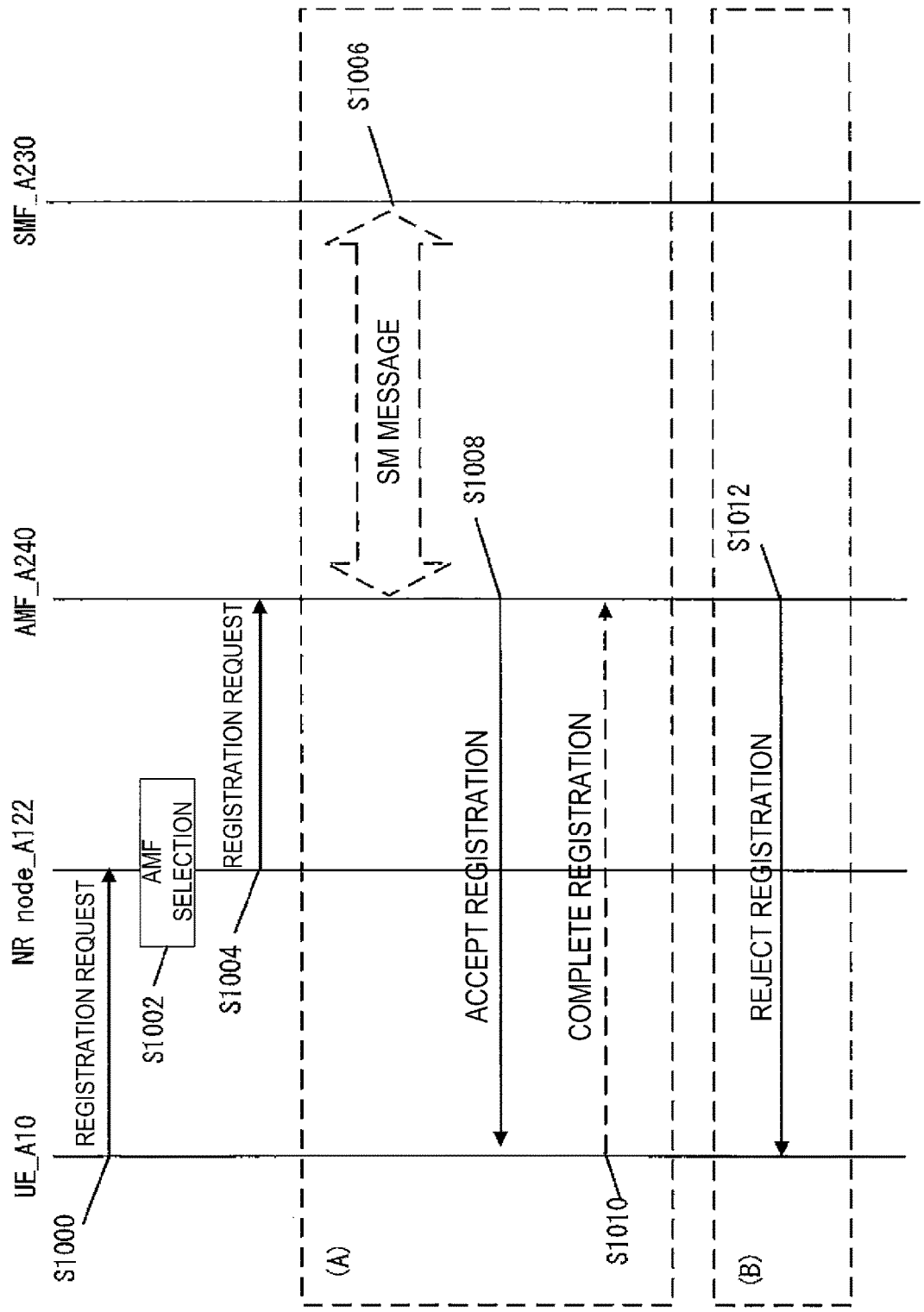
FIG. 10 is a diagram illustrating a registration procedure.

An example procedure of performing the registration procedure will be described with reference to FIG. 10. In this section, the present procedure refers to the registration procedure. Each step of the present procedure will be described below.

First, the UE_A 10 transmits a Registration Request message to the AMF_A 240 via the NR node (also referred to as the gNB)_A 122 and/or the ng-eNB (S1000) (S1002) (S1004) to initiate the registration procedure. In addition, the UE_A 10 may transmit a Session Management (SM) message (e.g., a PDU session establishment request message) included in the registration request message, or transmit the SM message (e.g., the PDU session establishment request message) along with the registration request message to initiate a procedure for session management (SM) such as a PDU session establishment procedure, during the registration procedure.

Specifically, the UE_A 10 transmits a Radio Resource Control (RRC) message including the registration request message to the NR node_A 122 and/or the ng-eNB (S1000). The NR node_A 122 and/or the ng-eNB, in a case of receiving the RRC message including the registration request message, retrieves the registration request message in the RRC message and selects the AMF_A 240 as the NF or the common CP function to which the registration request message is routed (S1002). Here, the NR node_A 122 and/or the ng-eNB may select the AMF_A 240, based on information included in the RRC message. The NR node_A 122 and/or the ng-eNB transmit or forward the registration request message to the selected AMF_A 240 (S1004).

Note that the registration request message is a Non-Access-Stratum (NAS) message transmitted and/or received on the N1 interface. The RRC message is a control message transmitted and/or received between the UE_A 10 and the NR node_A 122 and/or the ng-eNB. The NAS message is processed in a NAS layer, the RRC message is processed in an RRC layer, and the NAS layer is the higher layer than the RRC layer.

In addition, in a case that there are multiple NSIs requesting registration, the UE_A 10 may transmit a registration request message for each of the NSIs, or may transmit multiple registration request messages included in one or more RRC messages. Furthermore, the above-described multiple registration request messages included in one or more RRC messages may be transmitted as one registration request message.

The AMF_A 240, in a case of receiving the registration request message and/or the control message different from the registration request message, performs a first condition determination. The first condition determination is for the AMF_A 240 to determine whether to accept a request of the UE_A 10. In the first condition determination, the AMF_A 240 determines whether the first condition determination is true or false. In a case that the first condition determination is true (that is, in a case that the network accepts the request of the UE_A 10), the AMF_A 240 initiates a procedure (A) in the present procedure, or in a case that the first condition determination is false (that is, in a case that the network does not accept the request of the UE_A 10), the AMF_A 240 initiates a procedure (B) in the present procedure.

As follows, steps in a case that the first condition determination is true, in other words, each step of the procedure (A) in the present procedure will be described. The AMF_A 240 performs a fourth condition determination, and initiates the procedure (A) in the present procedure. The fourth condition determination is for the AMF_A 240 to determine whether to transmit and/or receive an SM message to and/or from the SMF_A 230. In other words, the fourth condition determination may be for the AMF_A 240 to determine whether to perform the PDU session establishment procedure in the present procedure. In a case that the fourth condition determination is true (i.e., in a case that the AMF_A 240 is to transmit and/or receive an SM messages to and/or from the SMF_A 230), the AMF_A 240 selects the SMF_A 230, and transmits and/or receives an SM message to and/or from the selected SMF_A 230, or in a case that the fourth condition determination is false (i.e., in a case that the AMF_A 240 does not transmit and/or receive an SM messages to and/or from the SMF_A 230), the AMF_A 240 omits those operations (S1006). Note that in a case that the AMF_A 240 receives an SM message indicating rejection from the SMF_A 230, the AMF_A 240 may terminate the procedure (A) in the present procedure, and may initiate the procedure (B) in the present procedure.

In addition, the AMF_A 240 transmits the Registration Accept message to the UE_A 10 via the NR node_A 122, based on the reception of the registration request message from the UE_A 10 and/or the completion of the transmission and/or reception of the SM message to/from the SMF_A 230 (S1008). For example, in the case that the fourth condition determination is true, the AMF_A 240 may transmit the registration accept message, based on the reception of the registration request message from the UE_A 10. In the case that the fourth condition determination is false, the AMF_A 240 may transmit the registration accept message, based on the completion of the transmission and/or reception of the SM message to and/or from the SMF_A 230. Here, the registration accept message may be transmitted as a response message to the registration request message. The registration accept message is a NAS message transmitted and/or received on the N1 interface, and for example, the AMF_A 240 may transmit a registration accept message as a control message of the N2 interface to the NR node_A 122, and the NR node_A 122 may transmit the received message with being included in the RRC message to the UE_A 10.

In the case that the fourth condition determination is true, the AMF_A 240 may transmit an SM message (e.g., a PDU session establishment accept message) with being included in the registration accept message, or transmit an SM message (e.g., a PDU session establishment accept message) together with the registration accept message. This transmission method may be performed in a case that the SM message (e.g., a PDU session establishment request message) is included in the registration request message, and the fourth condition determination is true. Furthermore, the transmission method may be performed in a case that the registration request message and the SM message (e.g., the PDU session establishment request message) are included and the fourth condition determination is true. The AMF_A 240 may indicate that the procedure for SM has been accepted by performing such a transmission method.

The UE_A 10 receives the registration accept message via the NR node_A 122 (S1008). The UE_A 10 receives the registration accept message and recognizes the contents of various types of identification information included in the registration accept message.

Next, the UE_A 10 transmits a Registration Complete message to the AMF_A 240, based on the reception of the registration accept message (S1010). Note that, in a case that the UE_A 10 has received an SM message such as a PDU session establishment accept message, the UE_A 10 may transmit the SM message such as the PDU session establishment complete message included in the registration complete message, or may include the SM message therein to indicate that the procedure for SM is completed. Here, the registration complete message may be transmitted as a response message to the registration accept message. The registration complete message is a NAS message transmitted and/or received on the N1 interface, and for example, the UE_A 10 may transmit a registration complete message with being included in an RRC message to the NR node_A 122, and the NR node_A 122 may transmit the received message as a control message of the N2 interface to the AMF_A 240.

The AMF_A 240 receives the registration complete message (S1010). In addition, each apparatus completes the procedure (A) in the present procedure, based on the transmission and/or reception of the registration accept message and/or the registration complete message.

Next, steps in the case that the first condition determination is false, that is, the steps in the procedure (B) in the present procedure will be described. The AMF_A 240 transmits a Registration Reject message to the UE_A 10 via the NR node_A 122 (S1012) to initiate the procedure (B) in the present procedure. Here, the registration reject message may be transmitted as a response message to the registration request message. The registration reject message is a NAS message transmitted and/or received on the N1 interface, and for example, the AMF_A 240 may transmit a registration reject message as a control message of the N2 interface to the NR node_A 122, and the NR node_A 122 may transmit the received message with being included in the RRC message to the UE_A 10. Further, the registration reject message transmitted by the AMF_A 240 is not limited thereto as long as it is a message for rejecting the request of the UE_A 10.

Note that the procedure (B) during the present procedure may be initiated in a case that the procedure (A) in the present procedure is canceled. Note that in the case that the fourth condition determination is true during the procedure (A), the AMF_A 240 may transmit the registration reject message including an SM message meaning rejection such as a PDU session establishment reject message, or may indicate that the procedure for the SM is rejected by including the SM message meaning rejection. In that case, the UE_A 10 may further receive the SM message, such as the PDU session establishment reject message, that indicates rejection, or may recognize that the procedure for SM has been rejected.

The UE_A 10 may receive the registration reject message, or not receive the registration accept message, and thereby, recognize that the request of the UE_A 10 is rejected. Each apparatus completes the procedure (B) in the present procedure, based on the transmission and/or reception of the registration reject message.

Each apparatus completes the present procedure (registration procedure), based on the completion of the procedure (A) or (B) in the present procedure. Note that each apparatus may transition to a state in which the UE_A 10 is registered with the network (RM_REGISTERED state), based on the completion of the procedure (A) in the present procedure, or may maintain a state in which the UE_A 10 is not registered with the network (RM_DEREGISTERED state), based on the completion of the procedure (B) in the present procedure. Transition to each state of each apparatus may be performed based on completion of the present procedure, or may be performed based on an establishment of a PDU session.

Furthermore, each apparatus may perform processing, based on identification information transmitted and/or received in the present procedure, based on completion of the present procedure.

Furthermore, the first condition determination may be performed based on identification information, and/or subscriber information, and/or an operator policy included in the registration request message. For example, the first condition determination may be true in a case that the network allows a request of the UE_A 10. In addition, the first condition determination may be false in a case that the network does not allow a request of the UE_A 10. Furthermore, the first condition determination may be true in a case that the network of a destination of registration of the UE_A 10 and/or an apparatus in the network supports a function requested by the UE_A 10, and may be false in a case that the network and/or the apparatus does not support the function. The first condition determination may be true in a case that the network is determined to be in a congested state, or may be false in a case determined not to be in a congested state. Note that conditions for determining whether the first condition determination is true or false may not be limited to the above-described conditions.

The fourth condition determination may also be performed based on whether the AMF_A 240 has received an SM and may be performed based on whether an SM message is included in the registration request message. For example, the fourth condition determination may be true in a case that the AMF_A 240 has received the SM and/or the SM message is included in the registration request message, and may be false in a case that the AMF_A 240 has not received the SM and/or the SM message is not included in the registration request message. Note that conditions for determining whether the fourth condition determination is true or false may not be limited to the above-described conditions.

1.3.2. Overview of PDU Session Establishment Procedure

Next, an overview of the PDU session establishment procedure performed to establish a PDU session with the DN_A 5 will be described. The PDU session establishment procedure is also referred to as a present procedure below. The present procedure is a procedure for each apparatus to establish the PDU session. Note that each apparatus may perform the present procedure in a state in which the registration procedure is completed or during the registration procedure. In addition, each apparatus may initiate the present procedure in a registered state, or may initiate the present procedure at any timing after the registration procedure. Each apparatus may establish the PDU session, based on completion of the PDU session establishment procedure. Furthermore, each apparatus may perform the present procedure multiple times to establish multiple PDU sessions.

1.3.2.1. Example of PDU Session Establishment Procedure

Figure 11:
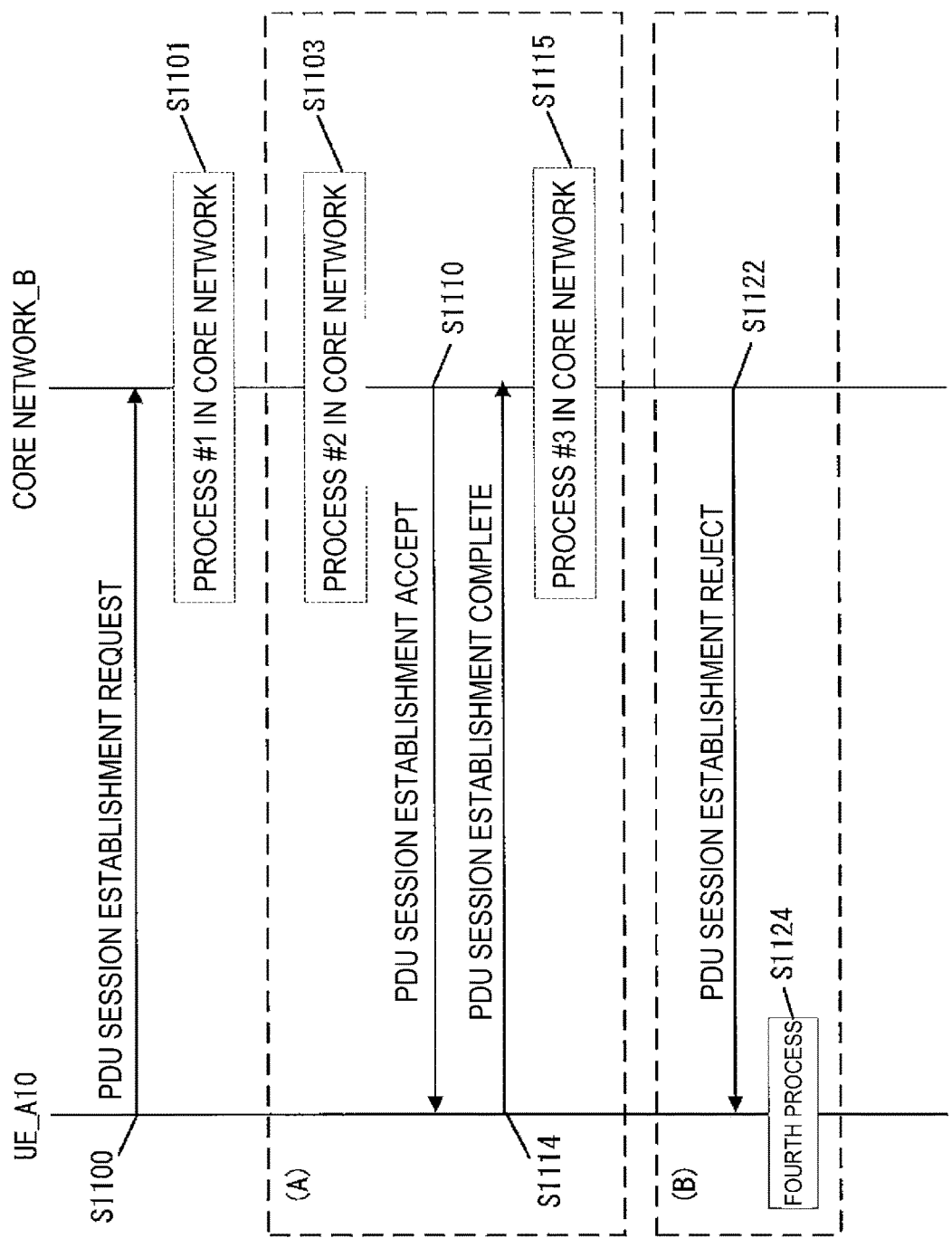
FIG. 11 is a diagram illustrating a PDU session establishment procedure.

An example of a process of performing the PDU session establishment procedure will be described with reference to FIG. 11. Each step of the present procedure will be described below. First, the UE_A 10 transmits a PDU Session Establishment Request message to the core network_B via the access network_B (S1100) to initiate the PDU session establishment procedure.

Specifically, the UE_A 10 transmits the PDU session establishment request message to the AMF_A 240 in the core network_B 190 via the NR node_A 122 by way of the N1 interface (S1100). The AMF_A receives the PDU session establishment request message, and performs the third condition determination. The third condition determination is for the AMF_A to determine whether to accept the request of the UE_A 10. In the third condition determination, the AMF_A determines whether the fifth condition determination is true or false. The core network_B initiates a process #1 in the core network (S1101) in a case that the third condition determination is true, or initiates the procedure (B) in the present procedure in a case that the third condition determination is false. Note that steps in the case that the third condition determination is false will be described later. Here, the process #1 in the core network may be SMF selection by the AMF_A in the core network_B 190, and/or transmission and/or reception of the PDU session establishment request message between the AMF_A and the SMF_A.

The core network_B 190 starts the process #1 in the core network. In the process #1 in the core network, the AMF_A 240 may select the SMF_A 230 as the NF to which the PDU session establishment request message is routed, and transmit or forward the PDU session establishment request message to the selected SMF_A 230 by way of the N11 interface. Here, the AMF_A 240 may select the SMF_A 230 of the routing destination, based on the information included in the PDU session establishment request message. More specifically, the AMF_A 240 may select the SMF_A 230 of the routing destination, based on each piece of identification information acquired based on the reception of the PDU session establishment request message, and/or the subscriber information, and/or the capability information of the network, and/or the operator policy, and/or the state of the network, and/or the context already held by the AMF_A 240.

The PDU session establishment request message may be a NAS message. The PDU session establishment request message only needs to be a message requesting the PDU session establishment and not limited to this.

Here, the UE_A 10 may include one or more pieces of the first identification information to fourth identification information in the PDU session establishment request message, or may include these pieces of identification information to indicate a request of the UE_A 10. Note that two or more pieces of identification information of these pieces of identification information may be configured as one or more pieces of identification information.

Moreover, the UE_A 10 may transmit the first identification information and/or the second identification information and/or the third identification information and/or the fourth identification information with being included in the PDU session establishment request message to request establishment of a PDU session belonging to a network slice, indicate a network slice to which a PDU session requested by the UE_A 10 belongs, or indicate a network slice to which a PDU session is going to belong.

To be more specific, the UE_A 10 may transmit the first identification information and the second identification information with being associated with each other to request establishment of a PDU session belonging to a network slice, indicate a network slice to which a PDU session requested by the UE_A 10 belongs, or indicate a network slice to which a PDU session is to belong, in a PDU session established for a DN identified by the second identification information.

Further, the UE_A 10 may transmit two or more pieces of identification information among the first identification information to fourth identification information with being combined with each other to perform the request combined with the above described matters. Note that the matters indicated by the UE_A 10 transmitting the identification information may not be limited to these.

Note that the UE_A 10 may determine which piece of identification information among the first identification information to fourth identification information is to be included in the PDU session establishment request message, based on the capability information of the UE_A 10, and/or a policy such as a UE policy, and/or a preference of the UE_A 10, and/or the application (higher layer). Note that the determination performed by the UE_A 10 as to which piece of identification information is to be included in the PDU session establishment request message is not limited to the determination described above.

The SMF_A 230 in the core network_B 190 receives the PDU session establishment request message and performs the third condition determination. The third condition determination is for the SMF_A 230 to determine whether to accept a request of the UE_A 10. In the third condition determination, the SMF_A 230 determines whether the third condition determination is true or false. The SMF_A 230 initiates the procedure (A) in the present procedure in a case that the third condition determination is true, or initiates the procedure (B) in the present procedure in a case that the third condition determination is false. Note that steps in the case that the third condition determination is false will be described later.

Hereinafter, steps in the case that third condition determination is true, that is, the steps in the procedure (A) in the present procedure will be described. The SMF_A 230 selects the UPF_A 235 in which a PDU session is established, and performs an eleventh condition determination.

Here, the eleventh condition determination is for each apparatus to determine whether to perform a process #2 in the core network. Here, the process #2 in the core network may include initiating and/or performing of a PDU session establishment authentication procedure by each apparatus, and/or transmission and/or reception of a Session Establishment request message between the SMF_A and UPF_A in the core network_B 190, and/or transmission and/or reception of a Session Establishment response message, and the like (S1103). In the eleventh condition determination, the SMF_A 230 determines whether the eleventh condition determination is true or false. The SMF_A 230 initiates PDU session establishment authentication/authorization procedure in a case that the eleventh condition determination is true, or omits the PDU session establishment authentication/authorization procedure in a case that the eleventh condition determination is false. Note that details of the PDU session establishment authentication/authorization procedure in the process #2 in the core network are described later.

Next, the SMF_A 230 transmits a session establishment request message to the selected UPF_A 235, based on the eleventh condition determination and/or completion of the PDU session establishment authentication/authorization procedure, to initiate the procedure (A) in the present procedure. Note that the SMF_A 230 may not initiate the procedure (A) in the present procedure, based on the completion of the PDU session establishment authentication/authorization procedure, but may initiate the procedure (B) in the present procedure.

Here, the SMF_A 230 may select one or more UPFs_A 235, based on each piece of identification information acquired based on the reception of the PDU session establishment request message, and/or the capability information of the network, and/or the subscriber information, and/or the operator policy, and/or the state of the network, and/or the context already held by the SMF_A 230. Note that in a case that multiple UPFs_A 235 are selected, the SMF_A 230 may transmit the session establishment request message to each UPF_A 235.

The UPF_A 235 receives the session establishment request message and creates a context for the PDU session. In addition, the UPF_A 235 transmits the session establishment response message to the SMF_A 230, based on the reception of the session establishment request message and/or the creation of the context for the PDU session. Furthermore, the SMF_A 230 receives a session establishment response message. Note that the session establishment request message and the session establishment response message may be control messages transmitted and/or received on the N4 interface. Further, the session establishment response message may be a response message to the session establishment request message.

Further, the SMF_A 230 may assign an address to be assigned to the UE_A 10, based on the reception of the PDU session establishment request message and/or the selection of the UPF_A 235 and/or the reception of the session establishment response message. Note that the SMF_A 230 may assign the address to be assigned to the UE_A 10 during the PDU session establishment procedure, or may assign the address after the completion of the PDU session establishment procedure.

Specifically, in a case that the SMF_A 230 assigns the IPv4 address without using the DHCPv4, the SMF_A 230 may assign the address during the PDU session establishment procedure or may transmit the assigned address to the UE_A 10. In addition, in a case that the SMF_A 230 assigns the IPv4 address, and/or the IPv6 address, and/or the IPv6 prefix using the DHCPv4 or the DHCPv6 or Stateless Address Autoconfiguration (SLAAC), the SMF_A 230 may assign the address after the PDU session establishment procedure or may transmit the assigned address to the UE_A 10. Note that the address allocation performed by SMF_A 230 is not limited to these.

Furthermore, the SMF_A 230 may transmit the allocated address with being included in the PDU session establishment accept message to the UE_A 10, based on the completion of the address allocation of the address to be allocated to the UE_A 10, or may transmit to the UE_A 10 after the completion of the PDU session establishment procedure.

The SMF_A 230 transmits a PDU session establishment accept message to the UE_A 10 via the AMF_A 240, based on the reception of the PDU session establishment request message, and/or the selection of the UPF_A 235, and/or the reception of the session establishment response message, and/or the completion of the address allocation of the address to be allocated to the UE_A 10 (S1110).

Specifically, the SMF_A 230 transmits the PDU session establishment accept message to the AMF_A 240 by way of the N11 interface, and the AMF_A 240 receiving the PDU session establishment accept message transmits the PDU session establishment accept message to the UE_A 10 by way of the N1 interface.

Note that in a case that the PDU session is PDN connection, the PDU session establishment accept message may be a PDN connectivity accept message. Furthermore, the PDU session establishment accept message may be a NAS message transmitted and/or received on the N11 interface and the N1 interface. The PDU session establishment accept message is not limited to the PDU session establishment accept message described above, and only needs to be a message indicating the acceptance of the establishment of the PDU session.

The UE_A 10 receives the PDU session establishment accept message from the SMF_A 230. The UE_A 10 receives the PDU session establishment accept message to recognize the contents of various pieces of identification information included in the PDU session establishment accept message.

Next, the UE_A 10 transmits the PDU session establishment complete message to the SMF_A 230 via the AMF_A 240, based on completion of the reception of the PDU session establishment accept message (S1114). Furthermore, the SMF_A 230 receives the PDU session establishment complete message, and performs the second condition determination.

Specifically, the UE_A 10 transmits the PDU session establishment complete message to the AMF_A 240 by way of the N1 interface, and the AMF_A 240 receiving the PDU session establishment complete message transmits the PDU session establishment complete message to the SMF_A 230 by way of the N11 interface.

Note that in a case that the PDU session is PDN connection, the PDU session establishment complete message may be a PDN Connectivity complete message, or may be an Activate default EPS bearer context accept message. Furthermore, the PDU session establishment complete message may be a NAS message transmitted and/or received on the N1 interface and the N11 interface. The PDU session establishment complete message only needs to be a response message to the PDU session establishment accept message. However, the PDU session establishment complete message is not limited to this, and only needs to be a message indicating that the PDU session establishment procedure is completed.

The second condition determination is for the SMF_A 230 to determine a type of message to be transmitted and/or received on the N4 interface. In a case that the second condition determination is true, a process #3 in the core network may be started (S1115). Here, the process #3 in the core network may include transmission and/or reception of a Session Modification request message and/or transmission and/or reception of a Session Modification response message. The SMF_A 230 transmits the session modification request message to the UPF_A 235, and further receives the session modification accept message transmitted from the UPF_A 235 that has received the session modification request message. In a case that the second condition determination is false, the SMF_A 230 performs the process #2 in the core network. Specifically, the SMF_A transmits the session establishment request message to the UPF_A 235, and further receives the session modification accept message transmitted from the UPF_A 235 that has received the session establishment request message.

Each apparatus completes the procedure (A) in the present procedure, based on the transmission and/or reception of the PDU session establishment complete message, and/or the transmission and/or reception of the session modification response message, and/or the transmission and/or reception of the session establishment response message, and/or the transmission and/or reception of the Router Advertisement (RA).

Next, steps in the case that the third condition determination is false, that is, the steps in the procedure (B) in the present procedure will be described. The SMF_A 230 transmits a PDU session establishment reject message to the UE_A 10 via the AMF_A 240 (S1122) to initiate the procedure (B) in the present procedure.

Specifically, the SMF_A 230 transmits the PDU session establishment reject message to the AMF_A 240 by way of the N11 interface, and the AMF_A 240 receiving the PDU session establishment request message transmits the PDU session establishment reject message to the UE_A 10 by way of the N1 interface.

Note that in a case that the PDU session is PDN connection, the PDU session establishment reject message may be a PDN connectivity reject message. Furthermore, the PDU session establishment reject message may be a NAS message transmitted and/or received on the N11 interface and the N1 interface. The PDU session establishment reject message is not limited to the PDU session establishment reject message described above, and only needs to be a message indicating that the PDU session establishment has been rejected.

Here, the SMF_A 230 may include one or more pieces of identification information among the eleventh identification information to eighteenth identification information in the PDU session establishment reject message, or may indicate that the request of the UE_A 10 is rejected by including these pieces of identification information. Note that two or more pieces of identification information of these pieces of identification information may be configured as one or more pieces of identification information.

Moreover, the SMF_A 230 may indicate that a request to establish a PDU session belonging to a network slice is rejected, or indicate a network slice to which belonging of a PDU session is not allowed by including the eleventh identification information and/or the twelfth identification information and/or the thirteenth identification information and/or the fourteenth identification information and/or the fifteenth identification information and/or the sixteenth identification information and/or the seventeenth identification information and/or the eighteenth identification information in the PDU session establishment reject message and transmitting at least one of them.

To be more specific, the SMF_A 230 may transmit the eighteenth identification information and the twelfth identification information with being associated with each other to indicate that a request to establish a PDU session belonging to a network slice is rejected, or indicate a network slice to which belonging of a PDU session is not allowed, in a PDU session established to a DN identified by the twelfth identification information.

Further, the SMF_A 230 may transmit the eighteenth identification information with being included in the PDU session establishment reject message to indicate that a request to establish a PDU session belonging to a network slice is rejected, or indicate a network slice to which belonging of a PDU session is not allowed, in a registration area and/or tracking area to which the UE_A 10 currently belongs.

Furthermore, the SMF_A 230 may transmit the eighteenth identification information with being included in the PDU session establishment reject message to indicate that a request to establish a PDU session belonging to a network slice is rejected, or indicate a network slice to which belonging of a PDU session is not allowed, in an access network to which the UE_A 10 currently connects.

Moreover, the SMF_A 230 may transmit the eleventh identification information and/or the fourteenth identification information with being included in the PDU session establishment reject message to indicate a value of the first timer, or indicate whether the same procedure as the present procedure should be performed again after the completion of the present procedure.

Furthermore, the SMF_A 230 may transmit two or more pieces of identification information among the eleventh identification information to eighteenth identification information with being combined with each other to perform the request combined with the above described matters. Note that the matters indicated by the SMF_A 230 transmitting the identification information may not be limited to these.

Note that the SMF_A 230 may determine which piece of identification information among the eleventh identification information to eighteenth identification information is to be included in the PDU session establishment reject message, based on the received identification information, and/or the capability information of the network, and/or the policy such as the operator policy, and/or the state of the network.

Furthermore, the twelfth identification information may be information indicating the same DNN as the DNN indicated by the second identification information. Furthermore, the thirteenth identification information may be information indicating the same PDU session ID as the PDU session ID indicated by the third identification information. Moreover, the eighteenth identification information may be information transmitted in a case that the first identification information is received and/or in a case that the network slice indicated by the first identification information is not allowed by the network. Note that determination performed by the SMF_A 230 as to which piece of identification information is to be included in the PDU session establishment reject message is not limited to the determination described above.

As described above, the core network_B 190 transmits the PDU session reject message to notify the UE_A 10 of the congestion control to apply. Note that by doing so, the core network_B 190 may notify of application of the congestion control to the UE_A 10, and/or indication to the UE_A 10 that the congestion control is to be performed, and/or information identifying the type of congestion control to apply, and/or information identifying a target of the congestion control, such as DNN and/or S-NSSAI, corresponding to the congestion control to apply, and/or the value of the timer associated with the congestion control to apply.

Here, each piece of the above-described information may be information identified by one or more pieces of identification information of the eleventh identification information to eighteenth identification information.

The PDU session establishment reject message the UE_A 10 receives from the SMF_A 230 may include one or more pieces of identification information among the eleventh identification information to eighteenth identification information.

Next, the UE_A 10 performs the fourth process, based on the reception of the PDU session establishment reject message (S1124). The UE_A 10 may perform the fourth process, based on the completion of the present procedure.

A first example of the fourth process will be described below.

Here, the fourth process may be a process in which the UE_A 10 recognizes the matter indicated by the SMF_A 230. The fourth process may be a process in which the UE_A 10 stores the received identification information as a context, or may be a process in which the UE_A 10 forwards the received identification information to the higher layer and/or the lower layer. The fourth process may be a process in which the UE_A 10 recognizes that the request for the present procedure is rejected.

Moreover, in a case that the UE_A 10 receives the fourteenth identification information and the eleventh identification information, the fourth process may be a process in which the UE_A 10 configures a value indicated by the fourteenth identification information as the first timer value, or a process in which the UE_A 10 starts the first timer configured with the timer value. Furthermore, in the case that the UE_A 10 receives the eleventh identification information, the fourth process may be a process to perform one or more behaviors of the first to eleventh behaviors.

Further, in a case that the UE_A 10 receives the eighteenth identification information and the eleventh identification information, the fourth process may be a process in which the UE_A 10 performs the twelfth behavior, based on the information identifying the NW slice included in the eighteenth identification and the network slice association rule included in the eighteenth identification information or the network slice association rule held in advance and configured by the UE_A 10.

Furthermore, in a case that the UE_A 10 receives the multiple pieces of the fourteenth identification information and the eleventh identification information, the fourth process may be a process in which the UE_A 10 performs the thirteenth behavior, based on the multiple first timers included in the respective pieces of the fourteenth identification information and the back-off timer priority management rule held by the UE_A 10.

Furthermore, in a case that the UE_A 10 receives the multiple pieces of the fourteenth identification information and the eleventh identification information, the fourth process may be a process in which the UE_A 10 performs the fourteenth behavior, based on the multiple first timers included in the respective pieces of the fourteenth identification information.

Here, the twelfth to fifteenth behaviors may be the congestion controls initiated by the UE_A 10, based on rules and/or policies in the UE_A 10. Specifically, for example, the UE_A 10 may include, in a storage unit/or a controller within the UE_A 10, a policy (UE policy) and/or a rule, a management function of a policy and/or a rule, a policy enforcer causing the UE_A 10 to operate based on a policy and/or a rule, one or multiple applications, and a session management instance (session manager) for managing one or multiple PDU sessions to establish or attempt to establish based on a request from each application, and may perform, based on these, any of the twelfth to fifteenth behaviors as the fourth process to implement the congestion control initiated by the UE_A 10. Here, the policy and/or the rule may include any one or multiple of the network slice association rule and/or the back-off timer priority management rule and/or the Network Slice Selection Policy (NSSP), which furthermore may be preconfigured for the UE_A 10, or may be received from the network. Here, the policy enforcer may be an NSSP enforcer. Here, the application may be a protocol of the application layer, and the PDU session may be established or attempted to be established based on a request from the protocol of the application layer. Here, the session management instance may be a dynamically generated software element in a PDU session unit. Here, as internal processing in the UE_A 10, the S-NSSAI may be grouped or a process based on the grouping of the S-NSSAI may be performed. Note that the internal configuration and processing in the UE_A 10 may not be limited thereto, and each element may be implemented in software or may be performed as software processing in the UE_A 10.

Furthermore, the UE_A 10 may switch to the EPS, in the fourth process or based on the completion of the fourth process, and may start the position registration at the EPS, based on the DCN ID included in the eighteenth identification information. Note that the switch to the EPS by the UE_A 10 may be performed based on the handover procedure, or may be a RAT switch initiated by the UE_A 10. Additionally, in a case that the UE_A 10 receives the eighteenth identification information including the DCN ID, the UE_A 10 may perform the switch to the EPS during the fourth process or after the completion of the fourth process.

Furthermore, the fourth process may be a process in which the UE_A 10 initiates again the present procedure after a certain time period elapses, or a process in which the UE_A 10 transitions to a state where the request of the UE_A 10 is limited or restricted.

Note that the UE_A 10 may transition to the first state in accordance with the completion of the fourth process.

Next, a second example of the fourth process will be described.

Here, the fourth process may be a process in which the UE_A 10 recognizes the matter indicated by the SMF_A 230. The fourth process may be a process in which the UE_A 10 stores the received identification information as a context, or may be a process in which the UE_A 10 forwards the received identification information to the higher layer and/or the lower layer.

Furthermore, in the fourth process, a process may be performed of identifying that the congestion control is applied, based on one or more pieces of identification information among the eleventh identification information to eighteenth identification information.

Furthermore, in the fourth process, a process may be performed of identifying which type of congestion control is applied among the first to fourth congestion controls, and a process may be performed of identifying the DNN and/or the S-NSSAI associated with the congestion control to apply, based on one or more pieces of identification information among the eleventh identification information to eighteenth identification information. More specifically, the present process may be a process described in the fifteenth behavior.

Furthermore, in the fourth process, the UE may identify or configure a value configured for the first timer indicated by the fourteenth identification information associated with the congestion control to apply, based on one or more pieces of identification information among the eleventh identification information to eighteenth identification information, and the UE may start to count the first timer with the value. To be more specific, the present process may be a process described in the eighth behavior.

Furthermore, in the fourth process, one or more of the first to seventh behaviors may be performed in accordance with the start or completion of any of the processes described above.

Furthermore, in the fourth process, one or more of the ninth to fifteenth behaviors may be performed in accordance with the start or completion of any of the processes described above.

Note that the UE_A 10 may transition to the first state in accordance with the completion of the fourth process.

Hereinbefore, the processing contents are described for the fourth process by using the first example and the second example, but the fourth process may not be limited to these processes. For example, the fourth process can be a combination of a portion of the multiple detailed processes described in the first example and a portion of the multiple detailed processes described in the second example.

Further, the UE_A 10 may receive the PDU session establishment reject message, or not receive the PDU session establishment accept message, and thereby, recognize that the request of the UE_A 10 is rejected. Each apparatus completes the procedure (B) in the present procedure, based on the transmission and/or reception of the PDU session establishment reject message.

Each apparatus completes the present procedure, based on completion of the procedure (A) or (B) in the present procedure. Note that each apparatus may transition to a state in which the PDU session is established, based on the completion of the procedure (A) in the present procedure, or each apparatus may recognize that the present procedure is rejected, may transition to a state in which the PDU session is not established, or may transition to the first state, based on the completion of the procedure (B) in the present procedure.

Furthermore, each apparatus may perform processing, based on identification information transmitted and/or received in the present procedure, based on completion of the present procedure. In other words, the UE_A 10 may perform the fourth process, based on the completion of the present procedure, or transition to the first state after the completion of the fourth process.

The third condition determination may be performed based on the identification information included in the PDU session establishment request message, and/or the subscriber information, and/or the operator policy. For example, the third condition determination may be true in a case that the network allows the request of the UE_A 10. The third condition determination may be false in a case that the network does not allow the request of the UE_A 10. The third condition determination may be true in a case that a network to which the UE_A 10 is connected and/or the device within the network support the function the UE_A 10 requests, or may be false in a case of not supporting the function. The third condition determination may be true in a case that the network is determined to be in a congested state, or may be false in a case determined to not be in a congested state. Note that conditions with which true or false of the third condition determination is determined may not be limited to the previously described conditions.

The second condition determination may be performed based on whether the session on the N4 interface for the PDU session has been established. For example, in a case that the session on the N4 interface for the PDU session has been established, the second condition determination may be true, and in a case that the session on the N4 interface for the PDU session is not established, the second condition determination may be false. Conditions for determining true or false of the second condition determination need not be limited to the above-described conditions.

The eleventh condition determination may be performed based on the identification information included in the PDU session establishment request message, and/or the subscriber information, and/or the operator policy. For example, the eleventh condition determination may be true in a case that the network allows the authentication and/or authorization by the DN_A 5 to be performed during the present procedure. The eleventh condition determination may be false in a case that the network does not allow the authentication and/or authorization by the DN_A 5 to be performed during the present procedure. The eleventh condition determination may be true in a case that a network to which the UE_A 10 is connected and/or the device within the network support the performing of the authentication and/or authorization by the DN_A 5 during the present procedure, or may be false in a case of not supporting. The eleventh condition determination may be true in a case that the 61st identification information is received, or may be false in a case of not received. In other words, the eleventh condition determination may be true in a case that information such as SM PDU DN Request Container and/or a container containing multiple pieces of information are received, and may be false in a case of not received. Note that conditions with which true or false of the eleventh condition determination is determined may not be limited to the previously described conditions.

The transmission and/or reception of the PDU session reject message in the above-described procedure causes the core network_B 190 to notify the UE_A 10 of the congestion control to apply, and the UE_A 10 can apply the congestion control indicated by the core network_B 190. Note that the core network_B 190 and the UE_A 10 may apply multiple congestion controls by performing the procedures and processes described in the present procedure multiple times. Note that each congestion control to apply may be a different type of congestion control, and/or a congestion control corresponding to a different DNN, and/or a congestion control corresponding to a different S-NSSAI, and/or a congestion control different in a combination of the DNN and the S-NSSAI.

1.3.3. Overview of Network-Initiated Session Management Procedure

Next, an overview of the network-initiated session management procedure will be described. Hereinafter, the network-initiated session management procedure is also referred to as the present procedure. The procedure is a procedure for a session management initiated by the network and performed for the established PDU session. Note that the present procedure may be performed at any timing after the registration procedure and/or the PDU session establishment procedure described above are completed and each apparatus transitions to the first state. Each apparatus may transmit and/or receive a message including identification information for stopping or changing the congestion control during the procedure, or may start a behavior based on a new congestion control indicated by the network based on the completion of the present procedure.

Alternatively, the UE_A 10 may stop the application of the congestion control identified based on the control information transmitted and/or received by the present procedure. In other words, the core network_B 190 can initiate the present procedure and further transmit a control message and control information of the present procedure to the UE_A 10 to notify the UE_A 10 to stop the application of the congestion control that can be identified using the control information.

Note that the present procedure may be a network-initiated PDU session modification procedure, and/or a network-initiated PDU session release procedure, or the like, or, without limitation, may be a network-initiated session management procedure. Note that each apparatus may transmit and/or receive a PDU session modification message in the network-initiated PDU session modification procedure, or may transmit and/or receive a PDU session release message in the network-initiated PDU session release procedure.

1.3.3.1. First Example of Network-Initiated Session Management Procedure

Figure 12:
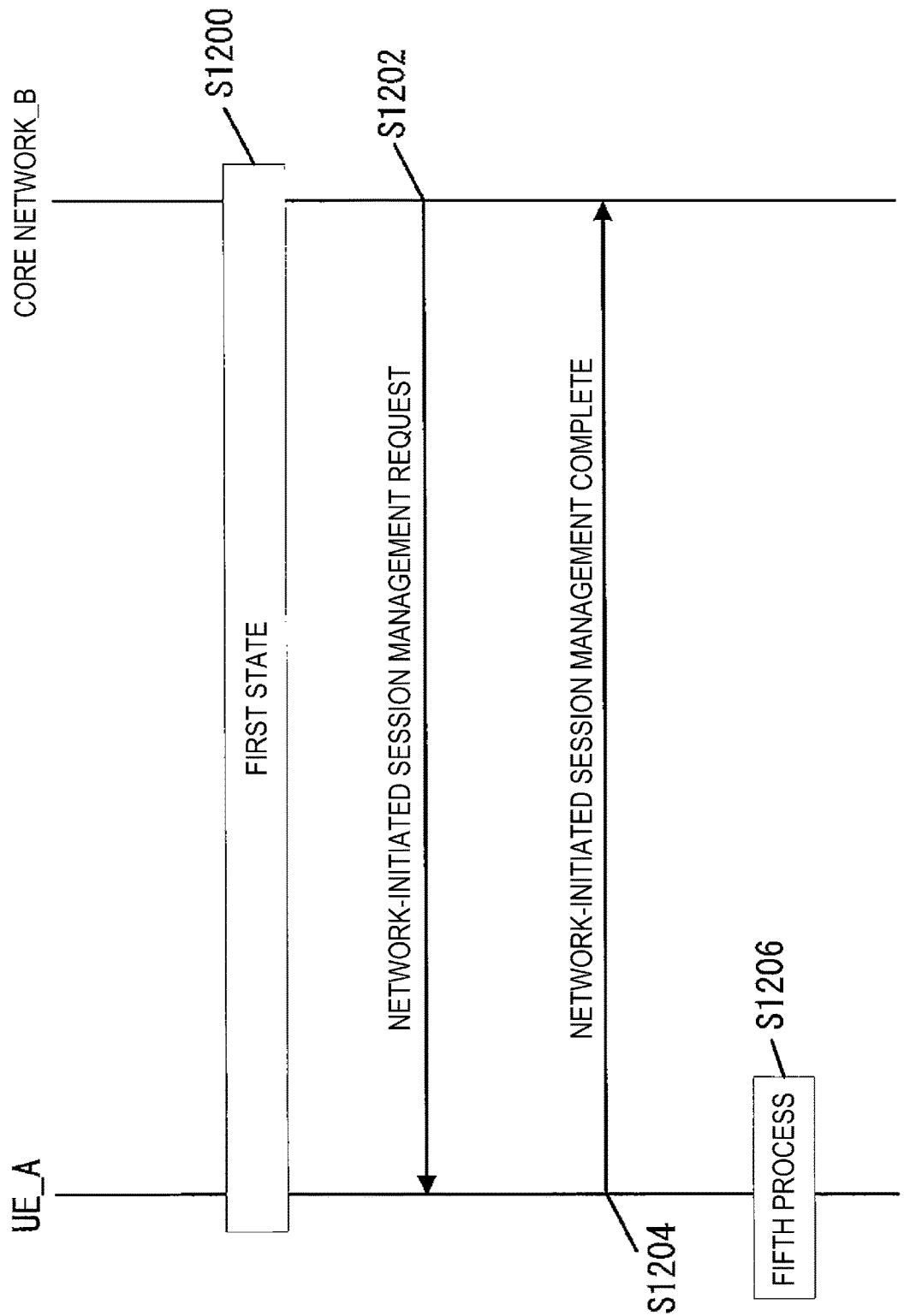
FIG. 12 is a diagram illustrating a network-initiated session management procedure.

An example of the network-initiated session management procedure will be described using FIG. 12. In this section, the present procedure refers to the network-initiated session management procedure. Each step of the present procedure will be described below.

As described above, based on the completion of the registration procedure and/or the PDU session establishment procedure, each apparatus in the UE_A 10 and core network_B 190 transitioning to the first state (S1200) initiates a network-initiated session management procedure at any timing. Here, the apparatus initiating the present procedure in the core network_B 190 may be the SMF_A and/or the AMF_A, and the UE_A may transmit and/or receive a message in the present procedure via the AMF_A and/or the access network_B.

Specifically, the apparatus in the core network_B 190 transmits a network-initiated session management request message to the UE_A (S1202). Here, the apparatus in the core network_B 190 may include the 21st identification information in the network-initiated session management request message, or may indicate that the request of the core network_B 190 by including the identification information.

Next, the UE_A receiving the network-initiated session management request message transmits a network-initiated session management complete message (S1204). Furthermore, the UE_A may perform the fifth process, based on the 21st identification information received from the core network_B 190 (S1206), and complete the present procedure. The UE_A 10 may perform the fifth process, based on the completion of the present procedure.

An example of the fifth process will be described below.

Here, the fifth process may be a process in which the UE_A 10 recognizes the matter indicated by the core network_B 190, or may be a process in which the UE_A 10 recognizes the request of the core network_B 190. The fifth process may be a process in which the UE_A 10 stores the received identification information as a context, or may be a process in which the UE_A 10 forwards the received identification information to the higher layer and/or the lower layer.

A message transmitted and/or received in the network-initiated session management request may be a PDU session modification command (PDU SESSION MODIFICATION COMMAND), or a PDU session release command (PDU SESSION RELEASE COMMAND) without limitation.

Note that the UE_A 10 may perform the congestion control identification process applied by the UE_A 10 in the fifth process, based on the received 21st identification information. Here, the congestion control identification process may be the seventeenth behavior.

Moreover, in the case that the UE_A 10 receives the 21st identification information, the fifth process may be the sixteenth behavior. Specifically, for example, the process may be a process to stop one or multiple timers performed, based on the fourth process described above.

In other words, the UE_A 10 in a case of receiving the 21st identification information performs the seventeenth behavior to identify the congestion control that is to be stopped or changed indicated by the network, and then, performs the sixteenth behavior to stop or change the identified congestion control.

Furthermore, each apparatus may perform processing, based on identification information transmitted and/or received in the present procedure, based on completion of the present procedure. In other words, the UE_A 10 may perform the fifth process, based on the completion of the present procedure, or perform the present procedure after the completion of the fifth process.

In the above-described procedure, through the transmission and/or reception of the network-initiated session management request message, the core network_B 190 can indicate to the UE_A 10 that the congestion control the UE_A 10 already applies is to be stopped or changed. Furthermore, the UE_A 10 may stop or change the congestion control the UE_A 10 applies, based on the network-initiated session management request message. Here, in a case that the UE_A 10 applies one or more congestion controls, the UE_A 10 may identify the congestion control to be stopped or changed, based on the reception of the identification information included in the network-initiated session management request message from the core network_B 190. Note that each congestion control to apply may be a different type of congestion control, and/or a congestion control corresponding to a different DNN, and/or a congestion control corresponding to a different S-NSSAI, and/or a congestion control different in a combination of the DNN and the S-NSSAI.

1.3.3.2. Second Example of Network-Initiated Session Management Procedure

The first example of the network-initiated session management procedure described in the section 1.3.3.1 describes the example in which the congestion control is stopped during the procedure, regardless of which congestion control of the first to fourth congestion controls the congestion control applied to the UE_A 10 is.

The procedure described in the first example of the network-initiated session management procedure described in section 1.3.3.1 is not limited to the above example and may be a procedure performed in accordance with the congestion control. For example, the procedure may be performed for the congestion controls categorized into the first congestion control, the third congestion control, and the fourth congestion control, among one or multiple congestion controls the UE_A 10 applies.

In other words, the UE_A 10 may stop the congestion controls corresponding to the first congestion control, the third congestion control, and the fourth congestion control by the fifth process.

In a case that the UE_10 receives a network-initiated session management request message for the second congestion control while the count of the back-off timer associated with the second congestion control is running, the UE_A 10 may respond to the core network_B 190 without stopping the back-off timer associated with the second congestion control.

In other words, in a case that the UE_A 10, while the count of the back-off timer associated with the S-NSSAI #A is running, receives the network-initiated session management request message for the congested S-NSSAI #A and any DNN, the UE_A 10 may respond to the core network_B 190 without stopping the back-off timer associated with the S-NSSAI #A.

In this manner, for the second congestion control, the UE_A 10, in receiving the network-initiated session management request message, may transmit the response message for the network-initiated session management request message to the core network_B 190, but may continue the congestion control. Accordingly, the UE-initiated session management request message transmission regulated by the second congestion control may continue to be prohibited.

Here, as described above, the network-initiated session management request message in the present embodiment may be a PDU session modification command (PDU SESSION MODIFICATION COMMAND) message in the network-initiated PDU session modification procedure, or a PDU session release command (PDU SESSION RELEASE COMMAND) message in the network-initiated PDU session release procedure.

Moreover, as described above, the network-initiated session management complete message responsive to the PDU session modification command message in the present embodiment may be a PDU session modification complete message (PDU SESSION MODIFICATION COMPLETE), and the network-initiated session management complete message responsive to the PDU session release command message in the present embodiment may be a PDU session release complete message (PDU SESSION RELEASE COMPLETE). In a case that the network-initiated session management request message is a PDU session modification command and/or a PDU session release message, the UE_A 10 and the core network_B 190 may be configured to perform the further detailed processes described below in addition to the above-described processes.

For example, in a case that the core network_B 190 transmits the network-initiated session management request message including information indicating a reactivation request (Reactivation Required), the core network_B 190 may perform the process as follows. Note that the information indicating the reactivation request (Reactivation Required) is information indicating that activation is requested, and specific examples may include the 5G session management cause value #39 (SGSM Cause #39).

Hereinafter, the first process and procedure example in a case of receiving information indicating the reactivation request will be described.

In a case that the UE_A 10 receives a network-initiated session management request message including information indicating a reactivation request (Reactivation Required), the UE_A 10 does not again initiate the UE-initiated PDU session establishment procedure immediately after the completion of the network-initiated session management procedure but waits for the congestion control to be released to again initiate the UE-initiated PDU session establishment procedure. Here, the UE-initiated PDU session establishment procedure may be a UE-initiated PDU session establishment procedure for the PDU session type provided in the UE-initiated PDU establishment procedure in a case that the PDU session to be changed or released is established, the SSC mode, and the DNN and the S-NSSAI.

Note that waiting for the congestion control to be released may be performance after the timer associated with the second congestion control Expires. In other words, waiting for the congestion control to be released may be the performing after the completion of counting of the timer associated with the second congestion control and/or after the timer value associated with the second congestion control becomes zero.

Furthermore, the UE_A 10 may include the following supplemental information in the network-initiated session management complete message.

The supplemental information may be information indicating that the timer is waited for to be expired and/or information indicating a remaining timer value. Here, the timer may be a timer associated with the second congestion control. The timer being waited for to be expired may be performance after the timer Expires. In other words, waiting for the congestion control to be released may be the performing after the completion of counting of the timer associated with the second congestion control and/or after the timer value associated with the second congestion control becomes zero.

Note that the core network_B 190 may receive the network-initiated session management complete message including the supplemental information and recognize the remaining timer value. Furthermore, the core network_B 190 may recognize that the UE-initiated PDU session establishment procedure is initiated after the time of the value indicated by the remaining timer elapses.

Here, the remaining timer recognized by the core network_B 190 may be a value indicated by the received supplemental information, or a value taking account of an offset between a transmission time of the UE_A 10 and a reception time by the core network_B 190 of the network-initiated session management complete message with respect to the value indicated by the received supplemental information.

In addition, not only the first process and procedure example in a case of receiving the information indicating the reactivation request but also the second process and procedure example in a case of receiving the information indicating the reactivation request as described below may be performed.

As described above, for the second congestion control, the UE_A 10, in receiving the network-initiated session management request message, may transmit the response message for the network-initiated session management request message to the core network_B 190, but may continue the congestion control. Thus, although the UE-initiated session management request message transmission regulated by the second congestion control continues to be suppressed, the UE_A 10 and/or the core network_B 190 may be configured to be only allowed to again initiate the UE-initiated PDU session establishment procedure.

In other words, in the case that the UE_A 10 receives a network-initiated session management request message including information indicating a reactivation request (Reactivation Required), the UE_A 10 again initiates the UE-initiated PDU session establishment procedure after the completion of the network-initiated network-initiated session management procedure. Here, the UE-initiated PDU session establishment procedure may be a UE-initiated PDU session establishment procedure for the PDU session type provided in the UE-initiated PDU establishment procedure in a case that the PDU session to be changed or released is established, the SSC mode, and the DNN and the S-NSSAI.

Note that while the UE_A 10 continues the application of congestion control, the UE_A 10 and the core network_B 190 may perform and complete procedures allowed as an exception but the UE_A 10 may be prohibited from initiating other UE-initiated session management procedures prohibited by the second congestion control.

In addition, not only the first and second processes and procedure examples in a case of receiving the information indicating the reactivation request but also the third process and procedure example in a case of receiving the information indicating the reactivation request may be performed.

As described above, for the second congestion control, the UE_A 10, in receiving the network-initiated session management request message, transmits the response message for the network-initiated session management request message to the core network_B 190. Furthermore, in the case that the UE_A 10 receives the network-initiated session management request message including information indicating the reactivation request (Reactivation Required), the UE_A 10 may stop the application of the second congestion control.

In other words, the UE_A 10 may continue the congestion control in a case that the network-initiated session management request message does not include information indicating the reactivation request (Reactivation Required). In this case, the UE-initiated session management request message transmission regulated by the second congestion control may continue to be prohibited.

Accordingly, in the case that the UE_A 10 receives a network-initiated session management request message including information indicating a reactivation request (Reactivation Required), the UE_A 10 again initiates the UE-initiated PDU session establishment procedure after the completion of the network-initiated network-initiated session management procedure. Here, the UE-initiated PDU session establishment procedure may be a UE-initiated PDU session establishment procedure for the PDU session type provided in the UE-initiated PDU establishment procedure in a case that the PDU session to be changed or released is established, the SSC mode, and the DNN and the S-NSSAI.

In addition, without limitation on the first, second, and third processes and procedure examples in a case of receiving the information indicating the reactivation request, the information indicating the reactivation request may be configured to be not transmitted by the core network_B 190.

To be more specific, the core network_B 190, in the case of transmitting the network-initiated session management request message to the UE_A 10 applying the congestion control, may be configured to prohibit the information indicating a reactivation request (Reactivation Required) from being included.

Alternatively, the core network_B 190, in the case of transmitting the network-initiated session management request message to the UE_A 10 applying the second congestion control, may be configured to prohibit the information indicating a reactivation request (Reactivation Required) from being included.

Hereinbefore, the processes and procedures of the UE_A 10 and the core network_B 190 are described. The process of the core network_B 190 described in this section may be, more specifically, a process performed by a control apparatus such as the SMF_A 230 and/or the AMF_A 240 which are the apparatuses in the core network_B 190. Therefore, the core network_B 190 transmitting and/or receiving the control message may refer to the control apparatus such as the SMF_A 230 and/or the AMF_A 240, which are the apparatuses in the core network_B 190, transmitting and/or receiving the control message.

Furthermore, not limited to this section, in the expression used in the description of the present embodiment, releasing the congestion control or stopping the congestion control may include a process of stopping the back-off timer associated with the congestion control, and continuing application for the congestion control or continuing the congestion control may include continuing to count the back-off timer associated with congestion control.

Also, in the first, second, and third processes and procedure examples in a case of receiving the information indicating the reactivation request described in this section, the network-initiated session management request message and/or the network-initiated session management procedure are described as those for the congested S-NSSAI #A and any DNN with respect to the UE_A 10.

In other words, the congested S-NSSAI #A and any DNN may be the S-NSSAI #A and any DNN associated with the PDU session subjected to the network-initiated session management request message and/or the network-initiated session management procedure.

Note that the UE_A 10 and the core network_B 190 may perform an anchor relocation procedure in the SSC mode 2 including the procedure in this section, and switch to an anchor of the PDU session or to a PDU session different in the anchor to continue the communication. Here, the anchor relocation procedure in the SSC mode 2 is a procedure initiated by the core network_B 190, and the procedure involved in the transmission of the PDU session release command performed in this procedure may be any procedure described in this section.

The UE_A 10 and the core network_B 190 may perform an anchor relocation procedure in the SSC mode 3 including the procedure in this section, and switch to an anchor of the PDU session or to a PDU session different in the anchor to continue the communication. Here, the anchor relocation procedure in the SSC mode 3 is a procedure initiated by the core network_B 190, and the procedure involved in the transmission of the PDU session modification command performed in this procedure may be any procedure described in this section.

Next, in a state where the congestion control is applied, a process in a case that the UE moves with PLMN change will be described.

Here, a process in a case that the UE_A 10 changes the PLMN in a state where particularly the first congestion control is applied will be described. Here, the first congestion control and the process regulated in a case that the first congestion control is applied may be as described above.

Again, the first congestion control may be a DNN based congestion control. For example, the first congestion control may be a congestion control the NW applies to the UE_A 10, based on a message rejecting a UE-initiated session management request in a case that the NW receives the UE-initiated session management request using the DNN #A from the UE_A 10 and convergence to a specific DNN, e.g., the DNN #A is detected at the NW. In this case, in the application of the first congestion control, the UE_A 10 may be configured to start counting the back-off timer corresponding to the first congestion control received from the NW and to not transmit the UE-initiated session management request using the DNN #A until the back-off timer expires. Note that using the DNN may be to include the DNN information in the UE-initiated session management request such as a PDU session establishment request message.

Here, for the convenience of description, such first congestion control is represented as a "first congestion control for the specific DNN".

In the first congestion control, even in a case that the UE-initiated session management request does not include the DNN information, the NW may select a default DNN as a congestion control target on the initiative of the NW. In other words, the first congestion control may be a congestion control the NW applies to the UE_A 10, based on a message rejecting a UE-initiated session management request in a case that the NW receives the UE-initiated session management request not using the DNN information from the UE_A 10 and convergence to a default DNN is detected at the NW. In this case, in the application of the first congestion control, the UE_A 10 may be configured to start counting the back-off timer corresponding to the first congestion control received from the NW and to not transmit the UE-initiated session management request not using the DNN until the back-off timer expires. Note that not using the DNN may be not including the DNN information in the UE-initiated session management request such as a PDU session establishment request message.

Here, for the convenience of description, such first congestion control for the default DNN is applied based on the UE-initiated session management request not using the DNN information, and thus is represented as a "congestion control for No DNN" to distinguish from the first congestion control for the specific DNN. Furthermore, the UE-initiated session management request such as a PDU session establishment request message not using the DNN is represented as a UE-initiated session management request using No DNN. For example, the PDU session establishment request message using No DNN is a PDU session establishment request message not using the DNN.

The UE_A 10 may be so configured, in a case that the UE_A 10, in changing the PLMN, is counting the back-off timer associated with the first congestion control for the specific DNN, or the back-off timer associated with the first congestion control for the specific DNN is deactivated, that the UE_A 10 can transmit a PDU session establishment request message by using this specific DNN in the new PLMN. Accordingly, based on this configuration, the UE_10 may transmit a PDU session establishment request message using this specific DNN.

Here, the UE_A 10 may continue the counting until the timer expires without stopping the counted back-off timer. Alternatively, the UE_A 10 may continue to hold the deactivated back-off timer in a state of being deactivated.

In this manner, the first congestion control for the specific DNN may be associated with the PLMN.

For example, in a case that the first congestion control for the specific DNN is applied, the UE associates the back-off timer with the PLMN and the specific DNN to start counting, or in a case that the back-off timer is not zero or deactivated, the UE does not perform the PDU session establishment using the specific DNN associated with the back-off timer in the PLMN associated with the back-off timer. In addition, in a case that the back-off timer is deactivated, the UE does not perform the PDU session establishment using the specific DNN associated with the back-off timer in the PLMN associated with the back-off timer until the terminal is turned OFF or the USIM is retrieved. In the case that the back-off timer is zero, the UE may perform the PDU session establishment using the specific DNN associated with the back-off timer in the PLMN associated with the back-off timer.

In other words, the UE_A 10 may be so configured, in a case that the UE_A 10, in changing the PLMN, is counting the back-off timer associated with the first congestion control for the specific DNN and the PLMN before changed, or in a case that the back-off timer associated with the first congestion control for the specific DNN and the PLMN before changed is deactivated, and further in a case that the UE_A 10 is not counting the back-off timer associated with the first congestion control for the specific DNN and the PLMN after changed, and the back-off timer associated with the first congestion control for the specific DNN and the PLMN after changed is not deactivated, that the UE_A 10 can transmit a PDU session establishment request message using this specific DNN in the new PLMN. Furthermore, based on this configuration, the UE_10 may transmit a PDU session establishment request message using this specific DNN.

The UE_A 10 may be so configured, in a case that the UE_A 10, in changing the PLMN, is counting the back-off timer associated with the first congestion control for No DNN, or the back-off timer associated with the first congestion control for No DNN is deactivated, that the UE_A 10 can transmit a PDU session establishment request message not using the DNN in the new PLMN. Accordingly, based on this configuration, the UE_10 may transmit a PDU session establishment request message using this specific DNN.

Here, the UE_A 10 may continue the counting until the timer expires without stopping the counted back-off timer. Alternatively, the UE_A 10 may continue to hold the deactivated back-off timer in a state of being deactivated.

In this manner, the first congestion control for No DNN may be associated with the PLMN. In other words, the UE_A 10 may be so configured, in a case that the UE_A 10, in changing the PLMN, is counting the back-off timer for the first congestion control for No DNN associated with the PLMN before changed, or in a case that the back-off timer for the first congestion control for No DNN associated with the PLMN before changed is deactivated, and further in a case that the UE_A 10 is not counting the back-off timer for the first congestion control for No DNN associated with the PLMN after changed, and the back-off timer for the first congestion control for No DNN associated with the PLMN is not deactivated, that the UE_A 10 can transmit a PDU session establishment request message not using the DNN in the new PLMN. Furthermore, based on this configuration, the UE_10 may transmit a PDU session establishment request message not using the DNN.

As described above, the UE_A 10 may perform the similar process regardless of whether the first congestion control is for the specific DNN or No DNN.

Specifically, the UE_A 10 may be so configured, in a case that the UE_A 10, in changing the PLMN, is counting the back-off timer for the first congestion control associated with the PLMN before changed, or in a case that the back-off timer for the first congestion control associated with the PLMN before changed is deactivated, and further in a case that the UE_A 10 is not counting the back-off timer for the first congestion control associated with the PLMN after changed, and the back-off timer for the first congestion control associated with the PLMN after changed is not deactivated, that the UE_A 10 can transmit a PDU session establishment request message using the specific DNN and/or a PDU session establishment request message not using the DNN regulated by the congestion control associated with the PLMN before changed, in the new PLMN.

Alternatively, the UE_A 10 may perform different processes depending on whether the first congestion control is for the specific DNN or for No DNN.

The UE_A 10 may be so configured, in a case that the UE_A 10, in changing the PLMN, is counting the back-off timer associated with the first congestion control for the specific DNN, or the back-off timer associated with the first congestion control for the specific DNN is deactivated, that the UE_A 10 does not transmit a PDU session establishment request message using this specific DNN in the new PLMN. Accordingly, based on this configuration, the UE_10 may be regulated regarding the transmission of a PDU session establishment request message using this specific DNN.

Here, the UE_A 10 may continue the counting until the timer expires without stopping the counted back-off timer. Alternatively, the UE_A 10 may continue to hold the deactivated back-off timer in a state of being deactivated.

In this manner, the first congestion control for the specific DNN may be applied also in the different PLMN.

On the other hand, the UE_A 10 may be so configured, in a case that the UE_A 10, in changing the PLMN, is counting the back-off timer associated with the first congestion control for No DNN, or the back-off timer associated with the first congestion control for No DNN is deactivated, that the UE_A 10 can transmit a PDU session establishment request message not using the DNN in the new PLMN. Accordingly, based on this configuration, the UE_10 may transmit a PDU session establishment request message using this specific DNN.

Here, the UE_A 10 may continue the counting until the timer expires without stopping the counted back-off timer. Alternatively, the UE_A 10 may continue to hold the deactivated back-off timer in a state of being deactivated.

In this manner, the first congestion control for No DNN may be associated with the PLMN.

For example, in a case that the first congestion control for No DNN is applied, the UE associates the back-off timer with the PLMN and No DNN to start counting, or in a case that the back-off timer is not zero or deactivated, the UE does not perform the PDU session establishment using No DNN associated with the back-off timer in the PLMN associated with the back-off timer. In addition, in a case that the back-off timer is deactivated, the UE does not perform the PDU session establishment using No DNN associated with the back-off timer in the PLMN associated with the back-off timer until the terminal is turned OFF or the USIM is retrieved. In the case that the back-off timer is zero, the UE may perform the PDU session establishment using No DNN associated with the back-off timer in the PLMN associated with the back-off timer.

In other words, the UE_A 10 may be so configured, in a case that the UE_A 10, in changing the PLMN, is counting the back-off timer for the first congestion control for No DNN associated with the PLMN before changed, or in a case that the back-off timer for the first congestion control for No DNN associated with the PLMN before changed is deactivated, and further in a case that the UE_A 10 is not counting the back-off timer for the first congestion control for No DNN associated with the PLMN after changed, and the back-off timer for the first congestion control for No DNN associated with the PLMN is not deactivated, that the UE_A 10 can transmit a PDU session establishment request message not using the DNN in the new PLMN. Furthermore, based on this configuration, the UE_10 may transmit a PDU session establishment request message not using the DNN.

Here, as the process with the change of the PLMN described above, whether the similar process is performed regardless of whether the first congestion control is for the specific DNN or No DNN, or the different process is performed may be configured in advance based on the information configured for the UE_A 10, or may be determined depending on whether or not the second PLMN after changed is the equivalent PLMN for the first PLMN before changed. For example, in a case that the second PLMN after changed is not the equivalent PLMN for the first PLMN before changed, the similar process may be applied. In a case that the second PLMN after changed is the equivalent PLMN for the first PLMN before changed, the different process may be applied.

Furthermore, the UE_A 10 may determine the behavior, based on additional detailed conditions, as well as whether or not the second PLMN after changed is the equivalent PLMN. For example, the UE_A 10 may be configured to perform behaviors different between a case that the second PLMN after changed is the equivalent PLMN for the first PLMN before changed and the registration area is not changed in changing the PLMN, and a case that the second PLMN after changed is the equivalent PLMN for the first PLMN before changed and the registration area change is involved in changing the PLMN.

Note that the behavior of the UE_A 10 performed in each case may be one of the behaviors in a case that the PLMN is changed described above.

For example, a first example will be described of the case that the second PLMN after changed is the equivalent PLMN for the first PLMN before changed and the registration area is not changed in changing the PLMN. The UE_A 10 may be so configured, in a case that the UE_A 10, in changing the PLMN like this, is counting the back-off timer associated with the first congestion control for the specific DNN, or the back-off timer associated with the first congestion control for the specific DNN is deactivated, that the UE_A 10 does not transmit a PDU session establishment request message using this specific DNN in the new PLMN. Accordingly, based on this configuration, the UE_10 may be regulated regarding the transmission of a PDU session establishment request message using this specific DNN.

A second example will be described of the case that the second PLMN after changed is the equivalent PLMN for the first PLMN before changed and the registration area is not changed in changing the PLMN. The UE_A 10 may be so configured, in a case that the UE_A 10, in changing the PLMN like this, is counting the back-off timer associated with the first congestion control for No DNN, or the back-off timer associated with the first congestion control for No DNN is deactivated, that the UE_A 10 does not transmit a PDU session establishment request message not using the DNN in the new PLMN. Accordingly, based on this configuration, the UE_10 may be regulated regarding the transmission of a PDU session establishment request message not using the DNN.

Next, a first example will be described of the case that the second PLMN after changed is the equivalent PLMN for the first PLMN before changed and the registration area change is involved in changing the PLMN. The UE_A 10 may be so configured, in a case that the UE_A 10, in changing the PLMN like this, is counting the back-off timer for the first congestion control for No DNN associated with the PLMN before changed, or in a case that the back-off timer for the first congestion control for No DNN associated with the PLMN before changed is deactivated, and further in a case that the UE_A 10 is not counting the back-off timer for the first congestion control for No DNN associated with the PLMN before changed, and the back-off timer for the first congestion control for No DNN associated with the PLMN is not deactivated, that the UE_A 10 can transmit a PDU session establishment request message not using the DNN in the new PLMN. Furthermore, based on this configuration, the UE_10 may transmit a PDU session establishment request message not using the DNN.

Next, a second example will be described of the case that the second PLMN after changed is the equivalent PLMN for the first PLMN before changed and the registration area change is involved in changing the PLMN. The UE_A 10 may be so configured, in a case that the UE_A 10, in changing the PLMN like this, is counting the back-off timer for the first congestion control for the specific DNN associated with the PLMN before changed, or in a case that the back-off timer for the first congestion control for the specific DNN associated with the PLMN before changed is deactivated, and further in a case that the UE_A 10 is not counting the back-off timer for the first congestion control for the specific DNN associated with the PLMN before changed, and the back-off timer for the first congestion control for the specific DNN associated with the PLMN is not deactivated, that the UE_A 10 can transmit a PDU session establishment request message using the specific DNN in the new PLMN. Furthermore, based on this configuration, the UE_10 may transmit a PDU session establishment request message using the specific DNN.

Next, a third example will be described of the case that the second PLMN after changed is the equivalent PLMN for the first PLMN before changed and the registration area change is involved in changing the PLMN. The UE_A 10 may stop the back-off timer associated with the first congestion control for the specific DNN and/or No DNN in changing the PLMN like this. Accordingly, the UE_A 10 the UE_A 10 may be configured to transmit a PDU session establishment request message using the specific DNN and/or a PDU session establishment request message not using the specific DNN, in the new PLMN. Furthermore, based on this configuration, the UE_10 may transmit a PDU session establishment request message using the specific DNN and/or a PDU session establishment request message not using the specific DNN.

Although the above description describes that whether the similar process is performed regardless of whether the first congestion control is for the specific DNN or No DNN, or the different process is performed may be configured in advance based on the information configured for the UE_A 10, or may be determined depending on whether or not the second PLMN after changed is the equivalent PLMN for the first PLMN before changed, the different process may be configured to be performed for the second to fourth congestion controls, regardless of the first congestion control. For example, in a case that the second PLMN after changed is not the equivalent PLMN for the first PLMN before changed, the similar process may be applied. In a case that the second PLMN after changed is the equivalent PLMN for the first PLMN before changed, the different process may be applied.

Furthermore, the UE_A 10 may determine the behavior, based on additional detailed conditions, as well as whether or not the second PLMN after changed is the equivalent PLMN. For example, the UE_A 10 may be configured to perform behaviors different between a case that the second PLMN after changed is the equivalent PLMN for the first PLMN before changed and the registration area is not changed in changing the PLMN, and a case that the second PLMN after changed is the equivalent PLMN for the first PLMN before changed and the registration area change is involved in changing the PLMN.

Note that the behavior of the UE_A 10 performed in each case may be one of the behaviors in a case that the PLMN is changed described above.

Hereinafter, an example in which the second congestion control is applied will be described.

For example, a first example will be described of the case that the second PLMN after changed is the equivalent PLMN for the first PLMN before changed and the registration area is not changed in changing the PLMN. The UE_A 10 may be so configured, in a case that the UE_A 10, in changing the PLMN like this, is counting the back-off timer associated with the second congestion control for the specific S-NSSAI, or the back-off timer associated with the second congestion control for the specific S-NSSAI is deactivated, that the UE_A 10 does not transmit a PDU session establishment request message using this specific S-NSSAI in the new PLMN. Accordingly, based on this configuration, the UE_10 may be regulated regarding the transmission of a PDU session establishment request message using this specific S-NSSAI.

A second example will be described of the case that the second PLMN after changed is the equivalent PLMN for the first PLMN before changed and the registration area is not changed in changing the PLMN. The UE_A 10 may be so configured, in a case that the UE_A 10, in changing the PLMN like this, is counting the back-off timer associated with the second congestion control for No S-NSSAI, or the back-off timer associated with the first congestion control for No S-NSSAI is deactivated, that the UE_A 10 does not transmit a PDU session establishment request message not using the S-NSSAI in the new PLMN. Accordingly, based on this configuration, the UE_10 may be regulated regarding the transmission of a PDU session establishment request message not using the S-NSSAI.

Next, a first example will be described of the case that the second PLMN after changed is the equivalent PLMN for the first PLMN before changed and the registration area change is involved in changing the PLMN. The UE_A 10 may be so configured, in a case that the UE_A 10, in changing the PLMN like this, is counting the back-off timer for the second congestion control for No S-NSSAI associated with the PLMN before changed, or in a case that the back-off timer for the second congestion control for No S-NSSAI associated with the PLMN before changed is deactivated, and further in a case that the UE_A 10 is not counting the back-off timer for the second congestion control for No S-NSSAI associated with the PLMN after changed, and the back-off timer for the second congestion control for No S-NSSAI associated with the PLMN is not deactivated, that the UE_A 10 can transmit a PDU session establishment request message not using the S-NSSAI in the new PLMN. Furthermore, based on this configuration, the UE_10 may transmit a PDU session establishment request message not using the S-NSSAI.

Next, a second example will be described of the case that the second PLMN after changed is the equivalent PLMN for the first PLMN before changed and the registration area change is involved in changing the PLMN. The UE_A 10 may be so configured, in a case that the UE_A 10, in changing the PLMN like this, is counting the back-off timer for the second congestion control for the specific S-NSSAI associated with the PLMN before changed, or in a case that the back-off timer for the second congestion control for the specific S-NSSAI associated with the PLMN before changed is deactivated, and further in a case that the UE_A 10 is not counting the back-off timer for the second congestion control for the specific S-NSSAI associated with the PLMN before changed, and the back-off timer for the second congestion control for the specific S-NSSAI associated with the PLMN is not deactivated, that the UE_A 10 can transmit a PDU session establishment request message using the specific S-NSSAI in the new PLMN. Furthermore, based on this configuration, the UE_10 may transmit a PDU session establishment request message using the specific S-NSSAI.

Next, a third example will be described of the case that the second PLMN after changed is the equivalent PLMN for the first PLMN before changed and the registration area change is involved in changing the PLMN. The UE_A 10 may stop the back-off timer associated with the second congestion control for the specific S-NSSAI and/or No S-NSSAI in changing the PLMN like this. Accordingly, the UE_A 10 the UE_A 10 may be configured to be able to transmit a PDU session establishment request message using the specific S-NSSAI and/or a PDU session establishment request message not using the specific S-NSSAI, in the new PLMN. Furthermore, based on this configuration, the UE_10 may transmit a PDU session establishment request message using the specific S-NSSAI and/or a PDU session establishment request message not using the specific S-NSSAI.

An example of a case that the third congestion control is applied will be described below.

For example, a first example will be described of the case that the second PLMN after changed is the equivalent PLMN for the first PLMN before changed and the registration area is not changed in changing the PLMN. The UE_A 10 may be so configured, in a case that the UE_A 10, in changing the PLMN like this, is counting the back-off timer associated with the third congestion control for the specific [S-NSSAI, DNN], or the back-off timer associated with the third congestion control for the specific [S-NSSAI, DNN] is deactivated, that the UE_A 10 does not transmit a PDU session establishment request message using this specific [S-NSSAI, DNN] in the new PLMN. Accordingly, based on this configuration, the UE_10 may be regulated regarding the transmission of a PDU session establishment request message using this specific [S-NSSAI, DNN].

A second example will be described of the case that the second PLMN after changed is the equivalent PLMN for the first PLMN before changed and the registration area is not changed in changing the PLMN. The UE_A 10 may be so configured, in a case that the UE_A 10, in changing the PLMN like this, is counting the back-off timer associated with the third congestion control for [No S-NSSAI, DNN], or the back-off timer associated with the third congestion control for [No S-NSSAI, DNN] is deactivated, that the UE_A 10 does not transmit a PDU session establishment request message for [No S-NSSAI, DNN] in the new PLMN. Accordingly, based on this configuration, the UE_10 may be regulated regarding the transmission of a PDU session establishment request message for [No S-NSSAI, DNN].

Next, a first example will be described of the case that the second PLMN after changed is the equivalent PLMN for the first PLMN before changed and the registration area change is involved in changing the PLMN. The UE_A 10 may be so configured, in a case that the UE_A 10, in changing the PLMN like this, is counting the back-off timer for the third congestion control for [No S-NSSAI, DNN] associated with the PLMN before changed, or in a case that the back-off timer for the third congestion control for [No S-NSSAI, DNN] associated with the PLMN before changed is deactivated, and further in a case that the UE_A 10 is not counting the back-off timer for the third congestion control for [No S-NSSAI, DNN] associated with the PLMN after changed, and the back-off timer for the third congestion control for [No S-NSSAI, DNN] associated with the PLMN is not deactivated, that the UE_A 10 can transmit a PDU session establishment request message for [No S-NSSAI, DNN] in the new PLMN. Furthermore, based on this configuration, the UE_10 may transmit a PDU session establishment request message for [No S-NSSAI, DNN].

Next, a second example will be described of the case that the second PLMN after changed is the equivalent PLMN for the first PLMN before changed and the registration area change is involved in changing the PLMN. The UE_A 10 may be so configured, in a case that the UE_A 10, in changing the PLMN like this, is counting the back-off timer for the third congestion control for the specific [S-NSSAI, DNN] associated with the PLMN before changed, or in a case that the back-off timer for the third congestion control for the specific [S-NSSAI, DNN] associated with the PLMN before changed is deactivated, and further in a case that the UE_A 10 is not counting the back-off timer for the third congestion control for the specific [S-NSSAI, DNN] associated with the PLMN after changed, and the back-off timer for the third congestion control for the specific [S-NSSAI, DNN] associated with the PLMN is not deactivated, that the UE_A 10 can transmit a PDU session establishment request message using the specific [S-NSSAI, DNN] in the new PLMN. Furthermore, based on this configuration, the UE_10 may transmit a PDU session establishment request message using the specific [S-NSSAI, DNN].

Next, a third example will be described of the case that the second PLMN after changed is the equivalent PLMN for the first PLMN before changed and the registration area change is involved in changing the PLMN. The UE_A 10 may stop the back-off timer associated with third congestion control for the specific [S-NSSAI, DNN] and/or [No S-NSSAI, DNN] in changing the PLMN like this. Accordingly, the UE_A 10 the UE_A 10 may be configured to transmit a PDU session establishment request message using the specific [S-NSSAI, DNN] and/or a PDU session establishment request message for [No S-NSSAI, DNN], in the new PLMN. Furthermore, based on this configuration, the UE_10 may transmit a PDU session establishment request message using the specific [S-NSSAI, DNN] and/or a PDU session establishment request message for [No S-NSSAI, DNN].

Note that in the present embodiment, the back-off timer being deactivated may be the back-off timer and/or the congestion control associated with the back-off timer transitioning to a deactivated state. Note that the UE_A 10 in a case of receiving the timer value indicating the deactivation may deactivate the back-off timer and/or the congestion control associated with the back-off timer.

Here, the back-off timer to be deactivated and/or the congestion control associated with the back-off timer may be associated with the congestion control types of 1 to 4. Which congestion control type the back-off timer to be deactivated and/or the congestion control associated with the back-off timer is associated with may be similarly determined and recognized in a case of receiving the back-off timer value.

More specifically, the UE_A 10 may receive the fourteenth identification information indicating that the back-off timer and/or the congestion control associated with the back-off timer is deactivated, and the fifteenth identification information from the NW to deactivate the back-off timer for the congestion control of the type indicated by the fifteenth identification information.

In a state where the back-off timer and/or the congestion control are deactivated, the application of the congestion control may continue until the terminal is turned OFF or the USIM is retrieved. Further, the process regulated at this time may be similar to the process regulated in a case that the count of the back-off timer is performed in accordance with the type of each congestion control.

Although the processes of the UE_A 10 and NW with the change of the PLMN described above have been associated with the first congestion control and/or the back-off timer for the first congestion control, a similar process may be performed for the second congestion control, the third congestion control, and the fourth congestion control. However, the PDU session establishment request message of which transmission is regulated or allowed may be a message depending on each type.

In other words, the congestion control and/or the back-off timer associated with the congestion control may be associated with the PLMN regardless of the type of congestion control.

Alternatively, any congestion control and/or the back-off timer associated with the congestion control may be configured to be associated with the PLMN. Thus, the congestion control and/or the back-off timer associated with the congestion control may be configured to be associated with the PLMN for the first congestion control, the second congestion control, and the third congestion control. Alternatively, the congestion control and/or the back-off timer associated with the congestion control may be configured to be associated with the PLMN for the first congestion control, the second congestion control, and the third congestion control for the No DNN, and the first congestion control for the specific DNN need may not necessarily be associated with the PLMN.

Note that the process in a case that each congestion control is associated with the PLMN, and/or the process relating to the back-off timer corresponding to each congestion control may be a process in which the above-described process for the first congestion control associated with the PLMN, and/or the above-described first congestion control in the description of the process related to the back-off timer corresponding to the first congestion control associated with the PLMN is substituted with each of the second to fourth congestion control types.

The process in a case that each congestion control is not associated with the PLMN, and/or the process relating to the back-off timer corresponding to each congestion control may be a process in which the above-described process for the first congestion control not associated with the PLMN, and/or the above-described first congestion control in the description of the process related to the back-off timer corresponding to the first congestion control not associated with the PLMN are substituted with each of the second to fourth congestion control types.

However, as described above, the PDU session establishment request message of which transmission is regulated or allowed may be a message depending on each type.

Alternatively, the behavior in a case that the PLMN is changed while the counting of the back-off timer associated with the second congestion control and/or the third congestion control is running may be performed as described below in addition to the processing described above.

Note that the back-off timer associated with the second congestion control may be a back-off timer for slice-based congestion control, as previously described.

Specifically, the sliced-based back-off timer may be a timer associated with a specific S-NSSAI and for prohibiting the transmission of an SM request message using the specific S-NSSAI. In other words, the UE_A 10 may configure such that the SM request message using the specific S-NSSAI is not transmitted during counting the timer.

Furthermore, the UE_A 10 may configure, during counting the timer, such that transmission of the SM request message prohibited in the PLMN before changed is allowed in the new PLMN, based on the specific conditions described below. Note that the expression that the transmission of the SM request message prohibited in the PLMN before changed is allowed may mean that the transmission of the SM request message using the S-NSSAI the same as the S-NSSAI associated with the back-off timer is allowed.

The slice-based back-off timer may also be a timer associated with no S-NSSAI for prohibiting the transmission of the SM request messages using no S-NSSAI. In other words, the UE_A 10 may configure such that the SM request message using no S-NSSAI is not transmitted during counting the timer. Furthermore, the UE_A 10 may configure, during counting the timer, such that transmission of the SM request message prohibited in the PLMN before changed is allowed in the new PLMN, based on the specific conditions described below. Note that the expression that the transmission of the SM request message prohibited in the PLMN before changed is allowed may mean that the transmission of the SM request message using no S-NSSAI is allowed.

The back-off timer associated with the third congestion control may be a back-off timer for congestion control for the combination of the S-NSSAI and the DNN, as described above.

Specifically, the back-off timer for congestion control for the combination of the S-NSSAI and the DNN may be a timer associated with the combination of the specific S-NSSAI and the specific DNN for prohibiting the transmission of the SM request message using the specific S-NSSAI and the specific DNN. In other words, the UE_A 10 may configure such that the SM request message using the specific S-NSSAI and the specific DNN is not transmitted during counting the timer. Furthermore, the UE_A 10 may configure, during counting the timer, such that transmission of the SM request message prohibited in the PLMN before changed is allowed in the new PLMN, based on the specific conditions described below. Note that the expression that the transmission of the SM request message prohibited in the PLMN before changed is allowed may mean that the transmission of the SM request message using the S-NSSAI the same as the S-NSSAI associated with the back-off timer and the DNN the same as the DNN associated with the back-off timer is allowed.

The back-off timer for congestion control for the combination of the S-NSSAI and the DNN may be a timer associated with the combination of no S-NSSAI and the specific DNN for prohibiting the transmission of the SM request message using no S-NSSAI and the specific DNN. In other words, the UE_A 10 may configure such that the SM request message including no S-NSSAI and the specific DNN is not transmitted during counting the timer. Furthermore, the UE_A 10 may configure, during counting the timer, such that transmission of the SM request message prohibited in the PLMN before changed is allowed in the new PLMN, based on the specific conditions described below. Note that the expression that the transmission of the SM request message prohibited in the PLMN before changed is allowed may mean that the transmission of the SM request message using no S-NSSAI and the DNN the same as the DNN associated with the back-off timer is allowed.

The back-off timer for congestion control for the combination of the S-NSSAI and the DNN may be a timer associated with the combination of the specific S-NSSAI and no DNN for prohibiting the transmission of the SM request message using the specific S-NSSAI and no DNN. In other words, the UE_A 10 may configure such that the SM request message using the specific S-NSSAI and no DNN is not transmitted during counting the timer. Furthermore, the UE_A 10 may configure, during counting the timer, such that transmission of the SM request message prohibited in the PLMN before changed is allowed in the new PLMN, based on the specific conditions described below. Note that the expression that the transmission of the SM request message prohibited in the PLMN before changed is allowed may mean that the transmission of the SM request message using the S-NSSAI the same as the S-NSSAI associated with the back-off timer and no DNN is allowed.

The back-off timer for congestion control for the combination of the S-NSSAI and the DNN may be a timer associated with the combination of no S-NSSAI and no DNN for prohibiting the transmission of the SM request message using no S-NSSAI and no DNN. In other words, the UE_A 10 may configure such that the SM request message using no S-NSSAI and no DNN is not transmitted during counting the timer. Furthermore, the UE_A 10 may configure, during counting the timer, such that transmission of the SM request message prohibited in the PLMN before changed is allowed in the new PLMN, based on the specific conditions described below. Note that the expression that the transmission of the SM request message prohibited in the PLMN before changed is allowed may mean that the transmission of the SM request message using no S-NSSAI and no DNN is allowed.

Note that in the present embodiment, the expression that the SM request message is transmitted using no S-NSSAI may mean that the SM request message without including the specific S-NSSAI is transmitted. The network receiving such SM request message may recognize the request as a request for the default S-NSSAI and/or the default network slice because no S-NSSAI is included. Thus, no S-NSSAI may be information indicating that S-NSSAI is not included in the SM request message and/or information meaning that the default network slice is requested.

Note that in the present embodiment, the expression that the SM request message is transmitted using no DNN may mean that the SM request message without including the specific DNN is transmitted. The network receiving such an SM request message may recognize the request as a request for the default DNN because no DNN is included. Thus, no DNN may be information indicating that no S-NSSAI is included in the SM request message and/or information indicating that the default DNN is requested.

Further, the UE_A 10 may start the back-off timer associated with the second congestion control, based on the reception of the fifteenth identification information. Furthermore, the UE_A 10 may configure the fourteenth identification information for the timer value of the back-off timer, based on the reception of the fourteenth identification information. Furthermore, the UE_A 10 may associate the S-NSSAI with the back-off timer in a case that the S-NSSAI is provided in the PDU session establishment procedure. Conversely, the UE_A 10 may associate no S-NSSAI with the back-off timer in a case that S-NSSAI is not provided in the PDU session establishment procedure.

Further, the UE_A 10 may start the back-off timer associated with the third congestion control, based on the reception of the fifteenth identification information. Furthermore, the UE_A 10 may configure the fourteenth identification information for the timer value of the back-off timer, based on the reception of the fourteenth identification information. Furthermore, the UE_A 10 may associate the S-NSSAI and the DNN with the back-off timer in a case that the S-NSSAI and the DNN are provided in the PDU session establishment procedure. Furthermore, the UE_A 10 may associate the S-NSSAI and no DNN with the back-off timer in a case that the S-NSSAI is provided and no DNN is provided in the PDU session establishment procedure. Furthermore, the UE_A 10 may associate no S-NSSAI and the DNN with the back-off timer in a case that no S-NSSAI is provided and the DNN is provided in the PDU session establishment procedure. Furthermore, the UE_A 10 may associate no S-NSSAI and no DNN with the back-off timer in a case that neither S-NSSAI nor DNN is provided in the PDU session establishment procedure.

Note that the fourteenth identification information and/or the fifteenth identification information may be transmitted and/or received with being included in the PDU session establishment reject message that is transmitted and/or received in the PDU session establishment procedure. Furthermore, the fourteenth identification information and/or the fifteenth identification information may be transmitted and/or received with being included in the PDU session reject message that is transmitted and/or received in the PDU session modification procedure. Furthermore, the fourteenth identification information and/or the fifteenth identification information may be transmitted and/or received with being included in the PDU session release command message that is transmitted and/or received in the PDU session release procedure.

The UE_A 10 may be configured to perform any process of first to eighth process examples described below in a case of performing the count of any one or multiple of two examples of the back-off timers for the second congestion control and four examples of the back-off timers for the third congestion control described above.

The first process example will be described below.

Note that in the first process example, the 20th identification information may be an information element indicating whether or not an S-NSSAI-based congestion control is adapted in the current PLMN and other PLMNs than the PLMN. Note that the S-NSSAI-based congestion control may be the second congestion control or the third congestion control.

In this case, the 20th identification information may be capable of including information indicating that the S-NSSAI-based congestion control is adapted in the current PLMN and other PLMNs than the PLMN, or information indicating that the S-NSSAI-based congestion control is adapted only in the current PLMN. In other words, the 20th identification information may be information including the 21st identification information or the 22nd identification information.

Here, the 21st identification information may be information indicating that the S-NSSAI-based congestion control is adapted in the current PLMN and other PLMNs than the PLMN. Furthermore, the 22nd identification information may be information indicating that the S-NSSAI-based congestion control is adapted only in the current PLMN.

Furthermore, the 20th identification information may be an information element indicating whether or not the counted back-off timer is valid in the all PLMNs. Note that the back-off timer may be a back-off timer used for the S-NSSAI-based congestion control.

In this case, the 20th identification information may be capable of including information indicating that the counted back-off timer is valid in the all PLMNs, or information indicating that the counted back-off timer is valid only in the current PLMN. In other words, the 20th identification information may be information including the 21st identification information or the 22nd identification information.

Here, the 21st identification information may be information indicating that the counted back-off timer is valid in the all PLMNs. Further, the 22nd identification information may be information indicating that the counted back-off timer is valid only in the current PLMN.

Furthermore, the 20th identification information may be an information element indicating whether or not the home PLMN is congested. Note that the home PLMN being congested may be the slice in the home PLMN being congested. Moreover, the home PLMN being congested may be a state in which the S-NSSAI-based congestion control is performed in the home PLMN.

In this case, the 20th identification information may be capable of including information indicating that the home PLMN is congested, or information indicating that the home PLMN is not congested. In other words, the 20th identification information may be information including the 21st identification information or the 22nd identification information.

Here, the 21st identification information may be information indicating that the home PLMN is congested. Furthermore, the 22nd identification information may be information indicating that the home PLMN is not congested.

Furthermore, the 20th identification information may be information indicating whether the S-NSSAI associated with the S-NSSAI-based congestion control is the S-NSSAI for the home PLMN or the S-NSSAI for a visited PLMN.

In this case, the 20th identification information may be capable of including information indicating that the S-NSSAI associated with the S-NSSAI-based congestion control is the S-NSSAI for the home PLMN, or information indicating that the S-NSSAI associated with the S-NSSAI based congestion control is the S-NSSAI for the visited PLMN. In other words, the 20th identification information may be information including the 21st identification information or the 22nd identification information.

Here, the 21st identification information may be information indicating that the S-NSSAI associated with the S-NSSAI-based congestion control is the S-NSSAI for the home PLMN. Furthermore, the 22nd identification information may be information indicating that the S-NSSAI associated with the S-NSSAI-based congestion control is the S-NSSAI for the visited PLMN.

Furthermore, in the case of the first process example, the 20th identification information may be identification information transmitted and/or received in the visited PLMN and not transmitted and/or received in the home PLMN.

The process of the UE_A 10, in the first process example, in receiving the back-off timer in the home PLMN and then moving from the home PLMN to another PLMN will be described. In other words, the process of the UE_A 10, in the first process example, moving from the home PLMN to another PLMN while the back-off timer is running will be described below.

The UE_A 10 in changing the PLMN, in a case that the PLMN before changed is the home PLMN, may continue the regulation for the transmission of the SM request message described in each example in a destination PLMN depending on the counted back-off timer. In other words, in this case, in the destination PLMN, the UE_A 10 may configure such that the transmission of the SM request message described in each example is prohibited depending on the counted back-off timer.

In this way, the UE_A 10 may perform the first process example regardless of whether receiving the 20th identification information described later, in a case of receiving the back-off timer. In other words, the UE_A 10 may be configured to perform the first process example even in a case of not receiving the 20th identification information described later in a case of receiving the back-off timer. In other words, the UE_A 10 may be configured to continue the regulation by the back-off timer received in the home PLMN even after changing the PLMN.

Next, the process, in the first process example, in receiving the back-off timer in the visited PLMN and then moving to another PLMN will be described. In other words, the process of the UE_A 10, in the first process example, moving from the visited PLMN to another PLMN while the back-off timer is running will be described below.

The UE_A 10 may configure such that in a case that the UE_A 10 in changing the PLMN receives the 22nd identification information in a case of receiving the back-off timer, and/or does not receive the 20th identification information in a case of receiving the back-off timer, the transmission of the SM request message described in each example is allowed in the destination PLMN depending on the counted back-off timer. In other words, in this case, in the destination PLMN, the UE_A 10 may configure such that the transmission of the SM request message described in each example is allowed depending on the counted back-off timer. Further, in other words, in this case, in the destination PLMN, the UE_A 10 may configure such that the transmission of the SM request message that is prohibited in the PLMN before changed described in each example is allowed depending on the counted back-off timer.

However, in a case that the UE_A 10 in changing the PLMN receives the 21st identification information in a case of receiving the back-off timer, the UE_A 10 may continue the regulation for the transmission of the SM request message described in each example in the destination PLMN depending on the counted back-off timer. In other words, in this case, in the destination PLMN, the UE_A 10 may configure such that the transmission of the SM request message described in each example is prohibited depending on the counted back-off timer.

Furthermore, the UE_A 10 in changing the PLMN, in a case that the PLMN before changed is the visited PLMN, and the UE_A 10 performs the count of the back-off timer in the PLMN before changed and receives the 20th identification information configured in the 21st identification information along with the value of the back-off timer, may continue the regulation for the transmission of the SM request message described in each example depending on the counted back-off timer. In other words, in this case, in the destination PLMN, the UE_A 10 may configure such that the transmission of the SM request message described in each example is prohibited depending on the counted back-off timer.

Furthermore, the UE_A 10 in changing the PLMN, in a case that the PLMN before changed is the visited PLMN, and the UE_A 10 performs the count of the back-off timer in the PLMN before changed and receives the 21st identification information along with the value of the back-off timer, may continue the regulation for the transmission of the SM request message described in each example depending on the counted back-off timer. In other words, in this case, in the destination PLMN, the UE_A 10 may configure such that the transmission of the SM request message described in each example is prohibited depending on the counted back-off timer.

Furthermore, the UE_A 10 in changing the PLMN, in a case of performing the count of the back-off timer in the PLMN before changed and also performing the count of the back-off timer in the destination PLMN, may continue the regulation for the transmission of the SM request message described in each example depending on the counted back-off timer. In other words, in this case, in the destination PLMN, the UE_A 10 may configure such that the transmission of the SM request message described in each example is prohibited depending on the counted back-off timer.

Next, the second process example will be described.

Note that in the second process example, the 20th identification information may be an information element indicating that the S-NSSAI-based congestion control is adapted in the current PLMN and other PLMNs than the PLMN. Note that the S-NSSAI-based congestion control may be the second congestion control or the third congestion control.

In this case, the 20th identification information may be capable of including information indicating that the S-NSSAI-based congestion control is adapted in the current PLMN and other PLMNs than the PLMN. Furthermore, the 20th identification information may be an information element that cannot include the information indicating that the S-NSSAI-based congestion control is adapted only in the current PLMN. In other words, the 20th identification information may be information including the 21st identification information.

Here, the 21st identification information may be information indicating that the S-NSSAI-based congestion control is adapted in the current PLMN and other PLMNs than the PLMN.

Furthermore, the 20th identification information may be an information element indicating that the counted back-off timer is valid in the all PLMNs. Note that the back-off timer may be a back-off timer used for the S-NSSAI-based congestion control.

In this case, the 20th identification information may be capable of including information indicating that the counted back-off timer is valid in the all PLMNs. Furthermore, the 20th identification information may be an information element that cannot include the information indicating that the counted back-off timer is valid only in the current PLMN. In other words, the 20th identification information may be information including the 21st identification information.

Here, the 21st identification information may be information indicating that the counted back-off timer is valid in the all PLMNs.

Furthermore, the 20th identification information may be an information element indicating that the home PLMN is congested. Note that the home PLMN being congested may be the slice in the home PLMN being congested. Moreover, the home PLMN being congested may be a state in which the S-NSSAI-based congestion control is performed in the home PLMN.

In this case, the 20th identification information may be capable of including information indicating that the home PLMN is congested. Furthermore, the 20th identification information may be an information element that cannot include the information indicating that the home PLMN is not congested. In other words, the 20th identification information may be information including the 21st identification information.

Here, the 21st identification information may be information indicating that the home PLMN is congested.

Furthermore, the 20th identification information may be information indicating that the S-NSSAI associated with the S-NSSAI-based congestion control is the S-NSSAI for the home PLMN.

In this case, the 20th identification information may be capable of including the information indicating that the S-NSSAI associated with the S-NSSAI-based congestion control is the S-NSSAI for the home PLMN. Furthermore, the 20th identification information may be an information element that cannot include the information indicating that the S-NSSAI associated with the S-NSSAI-based congestion control is the S-NSSAI for the visited PLMN. In other words, the 20th identification information may be information including the 21st identification information.

Here, the 21st identification information may be information indicating that the S-NSSAI associated with the S-NSSAI-based congestion control is the S-NSSAI for the home PLMN.

In addition, the 20th identification information may be identification information transmitted and/or received in the visited PLMN and not transmitted and/or received in the home PLMN.

The process of the UE_A 10, in the second process example, in receiving the back-off timer in the home PLMN and then moving from the home PLMN to another PLMN will be described. In other words, the process of the UE_A 10, in the second process example, moving from the home PLMN to another PLMN while the back-off timer is running will be described below.

The UE_A 10 in changing the PLMN, in a case that the PLMN before changed is the home PLMN, may continue the regulation for the transmission of the SM request message described in each example in the destination PLMN depending on the counted back-off timer. In other words, in this case, in the destination PLMN, the UE_A 10 may configure such that the transmission of the SM request message described in each example is prohibited depending on the counted back-off timer.

In this way, the UE_A 10 may perform the second process example regardless of whether receiving the 20th identification information described later in a case of receiving the back-off timer. In other words, the UE_A 10 may be configured to perform the second process example even in a case of not receiving the 20th identification information described later in a case of receiving the back-off timer. In other words, the UE_A 10 may be configured to continue the regulation by the back-off timer received in the home PLMN even after changing the PLMN.

Next, the process, in the second process example, in receiving the back-off timer in the visited PLMN and then moving to another PLMN will be described. In other words, the process of the UE_A 10, in the second process example, moving from the visited PLMN to another PLMN while the back-off timer is running will be described below.

The UE_A 10 may configure such that in a case that the UE_A 10, in changing the PLMN, does not receive the 20th identification information in a case of receiving the back-off timer, the transmission of the SM request message described in each example is allowed in the destination PLMN depending on the counted back-off timer. In other words, in this case, in the destination PLMN, the UE_A 10 may configure such that the transmission of the SM request message described in each example is allowed depending on the counted back-off timer. Further, in other words, in this case, in the destination PLMN, the UE_A 10 may configure such that the transmission of the SM request message that is prohibited in the PLMN before changed described in each example is allowed depending on the counted back-off timer.

However, in a case that the UE_A 10 in changing the PLMN receives the 21st identification information in a case of receiving the back-off timer, the UE_A 10 may continue the regulation for the transmission of the SM request message described in each example in the destination PLMN depending on the counted back-off timer. In other words, in this case, in the destination PLMN, the UE_A 10 may configure such that the transmission of the SM request message described in each example is prohibited depending on the counted back-off timer.

Furthermore, the UE_A 10 in changing the PLMN, in a case that the PLMN before changed is the visited PLMN, and the UE_A 10 performs the count of the back-off timer in the PLMN before changed and receives the 20th identification information and/or the 21st identification information along with the value of the back-off timer, may continue the regulation for the transmission of the SM request message described in each example depending on the counted back-off timer. In other words, in this case, in the destination PLMN, the UE_A 10 may configure such that the transmission of the SM request message described in each example is prohibited depending on the counted back-off timer.

Furthermore, the UE_A 10 in changing the PLMN, in a case of performing the count of the back-off timer in the PLMN before changed and also performing the count of the back-off timer in the destination PLMN, may continue the regulation for the transmission of the SM request message described in each example depending on the counted back-off timer. In other words, in this case, in the destination PLMN, the UE_A 10 may configure such that the transmission of the SM request message described in each example is prohibited depending on the counted back-off timer.

Next, the third process example will be described.

Note that in the third process example, the 20th identification information, the 21st identification information, and the 22nd identification information may be similar to the pieces of identification information described in the first process example.

Furthermore, in the case of the third process example, the 20th identification information may be identification information that can be transmitted and/or received in both the visited PLMN and the home PLMN.

The process of the UE_A 10, in the third process example, in receiving the back-off timer in the home PLMN and then moving from the home PLMN to another PLMN will be described. In other words, the process of the UE_A 10, in the third process example, moving from the home PLMN to another PLMN while the back-off timer is running will be described below.

The UE_A 10 may configure such that in a case that the UE_A 10 changes the PLMN, in the case that the PLMN before changed is the home PLMN and the UE_A 10 receives the 22nd identification information in a case of receiving the back-off timer, and/or in a case that the UE_A 10 changes the PLMN, in the case that the PLMN before changed is the home PLMN and the UE_A 10 does not receive the 20th identification information in a case of receiving the back-off timer, the transmission of the SM request message described in each example is allowed in the destination PLMN depending on the counted back-off timer. In other words, in this case, in the destination PLMN, the UE_A 10 may configure such that the transmission of the SM request message described in each example is allowed depending on the counted back-off timer. Further, in other words, in this case, in the destination PLMN, the UE_A 10 may configure such that the transmission of the SM request message that is prohibited in the PLMN before changed described in each example is allowed depending on the counted back-off timer.

To be more specific, the UE_A 10 may configure such that in a case that the UE_A 10 changes the PLMN, in a case that the PLMN before changed is the home PLMN and the UE_A 10 does not perform the count of the back-off timer in the destination PLMN, and further in a case of not receiving the 20th identification information in a case of receiving the back-off timer, and/or in a case of receiving the 20th identification information including the 22nd identification information in a case of receiving the back-off timer, and/or in a case of receiving the 22nd identification information in a case of receiving the back-off timer, the transmission of the SM request message described in each example is allowed in the destination PLMN depending on the counted back-off timer. In other words, in this case, in the destination PLMN, the UE_A 10 may configure such that the transmission of the SM request message described in each example is allowed depending on the counted back-off timer. Further, in other words, in this case, in the destination PLMN, the UE_A 10 may configure such that the transmission of the SM request message that is prohibited in the PLMN before changed described in each example is allowed depending on the counted back-off timer.

However, the UE_A 10 in changing the PLMN, in the case that the PLMN before changed is the home PLMN and the UE_A 10 receives the 21st identification information in a case of receiving the back-off timer, may continue the regulation for the transmission of the SM request message described in each example in the destination PLMN depending on the counted back-off timer. In other words, in this case, in the destination PLMN, the UE_A 10 may configure such that the transmission of the SM request message described in each example is prohibited depending on the counted back-off timer.

Furthermore, the UE_A 10 in changing the PLMN, in a case that the PLMN before changed is the home PLMN, and the UE_A 10 performs the count of the back-off timer in the PLMN before changed and receives the 20th identification information configured in the 21st identification information along with the value of the back-off timer, may continue the regulation for the transmission of the SM request message described in each example depending on the counted back-off timer. In other words, in this case, in the destination PLMN, the UE_A 10 may configure such that the transmission of the SM request message described in each example is prohibited depending on the counted back-off timer.

Furthermore, the UE_A 10 in changing the PLMN, in a case that the PLMN before changed is the home PLMN, and the UE_A 10 performs the count of the back-off timer in the PLMN before changed and receives the 21st identification information along with the value of the back-off timer, may continue the regulation for the transmission of the SM request message described in each example depending on the counted back-off timer. In other words, in this case, in the destination PLMN, the UE_A 10 may configure such that the transmission of the SM request message described in each example is prohibited depending on the counted back-off timer.

Furthermore, the UE_A 10 in changing the PLMN, in a case that the PLMN before changed is the home PLMN, and the UE_A 10 performs the count of the back-off timer in the PLMN before changed and also performs the count of the back-off timer in the destination PLMN, may continue the regulation for the transmission of the SM request message described in each example depending on the counted back-off timer. In other words, in this case, in the destination PLMN, the UE_A 10 may configure such that the transmission of the SM request message described in each example is prohibited depending on the counted back-off timer.

Next, the process, in the third process example, in receiving the back-off timer in the visited PLMN and then moving to another PLMN will be described. In other words, the process of the UE_A 10, in the third process example, moving from the visited PLMN to another PLMN while the back-off timer is running will be described below.

The UE_A 10 may configure such that in a case that the UE_A 10 does not receive the 20th identification information in a case of receiving the back-off timer, and/or the UE_A 10, in changing the PLMN, receives the 22nd identification information in a case of receiving the back-off timer, the transmission of the SM request message described in each example is allowed in the destination PLMN depending on the counted back-off timer. In other words, in this case, in the destination PLMN, the UE_A 10 may configure such that the transmission of the SM request message described in each example is allowed depending on the counted back-off timer. Further, in other words, in this case, in the destination PLMN, the UE_A 10 may configure such that the transmission of the SM request message that is prohibited in the PLMN before changed described in each example is allowed depending on the counted back-off timer.

However, in a case that the UE_A 10 in changing the PLMN receives the 21st identification information in a case of receiving the back-off timer, the UE_A 10 may continue the regulation for the transmission of the SM request message described in each example in the destination PLMN depending on the counted back-off timer. In other words, in this case, in the destination PLMN, the UE_A 10 may configure such that the transmission of the SM request message described in each example is prohibited depending on the counted back-off timer.

Furthermore, the UE_A 10 in changing the PLMN, in a case of performing the count of the back-off timer in the PLMN before changed and receiving the 20th identification information configured in the 21st identification information along with the value of the back-off timer, may continue the regulation for the transmission of the SM request message described in each example depending on the counted back-off timer. In other words, in this case, in the destination PLMN, the UE_A 10 may configure such that the transmission of the SM request message described in each example is prohibited depending on the counted back-off timer.

Furthermore, the UE_A 10 in changing the PLMN, in a case of performing the count of the back-off timer in the PLMN before changed and receiving the 21st identification information along with the value of the back-off timer, may continue the regulation for the transmission of the SM request message described in each example depending on the counted back-off timer. In other words, in this case, in the destination PLMN, the UE_A 10 may configure such that the transmission of the SM request message described in each example is prohibited depending on the counted back-off timer.

Furthermore, the UE_A 10 in changing the PLMN, in a case of performing the count of the back-off timer in the PLMN before changed and also performing the count of the back-off timer in the destination PLMN, may continue the regulation for the transmission of the SM request message described in each example depending on the counted back-off timer. In other words, in this case, in the destination PLMN, the UE_A 10 may configure such that the transmission of the SM request message described in each example is prohibited depending on the counted back-off timer.

Next, the fourth process example will be described.

Note that in the fourth process example, the 20th identification information, the 21st identification information, and the 22nd identification information may be similar to the identification information described in the first process example.

Furthermore, in the case of the fourth process example, the 20th identification information may be identification information that can be transmitted and/or received in the visited PLMN and the home PLMN.

The process of the UE_A 10, in the fourth process example, in receiving the back-off timer in the home PLMN and then moving from the home PLMN to another PLMN will be described. In other words, the process of the UE_A 10, in the fourth process example, moving from the home PLMN to another PLMN while the back-off timer is running will be described below.

The UE_A 10 may configure such that in a case that the UE_A 10 changes the PLMN, in the case that the PLMN before changed is the home PLMN and the UE_A 10 receives the 22nd identification information in a case of receiving the back-off timer, the transmission of the SM request message described in each example is allowed in the destination PLMN depending on the counted back-off timer. In other words, in this case, in the destination PLMN, the UE_A 10 may configure such that the transmission of the SM request message described in each example is allowed depending on the counted back-off timer. Further, in other words, in this case, in the destination PLMN, the UE_A 10 may configure such that the transmission of the SM request message that is prohibited in the PLMN before changed described in each example is allowed depending on the counted back-off timer.

To be more specific, the UE_A 10 may configure such that in a case that the UE_A 10 changes the PLMN, in the case that the PLMN before changed is the home PLMN and the UE_A 10 does not perform the count of the back-off timer in the destination PLMN, and further in a case of receiving the 20th identification information including the 22nd identification information in a case of receiving the back-off timer, and/or in a case of receiving the 22nd identification information in a case of receiving the back-off timer, the transmission of the SM request message described in each example is allowed in the destination PLMN depending on the counted back-off timer. In other words, in this case, in the destination PLMN, the UE_A 10 may configure such that the transmission of the SM request message described in each example is allowed depending on the counted back-off timer. Further, in other words, in this case, in the destination PLMN, the UE_A 10 may configure such that the transmission of the SM request message that is prohibited in the PLMN before changed described in each example is allowed depending on the counted back-off timer.

However, in a case that the UE_A 10 changes the PLMN, in the case that the PLMN before changed is the home PLMN and the UE_A 10 receives the 21st identification information in a case of receiving the back-off timer, and/or in a case that the UE_A 10 changes the PLMN, in the case that the PLMN before changed is the home PLMN and the UE_A 10 does not receive the 20th identification information in a case of receiving the back-off timer, the UE_A 10 may continue regulation for the transmission of the SM request message described in each example in the destination PLMN depending on the counted back-off timer. In other words, in this case, in the destination PLMN, the UE_A 10 may configure such that the transmission of the SM request message described in each example is prohibited depending on the counted back-off timer.

Next, the process, in the fourth process example, in receiving the back-off timer in the visited PLMN and then moving to another PLMN will be described. In other words, the process of the UE_A 10, in the fourth process example, moving from the visited PLMN to another PLMN while the back-off timer is running will be described below.

The UE_A 10 may configure such that in a case that the UE_A 10 does not receive the 20th identification information in a case of receiving the back-off timer, and/or the UE_A 10, in changing the PLMN, receives the 22nd identification information in a case of receiving the back-off timer, the transmission of the SM request message described in each example is allowed in the destination PLMN depending on the counted back-off timer. In other words, in this case, in the destination PLMN, the UE_A 10 may configure such that the transmission of the SM request message described in each example is allowed depending on the counted back-off timer. Further, in other words, in this case, in the destination PLMN, the UE_A 10 may configure such that the transmission of the SM request message that is prohibited in the PLMN before changed, described in each example, is allowed depending on the counted back-off timer.

However, in a case that the UE_A 10 in changing the PLMN receives the 21st identification information in a case of receiving the back-off timer, the UE_A 10 may continue the regulation for the transmission of the SM request message described in each example in the destination PLMN depending on the counted back-off timer. In other words, in this case, in the destination PLMN, the UE_A 10 may configure such that the transmission of the SM request message described in each example is prohibited depending on the counted back-off timer.

Furthermore, the UE_A 10 in changing the PLMN, in a case of performing the count of the back-off timer in the PLMN before changed and receiving the 20th identification information configured in the 21st identification information along with the value of the back-off timer, may continue the regulation for the transmission of the SM request message described in each example depending on the counted back-off timer. In other words, in this case, in the destination PLMN, the UE_A 10 may configure such that the transmission of the SM request message described in each example is prohibited depending on the counted back-off timer.

Furthermore, the UE_A 10 in changing the PLMN, in a case of performing the count of the back-off timer in the PLMN before changed and receiving the 21st identification information along with the value of the back-off timer, may continue the regulation for the transmission of the SM request message described in each example depending on the counted back-off timer. In other words, in this case, in the destination PLMN, the UE_A 10 may configure such that the transmission of the SM request message described in each example is prohibited depending on the counted back-off timer.

Furthermore, the UE_A 10 in changing the PLMN, in a case of performing the count of the back-off timer in the PLMN before changed and also performing the count of the back-off timer in the destination PLMN, may continue the regulation for the transmission of the SM request message described in each example depending on the counted back-off timer. In other words, in this case, in the destination PLMN, the UE_A 10 may configure such that the transmission of the SM request message described in each example is prohibited depending on the counted back-off timer.

Next, the fifth process example will be described.

Note that in the fifth process example, the 20th identification information and the 21st identification information may be similar to the pieces of identification information described in the second process example.

Furthermore, in the case of the fifth process example, the 20th identification information may be identification information that can be transmitted and/or received in the visited PLMN and the home PLMN.

The process of the UE_A 10, in the fifth process example, in receiving the back-off timer in the home PLMN and then moving from the home PLMN to another PLMN will be described. In other words, the process of the UE_A 10, in the fifth process example, moving from the home PLMN to another PLMN while the back-off timer is running will be described below.

The UE_A 10 may configure such that in a case that the UE_A 10 changes the PLMN, in the case that the PLMN before changed is the home PLMN and the UE_A 10 does not receive the 20th identification information in a case of receiving the back-off timer, and/or in a case that the UE_A 10 changes the PLMN, in the case that the PLMN before changed is the home PLMN and the UE_A 10 receives the 20th identification information not including the 21st identification information in a case of receiving the back-off timer, the transmission of the SM request message described in each example is allowed in the destination PLMN depending on the counted back-off timer. In other words, in this case, in the destination PLMN, the UE_A 10 may configure such that the transmission of the SM request message described in each example is allowed depending on the counted back-off timer. Further, in other words, in this case, in the destination PLMN, the UE_A 10 may configure such that the transmission of the SM request message that is prohibited in the PLMN before changed described in each example is allowed depending on the counted back-off timer.

To be more specific, the UE_A 10 may configure such that in a case that the UE_A 10 changes the PLMN, in the case that the PLMN before changed is the home PLMN and the UE_A 10 does not perform the count of the back-off timer in the destination PLMN, and further in a case of not receiving the 20th identification information in a case of receiving the back-off timer, and/or in a case of receiving the 20th identification information not including the 21st identification information in a case of receiving the back-off timer, the transmission of the SM request message described in each example is allowed in the destination PLMN depending on the counted back-off timer. In other words, in this case, in the destination PLMN, the UE_A 10 may configure such that the transmission of the SM request message described in each example is allowed depending on the counted back-off timer. Further, in other words, in this case, in the destination PLMN, the UE_A 10 may configure such that the transmission of the SM request message that is prohibited in the PLMN before changed described in each example is allowed depending on the counted back-off timer.

However, the UE_A 10 in changing the PLMN, in the case that the PLMN before changed is the home PLMN and the UE_A 10 receives the 21st identification information in a case of receiving the back-off timer, may continue the regulation for the transmission of the SM request message described in each example in the destination PLMN depending on the counted back-off timer. In other words, in this case, in the destination PLMN, the UE_A 10 may configure such that the transmission of the SM request message described in each example is prohibited depending on the counted back-off timer.

Furthermore, the UE_A 10 in changing the PLMN, in a case that the PLMN before changed is the home PLMN, and the UE_A 10 performs the count of the back-off timer in the PLMN before changed and receives the 20th identification information and/or the 21st identification information along with the value of the back-off timer, may continue the regulation for the transmission of the SM request message described in each example depending on the counted back-off timer. In other words, in this case, in the destination PLMN, the UE_A 10 may configure such that the transmission of the SM request message described in each example is prohibited depending on the counted back-off timer.

Furthermore, the UE_A 10 in changing the PLMN, in a case that the PLMN before changed is the home PLMN, and the UE_A 10 performs the count of the back-off timer in the PLMN before changed and also performs the count of the back-off timer in the destination PLMN, may continue the regulation for the transmission of the SM request message described in each example depending on the counted back-off timer. In other words, in this case, in the destination PLMN, the UE_A 10 may configure such that the transmission of the SM request message described in each example is prohibited depending on the counted back-off timer.

Next, the process, in the fifth process example, in receiving the back-off timer in the visited PLMN and then moving to another PLMN will be described. In other words, the process of the UE_A 10, in the fifth process example, moving from the visited PLMN to another PLMN while the back-off timer is running will be described below.

The UE_A 10 may configure such that in a case that the UE_A 10 changes the PLMN, in the case that the UE_A 10 does not receive the 20th identification information in a case of receiving the back-off timer, and/or in a case that the UE_A 10 changes, in the case that the UE_A 10 receives the 20th identification information not including the 21st identification information in a case of receiving the back-off timer, the transmission of the SM request message described in each example is allowed in the destination PLMN depending on the counted back-off timer. In other words, in this case, in the destination PLMN, the UE_A 10 may configure such that the transmission of the SM request message described in each example is allowed depending on the counted back-off timer. Further, in other words, in this case, in the destination PLMN, the UE_A 10 may configure such that the transmission of the SM request message that is prohibited in the PLMN before changed described in each example is allowed depending on the counted back-off timer.

However, in a case that the UE_A 10 in changing the PLMN receives the 21st identification information in a case of receiving the back-off timer, the UE_A 10 may continue the regulation for the transmission of the SM request message described in each example in the destination PLMN depending on the counted back-off timer. In other words, in this case, in the destination PLMN, the UE_A 10 may configure such that the transmission of the SM request message described in each example is prohibited depending on the counted back-off timer.

Furthermore, the UE_A 10 in changing the PLMN, in a case of performing the count of the back-off timer in the PLMN before changed and receiving the 20th identification information and/or the 21st identification information along with the value of the back-off timer, may continue the regulation for the transmission of the SM request message described in each example depending on the counted back-off timer. In other words, in this case, in the destination PLMN, the UE_A 10 may configure such that the transmission of the SM request message described in each example is prohibited depending on the counted back-off timer.

Furthermore, the UE_A 10 in changing the PLMN, in a case of performing the count of the back-off timer in the PLMN before changed and also performing the count of the back-off timer in the destination PLMN, may continue the regulation for the transmission of the SM request message described in each example depending on the counted back-off timer. In other words, in this case, in the destination PLMN, the UE_A 10 may configure such that the transmission of the SM request message described in each example is prohibited depending on the counted back-off timer.

Next, the sixth process example will be described.

Note that in the sixth process example, the 20th identification information, the 21st identification information, and the 22nd identification information may be similar to the identification information described in the first process example.

Furthermore, in the case of the sixth process example, the 20th identification information may be identification information transmitted and/or received in the visited PLMN and not transmitted and/or received in the home PLMN.

The process of the UE_A 10, in the sixth process example, in receiving the back-off timer in the home PLMN and then moving from the home PLMN to another PLMN will be described. In other words, the process of the UE_A 10, in the sixth process example, moving from the home PLMN to another PLMN while the back-off timer is running will be described below.

The UE_A 10 may configure such that in a case that the UE_A 10 changes the PLMN, in the case that the PLMN before changed is the home PLMN, the transmission of the SM request message described in each example is allowed in the destination PLMN depending on the counted back-off timer. In other words, in this case, in the destination PLMN, the UE_A 10 may configure such that the transmission of the SM request message described in each example is allowed depending on the counted back-off timer. Further, in other words, in this case, in the destination PLMN, the UE_A 10 may configure such that the transmission of the SM request message that is prohibited in the PLMN before changed described in each example is allowed depending on the counted back-off timer.

To be more specific, the UE_A 10 may configure such that in a case that the UE_A 10 changes the PLMN, in the case that the PLMN before changed is the home PLMN and the UE_A 10 does not perform the count of the back-off timer in the destination PLMN, the transmission of the SM request message described in each example is allowed in the destination PLMN depending on the counted back-off timer. In other words, in this case, in the destination PLMN, the UE_A 10 may configure such that the transmission of the SM request message described in each example is allowed depending on the counted back-off timer. Further, in other words, in this case, in the destination PLMN, the UE_A 10 may configure such that the transmission of the SM request message that is prohibited in the PLMN before changed described in each example is allowed depending on the counted back-off timer.

Furthermore, the UE_A 10 in changing the PLMN, in a case that the PLMN before changed is the home PLMN, and the UE_A 10 performs the count of the back-off timer in the PLMN before changed and also performs the count of the back-off timer in the destination PLMN, may continue the regulation for the transmission of the SM request message described in each example depending on the counted back-off timer. In other words, in this case, in the destination PLMN, the UE_A 10 may configure such that the transmission of the SM request message described in each example is prohibited depending on the counted back-off timer.

Next, the process, in the sixth process example, in receiving the back-off timer in the visited PLMN and then moving to another PLMN will be described. In other words, the process of the UE_A 10, in the sixth process example, moving from the visited PLMN to another PLMN while the back-off timer is running will be described below.

The UE_A 10 may configure such that in a case that the UE_A 10 in changing the PLMN receives the 22nd identification information in a case of receiving the back-off timer, and/or does not receive the 20th identification information in a case of receiving the back-off timer, the transmission of the SM request message described in each example is allowed in the destination PLMN depending on the counted back-off timer. In other words, in this case, in the destination PLMN, the UE_A 10 may configure such that the transmission of the SM request message described in each example is allowed depending on the counted back-off timer. Further, in other words, in this case, in the destination PLMN, the UE_A 10 may configure such that the transmission of the SM request message that is prohibited in the PLMN before changed described in each example is allowed depending on the counted back-off timer.

However, in a case that the UE_A 10 in changing the PLMN receives the 21st identification information in a case of receiving the back-off timer, the UE_A 10 may continue the regulation for the transmission of the SM request message described in each example in the destination PLMN depending on the counted back-off timer. In other words, in this case, in the destination PLMN, the UE_A 10 may configure such that the transmission of the SM request message described in each example is prohibited depending on the counted back-off timer.

Furthermore, the UE_A 10 in changing the PLMN, in a case that the PLMN before changed is the visited PLMN, and the UE_A 10 performs the count of the back-off timer in the PLMN before changed and receives the 20th identification information configured in the 21st identification information along with the value of the back-off timer, may continue the regulation for the transmission of the SM request message described in each example depending on the counted back-off timer. In other words, in this case, in the destination PLMN, the UE_A 10 may configure such that the transmission of the SM request message described in each example is prohibited depending on the counted back-off timer.

Furthermore, the UE_A 10 in changing the PLMN, in a case that the PLMN before changed is the visited PLMN, and the UE_A 10 performs the count of the back-off timer in the PLMN before changed and receives the 21st identification information along with the value of the back-off timer, may continue the regulation for the transmission of the SM request message described in each example depending on the counted back-off timer. In other words, in this case, in the destination PLMN, the UE_A 10 may configure such that the transmission of the SM request message described in each example is prohibited depending on the counted back-off timer.

Furthermore, the UE_A 10 in changing the PLMN, in a case of performing the count of the back-off timer in the PLMN before changed and also performing the count of the back-off timer in the destination PLMN, may continue the regulation for the transmission of the SM request message described in each example depending on the counted back-off timer. In other words, in this case, in the destination PLMN, the UE_A 10 may configure such that the transmission of the SM request message described in each example is prohibited depending on the counted back-off timer.

Next, the seventh process example will be described.

Note that in the seventh process example, the 20th identification information and the 21st identification information may be similar to the identification information described in the second process example.

Furthermore, in the case of the seventh process example, the 20th identification information may be identification information transmitted and/or received in the visited PLMN and not transmitted and/or received in the home PLMN.

The process of the UE_A 10, in the seventh process example, in receiving the back-off timer in the home PLMN and then moving from the home PLMN to another PLMN will be described. In other words, the process of the UE_A 10, in the seventh process example, moving from the home PLMN to another PLMN while the back-off timer is running will be described below.

The UE_A 10 may configure such that in a case that the UE_A 10 changes the PLMN, in the case that the PLMN before changed is the home PLMN, the transmission of the SM request message described in each example is allowed in the destination PLMN depending on the counted back-off timer. In other words, in this case, in the destination PLMN, the UE_A 10 may configure such that the transmission of the SM request message described in each example is allowed depending on the counted back-off timer. Further, in other words, in this case, in the destination PLMN, the UE_A 10 may configure such that the transmission of the SM request message that is prohibited in the PLMN before changed described in each example is allowed depending on the counted back-off timer.

To be more specific, the UE_A 10 may configure such that in a case that the UE_A 10 changes the PLMN, in the case that the PLMN before changed is the home PLMN and the UE_A 10 does not perform the count of the back-off timer in the destination PLMN, the transmission of the SM request message described in each example is allowed in the destination PLMN depending on the counted back-off timer. In other words, in this case, in the destination PLMN, the UE_A 10 may configure such that the transmission of the SM request message described in each example is allowed depending on the counted back-off timer. Further, in other words, in this case, in the destination PLMN, the UE_A 10 may configure such that the transmission of the SM request message that is prohibited in the PLMN before changed described in each example is allowed depending on the counted back-off timer.

Furthermore, the UE_A 10 in changing the PLMN, in a case that the PLMN before changed is the home PLMN, and the UE_A 10 performs the count of the back-off timer in the PLMN before changed and also performs the count of the back-off timer in the destination PLMN, may continue the regulation for the transmission of the SM request message described in each example depending on the counted back-off timer. In other words, in this case, in the destination PLMN, the UE_A 10 may configure such that the transmission of the SM request message described in each example is prohibited depending on the counted back-off timer.

Next, the process, in the seventh process example, in receiving the back-off timer in the visited PLMN and then moving to another PLMN will be described. In other words, the process of the UE_A 10, in the seventh process example, moving from the visited PLMN to another PLMN while the back-off timer is running will be described below.

The UE_A 10 may configure such that in a case that the UE_A 10 does not receive the 20th identification information in a case of receiving the back-off timer, the transmission of the SM request message described in each example is allowed in the destination PLMN depending on the counted back-off timer. In other words, in this case, in the destination PLMN, the UE_A 10 may configure such that the transmission of the SM request message described in each example is allowed depending on the counted back-off timer. Further, in other words, in this case, in the destination PLMN, the UE_A 10 may configure such that the transmission of the SM request message that is prohibited in the PLMN before changed described in each example is allowed depending on the counted back-off timer.

However, in a case that the UE_A 10 in changing the PLMN receives the 21st identification information in a case of receiving the back-off timer, the UE_A 10 may continue the regulation for the transmission of the SM request message described in each example in the destination PLMN depending on the counted back-off timer. In other words, in this case, in the destination PLMN, the UE_A 10 may configure such that the transmission of the SM request message described in each example is prohibited depending on the counted back-off timer.

Furthermore, the UE_A 10 in changing the PLMN, in a case that the PLMN before changed is the visited PLMN, and the UE_A 10 performs the count of the back-off timer in the PLMN before changed and receives the 20th identification information and/or the 21st identification information along with the value of the back-off timer, may continue the regulation for the transmission of the SM request message described in each example depending on the counted back-off timer. In other words, in this case, in the destination PLMN, the UE_A 10 may configure such that the transmission of the SM request message described in each example is prohibited depending on the counted back-off timer.

Furthermore, the UE_A 10 in changing the PLMN, in a case of performing the count of the back-off timer in the PLMN before changed and also performing the count of the back-off timer in the destination PLMN, may continue the regulation for the transmission of the SM request message described in each example depending on the counted back-off timer. In other words, in this case, in the destination PLMN, the UE_A 10 may configure such that the transmission of the SM request message described in each example is prohibited depending on the counted back-off timer.

Next, the eighth process example will be described.

Note that in the eighth process example, the 20th identification information and the 21st identification information may be similar to the identification information described in the second process example.

Furthermore, in the case of the eighth process example, the 20th identification information may be identification information that can be transmitted and/or received in the visited PLMN and the home PLMN.

The process of the UE_A 10, in the eighth process example, in receiving the back-off timer in the home PLMN and then moving from the home PLMN to another PLMN will be described. In other words, the process of the UE_A 10, in the eighth process example, moving from the home PLMN to another PLMN while the back-off timer is running will be described below.

The UE_A 10 in changing the PLMN, in a case that the PLMN before changed is the home PLMN, may continue the regulation for the transmission of the SM request message described in each example in the destination PLMN depending on the counted back-off timer. In other words, in this case, in the destination PLMN, the UE_A 10 may configure such that the transmission of the SM request message described in each example is prohibited depending on the counted back-off timer.

In this way, the UE_A 10 may perform the eighth process example regardless of whether receiving the 20th identification information described later in a case of receiving the back-off timer. In other words, the UE_A 10 may be configured to perform the eighth process example even in a case of not receiving the 20th identification information described later in a case of receiving the back-off timer. In other words, the UE_A 10 may be configured to continue the regulation by the back-off timer received in the home PLMN even after changing the PLMN.

Next, the process, in the eighth process example, in receiving the back-off timer in the visited PLMN and then moving to another PLMN will be described. In other words, the process of the UE_A 10, in the eighth process example, moving from the visited PLMN to another PLMN while the back-off timer is running will be described below.

The UE_A 10 may configure such that in a case that the UE_A 10, in changing the PLMN, does not receive the 20th identification information in a case of receiving the back-off timer, the transmission of the SM request message described in each example is allowed in the destination PLMN depending on the counted back-off timer. In other words, in this case, in the destination PLMN, the UE_A 10 may configure such that the transmission of the SM request message described in each example is allowed depending on the counted back-off timer. Further, in other words, in this case, in the destination PLMN, the UE_A 10 may configure such that the transmission of the SM request message that is prohibited in the PLMN before changed described in each example is allowed depending on the counted back-off timer.

However, in a case that the UE_A 10 in changing the PLMN receives the 21st identification information in a case of receiving the back-off timer, the UE_A 10 may continue the regulation for the transmission of the SM request message described in each example in the destination PLMN depending on the counted back-off timer. In other words, in this case, in the destination PLMN, the UE_A 10 may configure such that the transmission of the SM request message described in each example is prohibited depending on the counted back-off timer.

Furthermore, the UE_A 10 in changing the PLMN, in a case of performing the count of the back-off timer in the PLMN before changed and receiving the 20th identification information and/or the 21st identification information along with the value of the back-off timer, may continue the regulation for the transmission of the SM request message described in each example depending on the counted back-off timer. In other words, in this case, in the destination PLMN, the UE_A 10 may configure such that the transmission of the SM request message described in each example is prohibited depending on the counted back-off timer.

Furthermore, the UE_A 10 in changing the PLMN, in a case of performing the count of the back-off timer in the PLMN before changed and also performing the count of the back-off timer in the destination PLMN, may continue the regulation for the transmission of the SM request message described in each example depending on the counted back-off timer. In other words, in this case, in the destination PLMN, the UE_A 10 may configure such that the transmission of the SM request message described in each example is prohibited depending on the counted back-off timer.

Note that in the all processes described above, the UE_A 10 may configure such that in a case that UE_A 10 in changing the PLMN does not satisfy the above conditions, the transmission of the SM request message described in each example is allowed in the destination PLMN depending on the counted back-off timer. In other words, in this case, in the destination PLMN, the UE_A 10 may configure such that the transmission of the SM request message described in each example is allowed depending on the counted back-off timer. Further, in other words, in this case, in the destination PLMN, the UE_A 10 may configure such that the transmission of the SM request message that is prohibited in the PLMN before changed described in each example is allowed depending on the counted back-off timer.

In the description in the present embodiment, the expression that the NW transmits to the UE_A 10 may mean that the AMF or the SMF transmits to the UE_A 10, and the expression that the UE_A 10 transmits to the NW may mean that the UE_A 10 transmits to the AMF or the SMF. Furthermore, the expression that the UE_A 10 receives from the NW may mean that the AMF or the SMF receives from to the UE_A 10, and the expression that the UE_A 10 receives from the NW may mean that the UE_A 10 receives from the AMF or the SMF.

2. MODIFIED EXAMPLES

A program running on an apparatus according to the present invention may serve as a program that controls a Central Processing Unit (CPU) and the like to cause a computer to operate in such a manner as to realize the functions of the above-described embodiment according to the present invention. Programs or information handled by the programs are temporarily stored in a volatile memory such as a Random Access Memory (RAM), a non-volatile memory such as a flash memory, a Hard Disk Drive (HDD), or another storage device system.

Note that a program for realizing such functions of the embodiment according to the present invention may be recorded on a computer-readable recording medium. It may be implemented by causing a computer system to read and execute the program recorded on this recording medium. It is assumed that the "computer system" refers to a computer system built into the apparatuses, and the computer system includes an operating system and hardware components such as a peripheral device. Furthermore, the "computer-readable recording medium" may be any of a semiconductor recording medium, an optical recording medium, a magnetic recording medium, a medium dynamically retaining the program for a short time, or any other computer readable recording medium.

Furthermore, each functional block or various characteristics of the apparatuses used in the above-described embodiment may be implemented or performed on an electric circuit, for example, an integrated circuit or multiple integrated circuits. An electric circuit designed to perform the functions described in the present specification may include a general purpose processor, a digital signal processor (DSP), an application specific integrated circuit (ASIC), a field programmable gate array (FPGA), or other programmable logic devices, discrete gates or transistor logic, discrete hardware components, or a combination thereof. The general-purpose processor may be a microprocessor, or may be a processor of a known type, a controller, a microcontroller, or a state machine instead. The above-mentioned electric circuit may include a digital circuit, or may include an analog circuit. Furthermore, in a case that a circuit integration technology that replaces the present integrated circuit appears with advances in semiconductor technology, one or more aspects of the present invention can also use a new integrated circuit based on the technology.

Note that the invention of the present patent application is not limited to the above-described embodiments. In the embodiment, apparatuses have been described as an example, but the invention of the present application is not limited to these apparatuses, and is applicable to a terminal apparatus or a communication apparatus of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatuses.

Although, the embodiments of the present invention have been described in detail above referring to the drawings, the specific configuration is not limited to the embodiments and includes, for example, design changes within the scope not depart from the gist of the present invention. Furthermore, in the present invention, various modifications are possible within the scope of claims, and embodiments that are made by suitably combining technical means disclosed according to the different embodiments are also included in the technical scope of the present invention. Furthermore, a configuration in which elements described in the respective embodiments and having mutually similar effects, are substituted for one another is also included.

The invention claimed is:

1. A User Equipment (UE) comprising:
transmission and reception circuitry configured to receive, from a control device, a Protocol Data Unit (PDU) session establishment reject message in a PDU session establishment procedure; and
a controller configured to start a back-off timer with a back-off timer value, in a case that first information and the back-off timer value are included in the PDU session establishment reject message, and in a case that a Single Network Slice Selection Assistance information (S-NSSAI) was provided during the PDU session establishment procedure,
wherein
the first information is a cause value indicating insufficient resources for specific slice,
the back-off timer is a timer for S-NSSAI based congestion control,
the back-off timer is associated with the S-NSSAI that the UE provided during the PDU session establishment procedure, and
in a case that the first information and second information indicating that the back-off timer is applied in all Public Land Mobile Network (PLMN)s are included in the PDU session establishment reject message, another PDU session establishment request message or a PDU session modification request message for the S-NSSAI is not sent in all PLMNs while the back-off timer is running.

2. A communication control method performed by a User Equipment (UE), the communication control method comprising:
receiving, from a control device, a Protocol Data Unit (PDU) session establishment reject message in a PDU session establishment procedure; and
starting a back-off timer with a back-off timer value, in a case that first information and the back-off timer value are included in the PDU session establishment reject message, and in a case that a Single Network Slice Selection Assistance information (S-NSSAI) was provided during the PDU session establishment procedure,
wherein
the first information is a cause value indicating insufficient resources for specific slice,
the back-off timer is a timer for S-NSSAI based congestion control,
the back-off timer is associated with the S-NSSAI that the UE provided during the PDU session establishment procedure, and
in a case that the first information and second information indicating that the back-off timer is applied in all Public Land Mobile Network (PLMN)s are included in the PDU session establishment reject message, another PDU session establishment request message or a PDU session modification request message for the S-NSSAI is not sent in all PLMNs while the back-off timer is running.

3. A communication control method performed by a User Equipment (UE), the communication control method comprising:
receiving, from a control device, a Protocol Data Unit (PDU) session establishment reject message in a PDU session establishment procedure; and
starting a back-off timer with a back-off timer value, in a case that first information and the back-off timer value are included in the PDU session establishment reject message, and in a case that a Single Network Slice Selection Assistance information (S-NSSAI) was provided during the PDU session establishment procedure,
wherein
the first information is a cause value indicating insufficient resources for specific slice,
the back-off timer is a timer for S-NSSAI based congestion control,
the back-off timer is associated with the S-NSSAI that the UE provided during the PDU session establishment procedure, and
in a case that the first information and second information indicating that the back-off timer is applied in all Public Land Mobile Network (PLMN)s are included in the PDU session establishment reject message, and upon a PLMN change, another PDU session establishment request message or a PDU session modification request message for the S-NSSAI is not sent while the back-off timer is running.

* * * * *